US008732012B2

(12) United States Patent  
Barnett et al.

(10) Patent No.: US 8,732,012 B2  
(45) Date of Patent: May 20, 2014

(54) AUTOMATED COMMISSION PROGRAMS

(75) Inventors: Roger Barnett, San Francisco, CA (US); Cynthia Pappas, Sarasota, FL (US)

(73) Assignee: Shaklee Corporation, Pleasanton, CA (US)

( * ) Notice: Subject to any disclaimer, the term of this patent is extended or adjusted under 35 U.S.C. 154(b) by 0 days.

(21) Appl. No.: 13/522,688

(22) PCT Filed: Jan. 25, 2011

(86) PCT No.: PCT/US2011/022430  
§ 371 (c)(1),  
(2), (4) Date: Jul. 17, 2012

(87) PCT Pub. No.: WO2011/094216  
PCT Pub. Date: Aug. 4, 2011

(65) Prior Publication Data  
US 2012/0296783 A1 Nov. 22, 2012

Related U.S. Application Data

(60) Provisional application No. 61/298,506, filed on Jan. 26, 2010.

(51) Int. Cl.  
*G06Q 30/00* (2012.01)  
*G06Q 30/02* (2012.01)

(52) U.S. Cl.  
CPC ........ *G06Q 30/0214* (2013.01); *G06Q 30/0207* (2013.01)  
USPC ....................................... 705/14.16; 705/14.1

(58) Field of Classification Search  
USPC ....................................................... 705/14.16  
See application file for complete search history.

(56) References Cited

U.S. PATENT DOCUMENTS

| | | | |
|---|---|---|---|
| 5,537,314 A | 7/1996 | Kanter | |
| 5,839,118 A * | 11/1998 | Ryan et al. | 705/36 R |
| 6,578,010 B1 | 6/2003 | Teacherson | |
| 6,618,706 B1 * | 9/2003 | Rive et al. | 705/30 |
| 7,149,707 B2 | 12/2006 | Scoble | |
| 2002/0038235 A1 * | 3/2002 | Musafia et al. | 705/11 |
| 2002/0046110 A1 * | 4/2002 | Gallagher | 705/14 |
| 2004/0122734 A1 | 6/2004 | Schleicher et al. | |
| 2004/0158537 A1 | 8/2004 | Webber et al. | |
| 2004/0193439 A1 | 9/2004 | Marrott | |
| 2005/0171796 A1 | 8/2005 | Goodrich | |
| 2005/0289003 A1 | 12/2005 | Thompson et al. | |
| 2006/0047575 A1 | 3/2006 | Palazzo | |

(Continued)

OTHER PUBLICATIONS

"Sums of Infinite Series," http://home.windstream.net/okrebs/page135.html, visited Jun. 12, 2010, 3 pages.

(Continued)

*Primary Examiner* — John G Weiss  
*Assistant Examiner* — Scott C Anderson  
(74) *Attorney, Agent, or Firm* — Klarquist Sparkman, LLP

(57) ABSTRACT

A commission program can include an asymptotic component when calculating compensation for distributors. An asymptotic leg can extend to infinity without exceeding a target percentage. A distributor can be compensated based on selected distributors in the compensated distributor's downline. Recurring non-contiguous inclusion of distributors can be applied. A random component can be incorporated into the compensation program. The program can include innovative techniques going beyond conventional systems to better provide a balance between distributor motivation and sustainability of the program.

35 Claims, 40 Drawing Sheets

(56) References Cited

U.S. PATENT DOCUMENTS

| | | | |
|---|---|---|---|
| 2008/0059986 A1* | 3/2008 | Kalinowski et al. | 725/1 |
| 2008/0281681 A1 | 11/2008 | Bremmer et al. | |
| 2009/0043661 A1 | 2/2009 | Chong et al. | |
| 2009/0150232 A1 | 6/2009 | Tyler et al. | |
| 2011/0137815 A1 | 6/2011 | Barnett et al. | |

OTHER PUBLICATIONS

"Tru-Infinity," Shaklee University Course, shakleeuniversity.com, visited Jul. 24, 2009, 52 pages.

"Weekly Web Conference Calls," Shaklee PowerPoint Presentation, Oct. 2007, 68 pages.

Babener, "How to Analyze Compensation Plans," excerpted from *Network Marketing: What You Should Know*, 2000, 5 pages.

Coughlan et al., "Network Marketing Organizations: Compensation Plans, Retail Network Growth, and Profitability," International Journal of Research in Marketing 15 (1998), pp. 401-426.

Hancock, "Shaklee Annual Convention," mlmstuff.com, Aug. 19, 2008, 3 pages.

International Search Report and Written Opinion, issued in PCT/US2011/22430, dated Apr. 1, 2011, 10 pages.

Rawlins, "Basic MLM Commission Plan Components," Jan. 9, 2008, 1 page.

Rawlins, "MLM Commission Plan Qualifications and Rank Advancements," Jan. 8, 2008, 2 pages.

Rawlins, "The Three Proven Commission Plans—Part 2: Breakaway," Jan. 16, 2008, 3 pages.

Rawlins, "Understanding Multi-Level Commissions—Chapter 9," May 12, 2003, 13 pages.

Summary of the Shaklee Compensation Plan I, Aug. 2008, 1 page.

Summary of the Shaklee Compensation Plan II, Aug. 2008, 1 page.

International Preliminary Report on Patentability, issued in PCT/US2009/052480, dated Feb. 1, 2011, 8 pages.

International Search Report, issued in PCT Application No. PCT/US2009/052480, dated Sep. 29, 2009, 2 pages.

* cited by examiner

AUTOMATED COMMISSION PROGRAMS

CROSS REFERENCE TO RELATED APPLICATIONS

This is the U.S. National Stage of International Application No. PCT/US2011/022430, filed Jan. 25, 2011, which was published in English under PCT Article 21(2), which in turn claims the benefit of U.S. Provisional Application No. 61/298,506, filed Jan. 26, 2010. The provisional application is incorporated by reference herein in its entirety.

BACKGROUND

Multi-level marketing is recognized as a powerful business tool in today's marketplace. With the advent of widespread electronic communications and the emergence of social networking and other online technologies, new opportunities are presented in the multi-level marketing world.

However, various multi-level marketing compensation systems have been found lacking in various respects.

SUMMARY

A variety of technologies described herein are useful for implementing a commission program in a multi-level marketing environment. The technologies go beyond known techniques for implementing commission programs and provide innovative features offering significant advantages over conventional techniques.

As described herein, asymptotic modulation can be used when calculating compensation for a compensated distributor.

As described herein, distributors on whom compensation is to be paid to a compensated distributor can be selected via recurring non-continuous inclusion.

The compensation program can include features that balance sustainability of the program and ongoing compensation to achieve superior motivation and compensation to participating distributors.

As described herein, a variety of other features and advantages can be incorporated into the technologies as desired. The foregoing and other features and advantages will become more apparent from the following detailed description of disclosed embodiments, which proceeds with reference to the accompanying drawings.

DETAILED DESCRIPTION

Example 1

Exemplary Overview of Technologies

As described herein, various technologies related to a commission program can be incorporated into a multi-level marketing arrangement to provide superior motivation and compensation for participating distributors.

Example 2

Exemplary Compensation

In any of the examples herein, compensation under the program can be paid in the form of a bonus. The bonus can take the form of credit, payment, product, or the like.

Example 3

Exemplary Upline

In any of the examples herein, the upline of a subject distributor can include the distributor who sponsored the subject distributor and the upline of the distributor who sponsored the subject distributor (e.g., those who sponsored the sponsoring distributor).

The upline can be determined based on stored relationships between distributors in one or more computer-readable media (e.g., by a computer-implemented method).

Example 4

Exemplary Downline

In any of the examples herein, the downline of a subject distributor can include those distributors directly sponsored by the subject distributor and the distributors in turn sponsored by those distributors directly sponsored by the subject distributor, and so forth.

The downline can be determined based on stored relationships between distributors in one or more computer-readable media (e.g., by a computer-implemented method).

In some cases, distributors technically downstream from a subject distributor may not be in the subject distributor's downline because they have broken away. However, breaking away can be inhibited by use of titled rooms as described herein.

A downline can be calculated differently for different aspects of an overall compensation program. So, for example, one program may consider the downline to be one set of distributors, and another program may consider the downline to be another set of distributors. Compensation from both programs can be combined even if they have different definitions of downline.

Example 5

Exemplary Combination with Other Commission Programs

The asymptotic modulation technologies described herein can be combined with any number of other commission programs to form an overall commission program. For example, any of the commission programs described herein can be combined with the asymptotic modulation technologies. Different genealogies can be used for different commission programs.

Example 6

Exemplary Distributors

In any of the examples herein, a distributor can be any person or organization meeting certain qualifications to participate in the commission program. In some cases, different qualifications can be used for different purposes (e.g., to participate in the program, be counted for another distributor's bonus, etc.).

The technologies described herein can also be applied to affiliate-based programs. In such a case, a distributor can take the form of an affiliate.

Example 7

Exemplary Sales Organization

Figure 1:
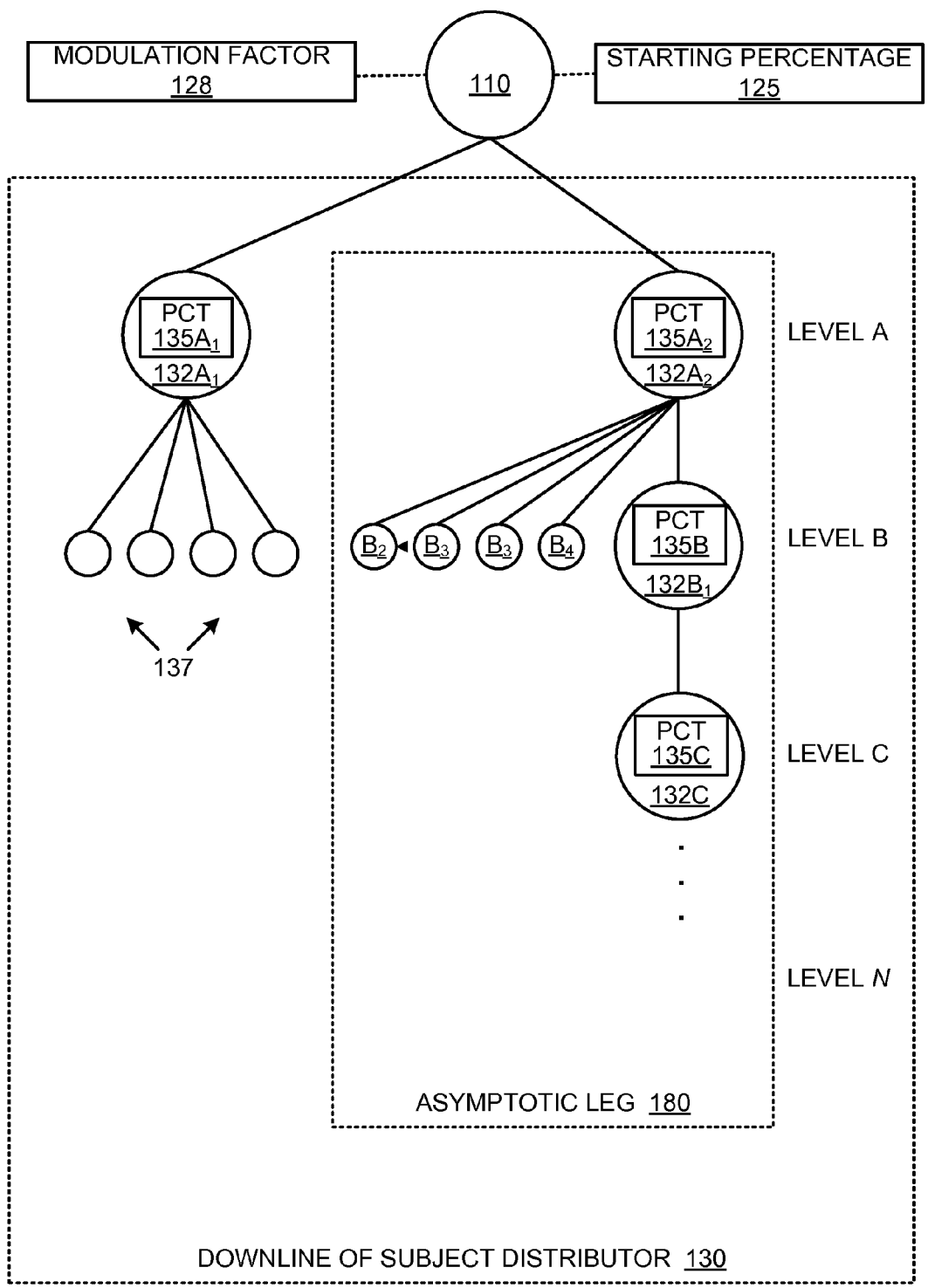
FIG. 1 is a block diagram of an exemplary sales organization comprising a distributor with downline distributors and an asymptotic leg.

FIG. 1 is a block diagram of an exemplary sales organization 100 comprising a distributor 110 with downline distributors 130. Although not shown, upline distributors can also be represented and included in any of the examples described herein. The organization 100 can be represented in a computing device by storing data structures representing the various items and relationships therebetween (e.g., in one or more computer-readable storage media).

The downline 130 of the subject distributor 110 comprises distributors 135A-C. In practice, the downline 130 can have more distributors, more levels, or both. For example, additional distributors 137 may be under a downline distributor 132$A_1$. The downline distributors are also shown as having percentages 135A-C. In practice, the percentages need not be stored repeatedly for different levels, depending on the implementation.

A distributor can be represented without a percentage. Such an arrangement can be used to distinguish between qualifying and non-qualifying distributors (e.g., with respect to the subject distributor 110) in the organization. Alternatively, the distributor can be assigned a percentage of "0%."

In the example, the subject distributor 110 is shown as associated with a starting percentage 125 and a modulation factor 128. Application of the modulation factor 128 to the starting percentage 125 as a leg 180 is navigated will result in an asymptotic leg 180. Although a target percentage need not be explicitly specified, the asymptotic leg 180 will exhibit the property that the sum of the percentages for each level will not exceed the target percentage, even if the asymptotic leg 180 were to be extended to an infinite length.

Although other modulation techniques can be used, Percentage$_L$ the percentage at a particular level L (e.g., A=1, B=2, etc.) can be as follows:

$$\text{Percentage}_L = (P_{start})(MF^L)$$

where $P_{start}$ is the starting percentage and MF is the modulation factor, which has the exponent L applied in the example.

Example 8

Exemplary Method of Implementing Commission Program

Figure 2:
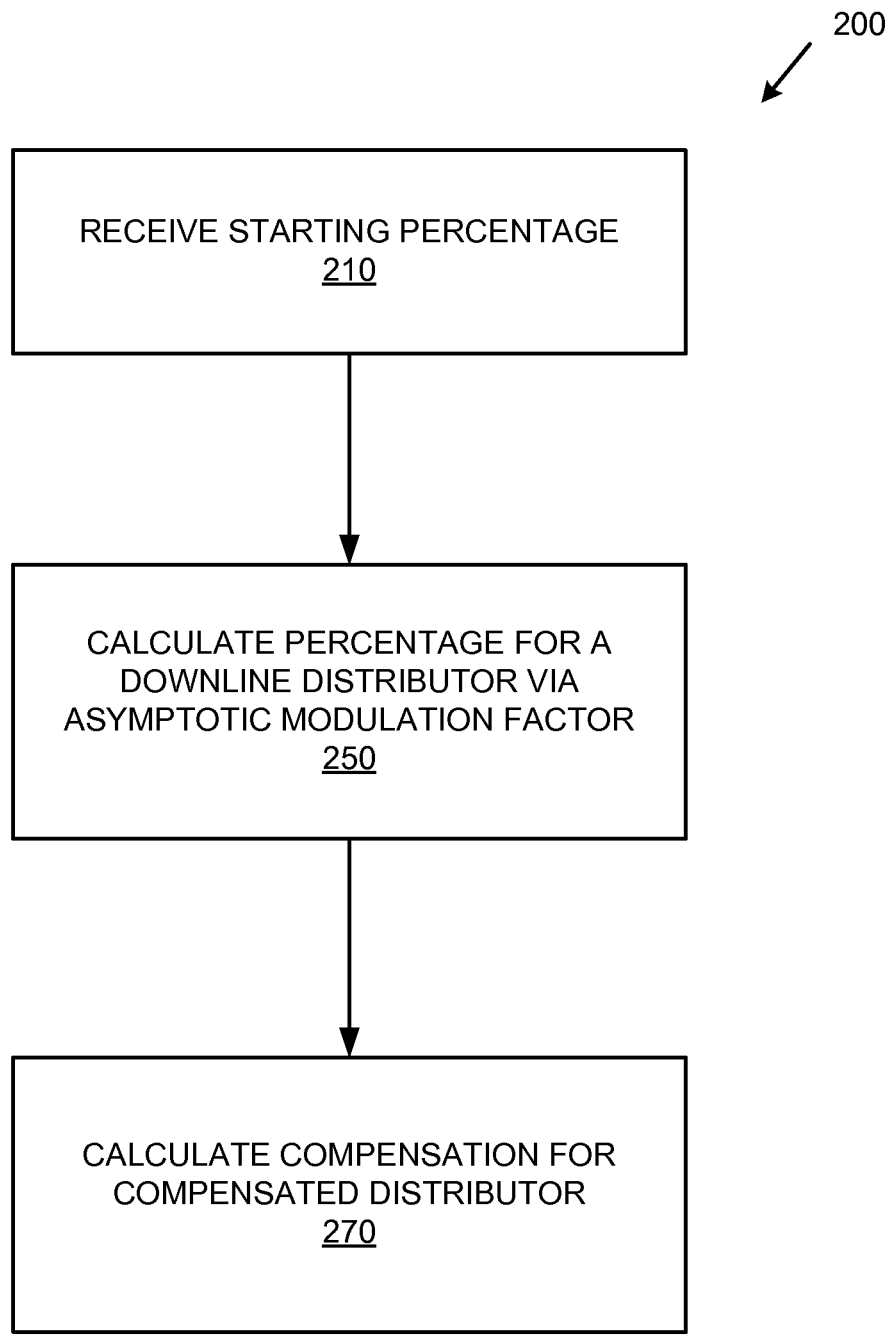
FIG. 2 is a flowchart of an exemplary method of calculating compensation via an asymptotic modulation factor.

FIG. 2 is a flowchart of an exemplary method 200 of implementing a compensation program for distributors via an asymptotic modulation factor and can be used for a sales organization such as that shown in FIG. 1. The method 200 and any of the other methods herein can be performed by computer-executable instructions stored in one or more computer-readable media (e.g., storage or other tangible media) or stored on a computer program product.

In the example, compensation is calculated for a compensated distributor (e.g., the subject distributor 110 of FIG. 1).

At 210, a starting percentage is received (e.g., for a compensated distributor). For example, a starting percentage can be specified by a user or administrator or be derived from a starting percentage of another distributor (e.g., in the upline of the compensated distributor).

At 250, a percentage for a downline distributor is calculated. Such calculation can comprise repeatedly applying an asymptotic modulation factor to the starting percentage (e.g., while progressing through a downline of the compensated distributor). Any asymptotic modulation technique described herein, including the modulation technique described above for Percentage$_L$ can be used.

At 270, compensation (e.g., a bonus) for the compensated distributor is calculated for a downline distributor. Such calculation can comprise applying the calculated percentage to a volume of the downline distributor. In practice, the method 200 can be applied multiple times to multiple downline distributors for a compensated distributor. The resulting compensation calculations for a compensated distributor can be summed or otherwise combined to result in a total compensation under the program. The compensation program can be used in conjunction with other compensation programs as desired.

Example 9

Exemplary Other Method of Implementing Commission Program

Figure 3:
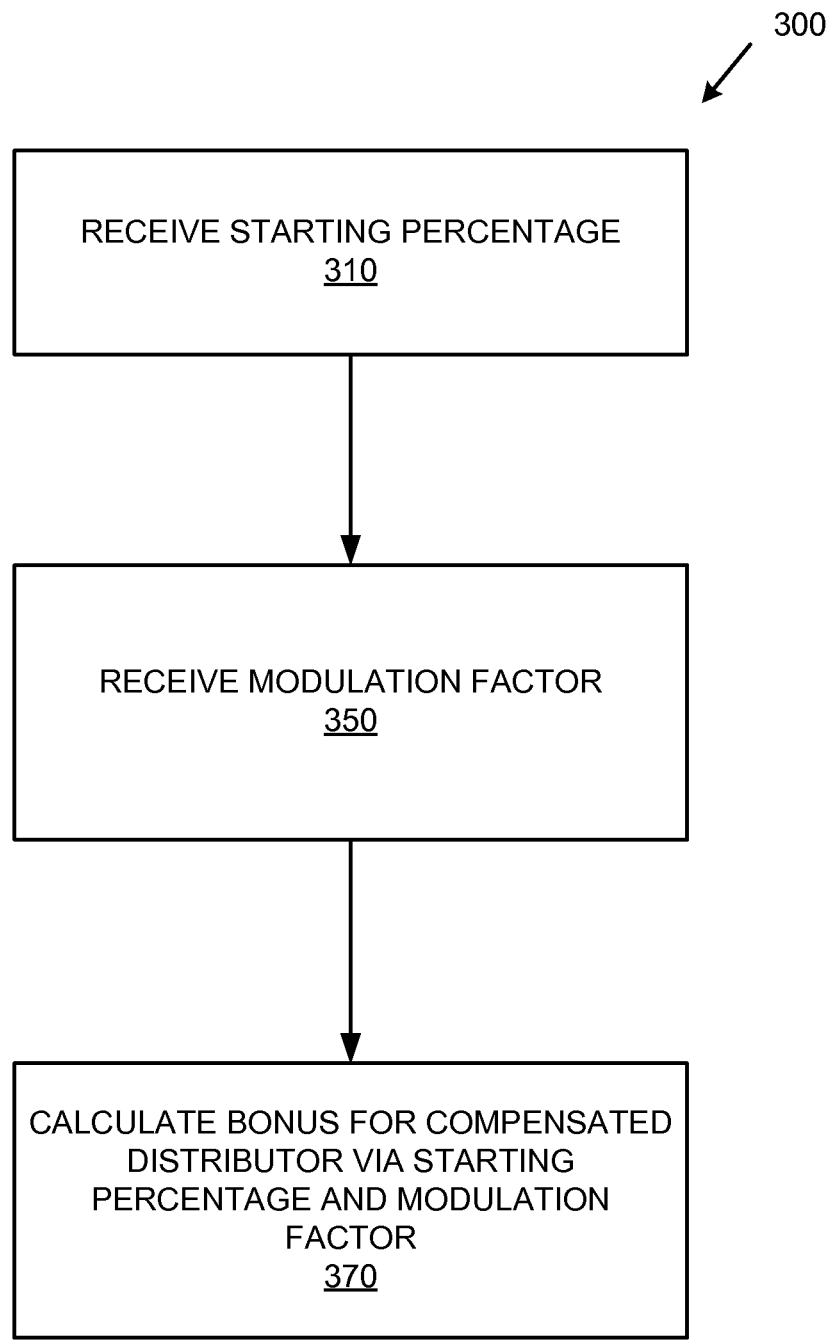
FIG. 3 is a flowchart of another exemplary method of calculating compensation via an asymptotic modulation factor.

FIG. 3 is a flowchart of an exemplary method 300 of implementing a compensation program for distributors via an asymptotic modulation factor and can be used for a sales organization such as that shown in FIG. 1.

In the example, compensation is calculated for a compensated distributor (e.g., the subject distributor 110 of FIG. 1).

At 310, a starting percentage is received for a compensated distributor. For example, a starting percentage can be specified by an administrating user or be derived from a starting percentage of another distributor (e.g., in the upline of the compensated distributor).

At 350, a modulation factor is received for the compensated distributor. For example, a modulation factor can be specified by an administrating user or be derived from a modulation factor of another distributor (e.g., in the upline of the compensated distributor).

At 370, a bonus for the compensated distributor is calculated via the starting percentage and the modulation factor. For example, the modulation factor can be repeatedly applied to the starting percentage as the downline is navigated until the distributor for which the compensated distributor is compensated is reached.

In any of the examples herein, the modulation factor can be applicable to the starting percentage an infinite number of times without a sum of resulting percentages exceeding a target percentage. For example, the sum of the resulting percentages can approach without ever quite reaching the target percentage.

Example 10

Exemplary Paying-Out-On-A-Distributor Perspective

For purposes of determining compensation, it is sometimes more efficient or convenient to determine the sales volume for a particular distributor and then figure out which distributors are compensated for the sales volume and the amount of compensation (e.g., based on appropriate percentages). Navigating through the sales organization, the amounts of compensation are stored and summed for the respective compensated distributors.

Example 11

Exemplary Efficiency of Calculation: Asymptotic

In order to make calculation more efficient, the percentages for respective compensated distributors can be stored as associated with distributors on whom the compensated distributor is paid (e.g., based on the sales volume of the distributors). In this way, when a new distributor is added to the organization, determining appropriate percentages does not require excessive navigation of the representation of the sales organization. Instead, a modulation factor can be applied to the stored percentages.

From a paying-out-on-a-distributor perspective, the compensated distributors for a particular distributor can, but need not be, stored along with appropriate percentages. Then, when adding a new distributor, the stored percentages can be modulated (e.g., as appropriate because the sponsored distributor is one level under the sponsoring distributor), and the starting percentage associated with the sponsoring distributor. When there are additional requirements beyond just the relationships between distributors within the sponsorship chain, it would not be efficient to handle this way, because the percentage paid to one distributor on the sales volume of another cannot be determined in advance.

Such percentages can be stored as the percentages themselves or a code indicating the percentage. Having a code can reduce the storage space required and also allow changing of the percentages globally without having to re-calculate them.

Example 12

Exemplary Sales Organization

Figure 4:
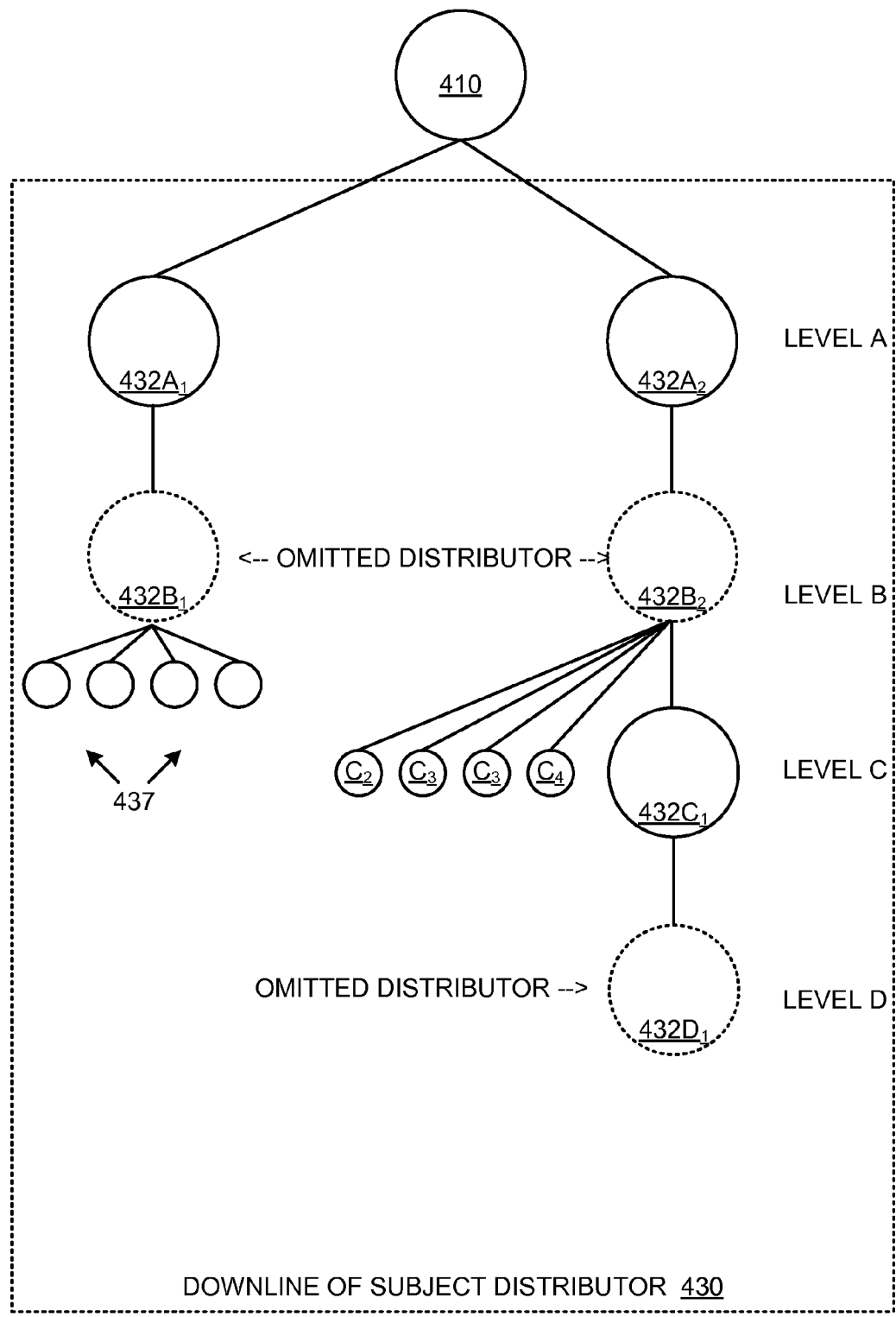
FIG. 4 is a block diagram of an exemplary sales organization comprising a distributor with downline distributors for application of recurring non-continuous inclusion.

FIG. 4 is a block diagram of a sales organization comprising a distributor 410 with downline distributors for application of recurring non-continuous inclusion. Although not shown, upline distributors can also be included in any of the examples described herein. The organization 400 can be represented in a computing device by storing data structures representing the various items and relationships therebetween (e.g., in one or more computer-readable storage media).

In the example, the subject distributor 410 has a downline 430 with an assortment of distributors 432A-432D (e.g., in levels A, B, C, and D). In practice, the downline 430 can have more distributors, levels, or both. For example, additional distributors 437 can be under a downline distributor 432A$_1$.

In the example, non-continuous inclusion of distributors in the downline 430 is exhibited in that distributors in level B and level D are omitted from consideration when calculating compensation for the subject distributor 410 for purposes of the compensation program.

Example 13

Exemplary Method of Calculating Compensation Via Non-Continuous Inclusion

Figure 5:
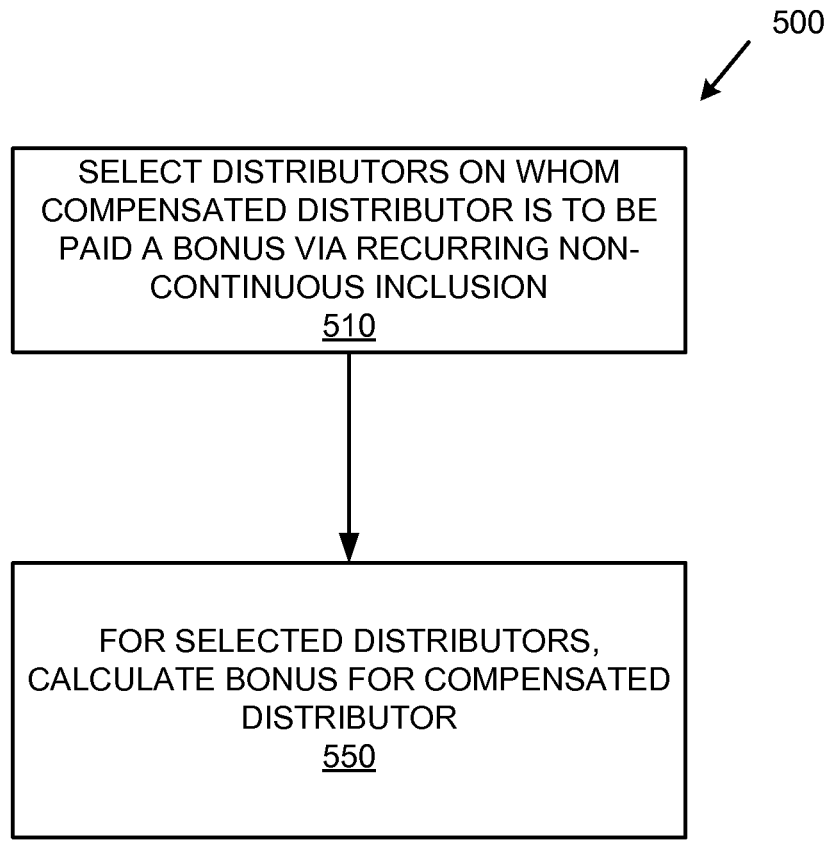
FIG. 5 is a flowchart of an exemplary method of calculating compensation via non-continuous inclusion.

FIG. 5 is a flowchart of an exemplary method 500 of implementing a compensation program for distributors via recurring non-continuous inclusion and can be used for a sales organization such as that shown in FIG. 4.

In the example, compensation is calculated for a compensated distributor (e.g., the subject distributor 110 of FIG. 1).

At 510, distributors on whom the compensated distributor is to be paid a bonus are selected via recurring non-continuous inclusion.

At 550, for the selected distributors, a bonus for the compensated distributor is then calculated. For example, a percentage on the sales volume of the selected distributors can be paid. In practice, different percentages may be payable on different distributors (e.g., according to any of the examples shown herein).

Example 14

Exemplary Recurring Non-Continuous Inclusion

In any of the examples herein recurring non-continuous inclusion can be used to select distributors on which a compensated distributor is paid. Although some examples herein show payment based on a downline, payment can be based on upline, downline, or both. In a paying-out-on-a-distributor scenario, distributors to whom compensation is paid (e.g., for sales volume of a particular distributor) can be selected in a similar manner.

Non-continuous inclusion can take the form of skipping distributors according to a deterministic pattern. Those distributors that are skipped can be omitted from compensation considerations for purposes of the compensation program (e.g., a percentage of 0% is effectively paid). Skipping can be performed with respect to relationships between distributors. For example, when progressing downline, a particular distributor may be skipped when starting from one distributor in a paying-out-to-distributors scenario, but included when starting from another distributor. Likewise, in a paying-out-on-a-distributor scenario, progression may be in an upline direction, and a particular distributor may be skipped when paying out on one distributor, but included when paying out on another distributor.

A deterministic pattern can take the form of including distributors at a starting level in the downline and then including distributors at regular intervals thereafter (e.g., every other, every $3^{rd}$, every $n^{th}$, or the like).

The regular intervals can take the form of linear or exponential intervals (e.g., level 2, 4, 8, 16, etc.).

The regular intervals can follow an initial continuous gap in the downline (e.g., levels 5-10) are omitted.

The percentages paid on (or to) included distributors can be a fixed percentage, asymptotic, or according to another compensation program.

Example 15

Exemplary Efficiency of Calculation: Recurring Non-Continuous Inclusion

In order to increase efficiencies of calculation, parameters for recurring non-continuous inclusion can, but need not be, stored as associated with respective distributors. In this way, when a new distributor is added, excessive navigation of a representation of the sales organization is not necessary. For example, information sufficient to determine whether the next distributor will have a payout to an upline distributor can be stored. Such information can include where in a recurring cycle the distributor lies (e.g., if paying on every 3, whether the sponsoring distributor is at point 1, 2, or 3 in the cycle).

Cycle information can be stored with respect to a given distributor rather than to the top of the sales organization.

Example 16

Exemplary Recurring Non-Continuous Inclusion with Random Component

In any of the examples herein, a random component can be applied to determine which distributors are to be omitted (e.g., skipped). Such a technique can result in a random pattern that is applied uniformly (e.g., the same random pattern to multiple legs) or non-uniformly (e.g., different random patterns to different legs).

A random component can be implemented via a variety of parameters. For example, inclusion can be based x % of the time. Y levels can be skipped, where Y is a number between two predetermined bounds. Other implementations are possible.

Example 17

Exemplary Sales Organization: Paying-Out-On-A-Distributor Perspective

Figure 6:
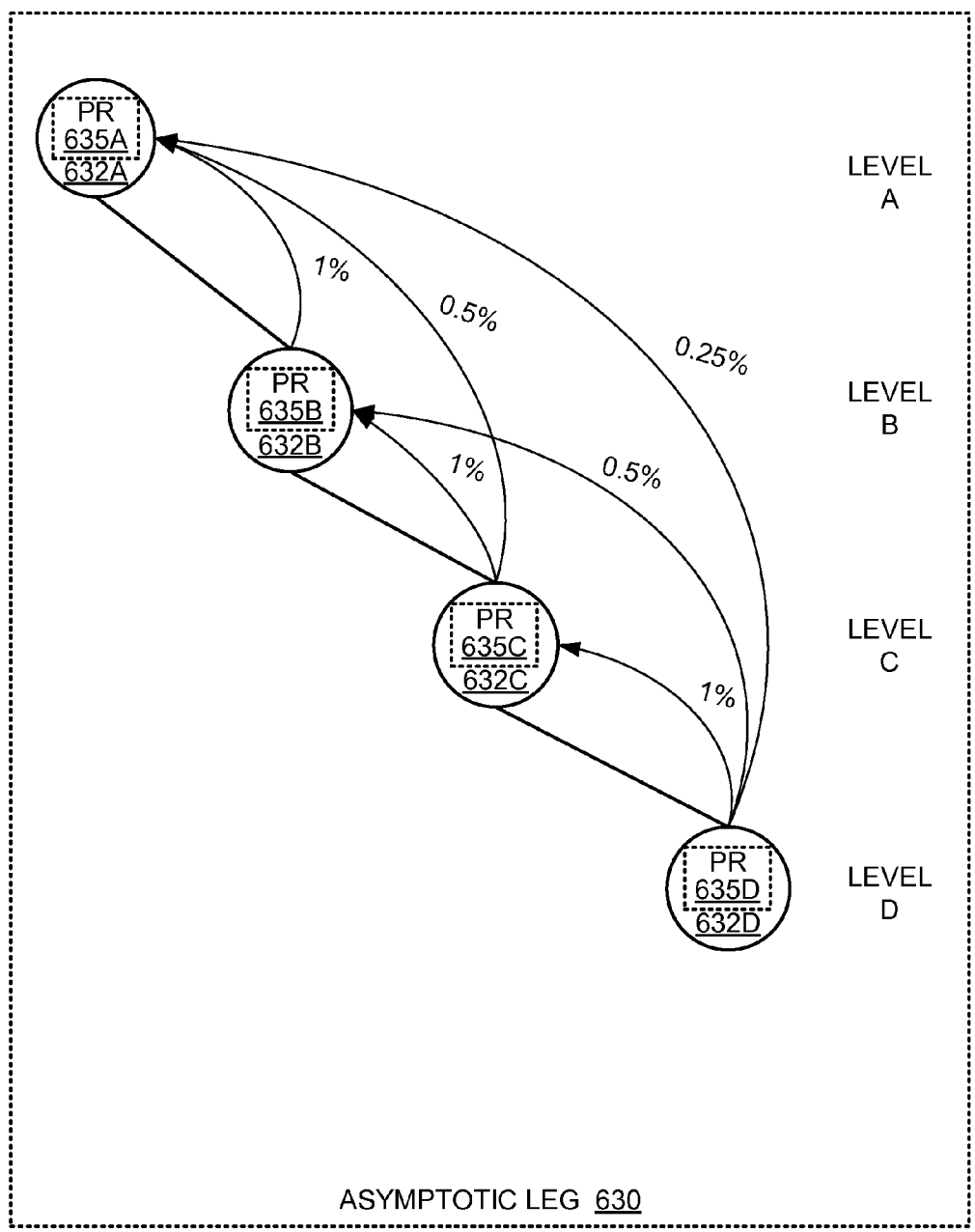
FIG. 6 is a block diagram of an exemplary sales organization showing a paying-out-on-a-distributor perspective.

FIG. 6 is a block diagram of a sales organization comprising a distributor 632D with upline distributors for application of an asymptotic modulation factor. Although not shown, further downline distributors can also be included in any of the examples described herein. The organization 600 can be represented in a computing device by storing data structures representing the various items and relationships therebetween (e.g., in one or more computer-readable storage media).

In the example, the subject distributor 632D is a distributor with a sales volume. Percentages are paid out to qualifying distributors in the upline of the distributor 632D. In an asymptotic scenario, no more than a target percentage is paid out.

In a paying-out-on-a-distributor perspective, the compensation paid out from the sales volume of a distributor is determined and stored for upline distributors. As navigation proceeds through the organization for the sales volume of other distributors, compensation paid out is summed. In this way, the total compensation for a compensated distributor is determined piecemeal (e.g., as the sum of downline distributors on whom compensation is paid out, based on sales level). When presented to a given upline distributor, the compensation can be presented as a sum of compensation derived from multiple downline distributors. It can thus appear to the upline distributor that the calculations were done from the upline perspective, but, in fact, the calculations can be done from the downline distributor's perspective.

In the example, the distributors 635D, 635C, 635B have respective sales volumes on which compensation is paid out. Distributor 635A is at the top of the organization, so no compensation is paid out. However, in practice, additional upline distributors (not shown) can be in the organization.

The compensation paid out can take the form of sales volume multiplied by percentage, where percentage is as follows:

$$\text{Percentage}_L = (P_{start})(MF^L)$$

where $P_{start}$ is the starting percentage and MF is the modulation factor, which has the exponent L applied in the example, where L is the level above the subject distributor (e.g., on whose sales volume compensation is being paid out) at which the compensated distributor is located. Navigation can continue until reaching to top of the sales organization or until a threshold percentage or amount is reached.

The process can then be repeated for other distributors, and the resulting amounts of the compensations for compensated distributors summed together for the respective compensated distributor.

Optionally, the percentages can be stored as associated with the distributors. In the example, stored percentage records 635A, 635B, 635C, and 635D are shown. The stored percentages can indicate the percentages applicable for use for respective compensated distributors in the distributor's upline. So, for example, the percentage record 635D can indicate 1% for the distributor 632C, 0.5% for distributor 632B and 0.25% for distributor 632A. For example, such an approach can be used in conjunction with a time-based room concept where there are a fixed number of uplines that can be paid.

Example 18

Exemplary Method: Paying-Out-On-A-Distributor Perspective (Asymptotic)

Figure 7:
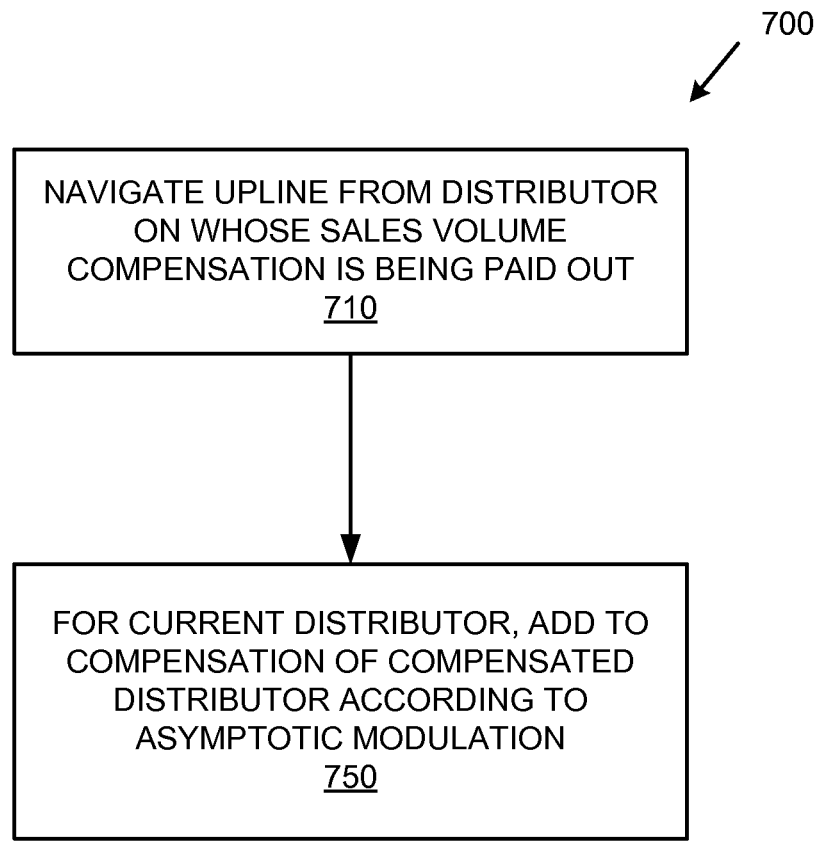
FIG. 7 is a is a flowchart of an exemplary method of calculating compensation via asymptotic modulation in a paying-out-on-a distributor perspective.

FIG. 7 shows a method 700 of calculating compensation via asymptotic modulation in a paying-out-on-a-distributor perspective and can be used in any of the examples herein.

In the very beginning, compensation for the compensated distributors can be set to zero. Compensation is incrementally added to the totals for respective compensated distributors. Navigation can start at the distributor on whose sales volume is being paid out (e.g., the paying-out distributor). At 710, navigation proceeds upline from the paying-out distributor. For the current distributor to which navigation has proceeded (e.g., the compensated distributor), compensation for the compensated distributor is calculated according to the asymptotic modulation techniques described herein, and the compensation is added to the calculated compensation of the compensated distributor.

Example 19

Exemplary Sales Organization: Intra-Level Summaries

Figure 8:
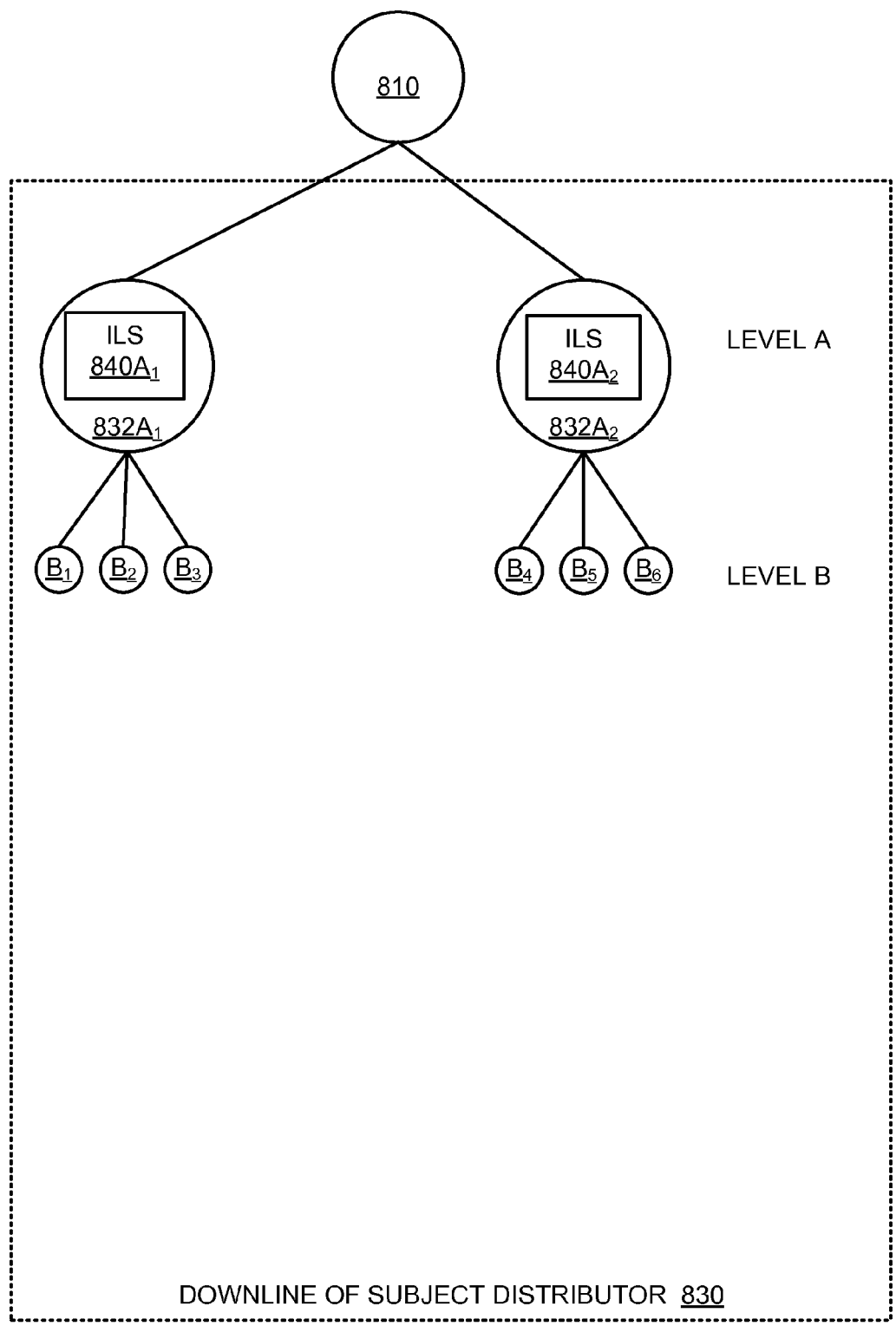
FIG. 8 is a block diagram of an exemplary sales organization for which intra-level summaries of sales volume have been stored.

FIG. 8 is a block diagram of an exemplary sales organization 800 for which intra-level summaries of sales volume have been stored and can be used in any of the examples herein. The organization 800 can be represented in a computing device by storing data structures representing the various items and relationships therebetween (e.g., in one or more computer-readable storage media).

Although not shown, there can be additional upline distributors.

In the example, compensation is calculated for compensated distributors according to the asymptotic modulation techniques described herein. In practice, the asymptotic modulation can lead to very small compensation amounts to compensated distributors if the calculation is done on sales volumes for individual distributors. So, in any of the examples herein, the total sales volume for an entire level (e.g., under the compensated distributor) can be used (e.g., and a percentage applied as described herein using asymptotic modulation factors) for compensation calculation.

To facilitate such calculations, an intra-level summary of the sales volumes can be stored during compensation calculation. Such summaries can then be re-used when calculating compensation for other distributors.

Example 20

Exemplary Intra-Level Summary

Figure 9:
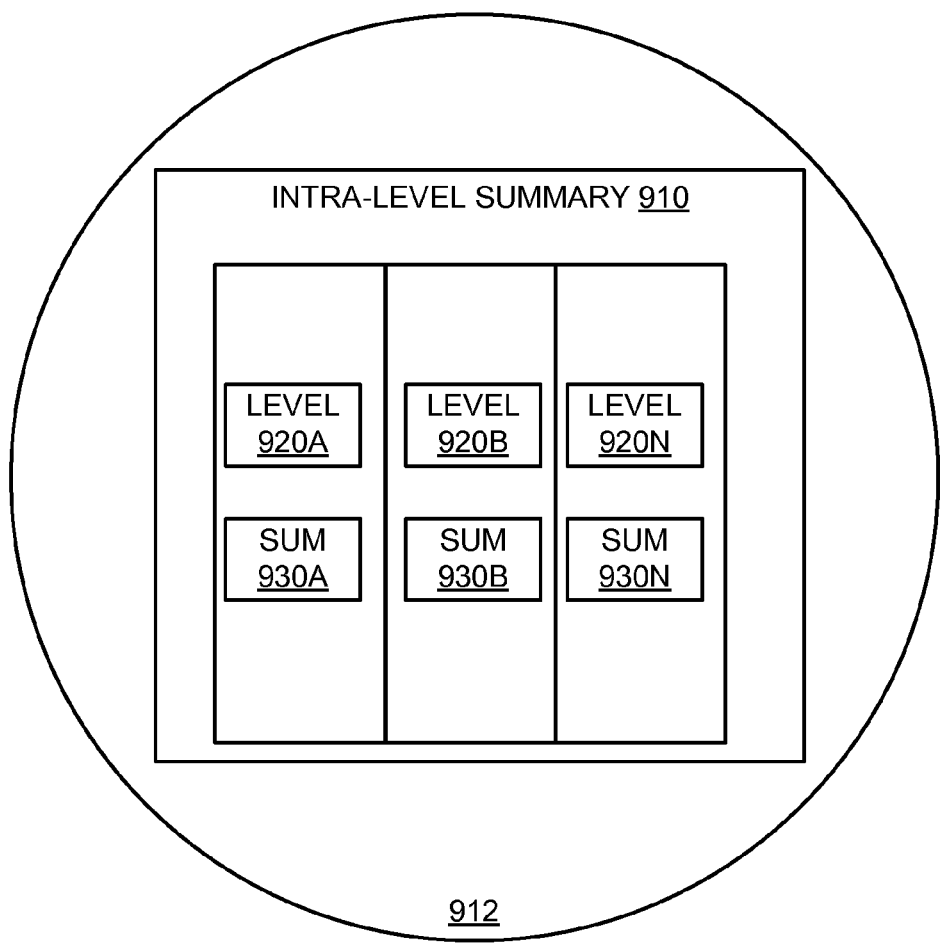
FIG. 9 is a block diagram of an exemplary intra-level summary of sales volume.

FIG. 9 is a block diagram of an exemplary intra-level sales volume summary 910 and can be used in any of the examples herein. The summary 910 can be represented in a computing device by storing data structures representing the various items and relationships therebetween (e.g., in one or more computer-readable storage media).

In the example, a separate sum 930A-N is stored for a respective indicated level 920B under the distributor associated with the summary 910. So, for example, in the example shown in FIG. 8, the following summary element can be stored for the distributor $A_1$:

| Level | Sum |
|---|---|
| 1 | Sum of sales volume for $B_1$, $B_2$, and $B_3$. |

Similarly, for $A_2$, the following summary element can be stored:

| Level | Sum |
|---|---|
| 1 | Sum of sales volume for $B_4$, $B_5$, and $B_6$. |

As is described elsewhere herein, the sums can be re-used when calculating compensation for other compensated distributors (e.g., without having to re-calculate the sums). For example, the sums can be combined to determine the total sum of a particular level for an upline distributor.

Example 21

Exemplary Intra-Level Summary Method

Figure 10:
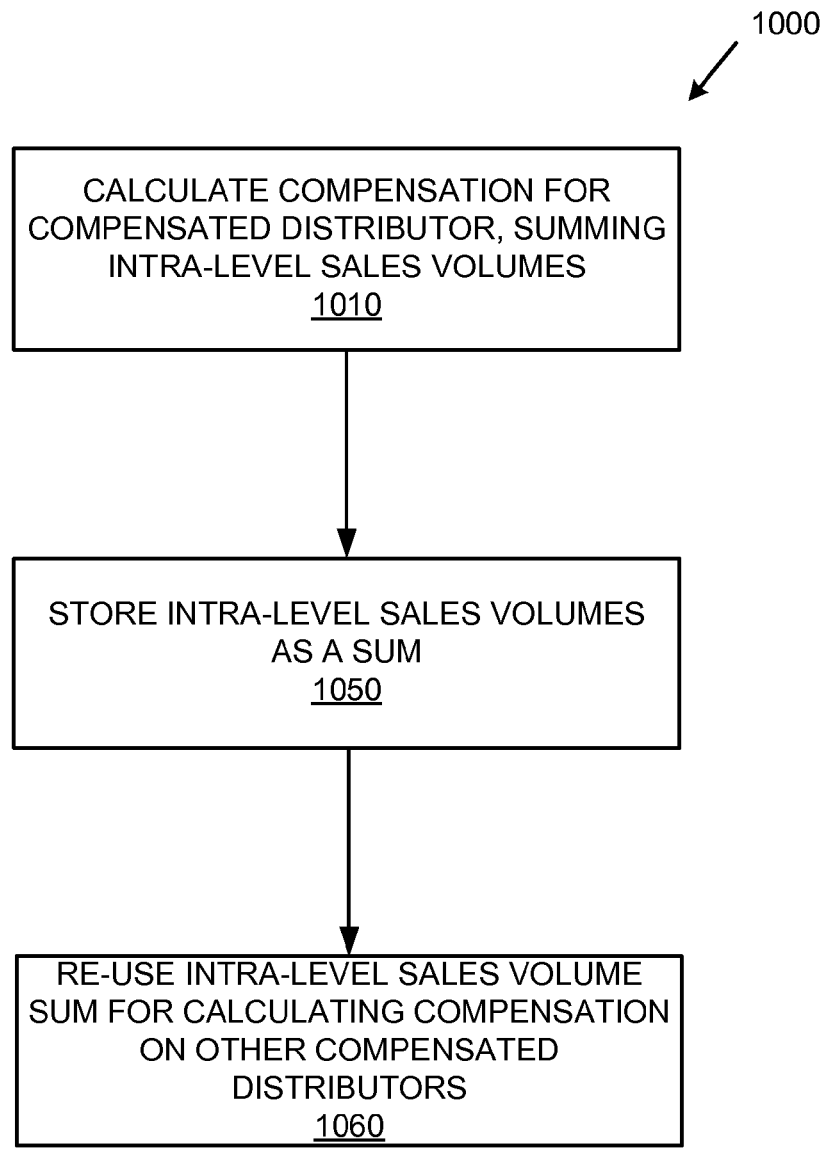
FIG. 10 is a flowchart of an exemplary method of calculating compensation via intra-level summaries of sales volume.

FIG. 10 is an exemplary method 1000 of calculating compensation via intra-level summaries of sales volume and can be used in any of the examples herein.

In the example, at 1010, compensation for a compensated distributor is calculated, summing the intra-level sales volumes. Using the example of FIG. 8, compensation for distributor $A_1$ can be calculated, summing the sales volumes for $B_1$, $B_2$, and $B_3$. The intra-level sales volumes (e.g., for those levels under the compensated distributor) are stored at 1050. For example, the information can be stored in an intra-level sales volume summary as described herein.

At 1060, the stored intra-level sales volumes are re-used for calculating compensation on other compensated distributors. Using the example of FIG. 8, compensation for distributor 810 can be calculated, re-using the summary information calculated for distributor $A_1$. Such information can be used in concert with summary information calculated for another distributor (e.g., $A_2$).

Example 22

Exemplary Intra-Group Summary

In any of the examples herein, sales volume (e.g., for a plurality of orders) can be accumulated into groups of distributors as an intra-group volume summary. A percentage calculated via asymptotic modulation can then be applied to the accumulated sales volume. For example, group boundaries can be defined with reference to business leaders for such accumulation purposes (e.g., the volume for a group headed by a business leader is accumulated, and the calculated percentage is applied thereto). Other group boundaries can be used.

Example 23

Exemplary Advantages of Intra-Level or Intra-Group Sums

In any of the examples herein, when intra-level sales volumes are summed as described, more efficient operation can result. For example, re-summing the sales volumes for a level can be avoided.

Example 24

Exemplary Compensation in Response to Sales

In any of the examples herein, compensation calculation can be done as volume accumulates during a commission period (e.g., in response to a sale or a certain number or certain volume of sales). Compensation amounts can then already be in place when the commission period ends. A commission period can be a time period (e.g., day, week, month, period of time the program uses to qualify a distributor for a bonus, etc.) Different bonuses can have different commission periods.

Intra-level summaries can be used in conjunction with such an approach.

Example 25

Exemplary Recurring Implementations: Asymptotic

In any of the examples herein, a bonus can be paid by starting with X % (e.g., a starting percentage) and paying a fixed percentage (e.g., modulation factor) of the percentage down each succeeding level (e.g., extendible to infinity). The higher the fixed percentage, the higher the total payout (e.g., target percentage) (e.g., if the starting percentage is 1% and the fixed percentage is 50%, then the total payout is 2%. If the starting percentage is 1% and the fixed percentage is 75%, then the total payout is 4%). This method ensures that more than the target percentage is never paid.

In any of the examples herein, other requirements to qualify (e.g., for the bonus or to be included in another distributor's bonus), such as title, number of levels built, "room," or phase.

In any of the examples herein, compression can be implemented (e.g., levels collapse due to one or more criteria) or unqualified or ineligible distributors can be counted as a level.

Example 26

Exemplary Recycling

In any of the examples herein, on shallower legs, the percentage will not be substantially paid out. Any amount not paid out can be designated as breakage (e.g., remain unpaid), can be recycled by going back to the start of the subject leg and continuing the process until the percentage is substantially fully paid out (e.g., remaining bonus is less than a threshold), or can be recycled by going back to the start of a leg or legs at least X levels deep and continuing the process until the percentage is substantially fully paid out. Such navigation can take place in a paying-out-on-a-distributor perspective.

Example 27

Exemplary Microamounts

In any of the examples herein, bonus amounts less than an underflow threshold (e.g., one hundredth of the prevailing main unit of currency, $0.01, or some similar small amount) can be counted as breakage to the administering company, or can be accumulated and held for the distributor, either for a given period of time or for an indefinite period of time, until they reach an amount that can be paid (e.g., over the same or a different threshold).

Example 28

Exemplary Lineages

In any of the examples herein, the bonus can be based on any type of sponsorship line or lineage, such as the current sponsor lineage, enroller lineage, or a time-based lineage. The bonus calculations can also be based on levels or combinations of levels (e.g., different generational concepts).

Example 29

Exemplary Implementations: Recurring, Non-Continuous Inclusion

In any of the examples herein, non-continuous inclusion can be implemented (e.g., in an asymptotic, time-based scenario, static room assignment, or the like).

The bonus can be flat or increasing percentage for X levels before the fixed percentage is applied.

The bonus can begin to be paid on the Xth level of the compensated distributor's organization rather than beginning with the first level (e.g., start including for bonus purposes at the fifth level).

The bonus can be paid on a subset of the compensated distributor's organization rather than on each level. Examples include:
  Pay on the $3^{rd}$, $6^{th}$, $9^{th}$ level, and so forth
  Pay on the $1^{st}$, $2^{nd}$, $4^{th}$, $8^{th}$, $16^{th}$ level, and so forth
  Pay on the $1^{st}$, $3^{rd}$, $5^{th}$ level, and so forth
  Pay on the $1^{st}$ level and then on every level starting with the $10^{th}$ level
  The bonus can be paid on the organization of a downline. For example:
  The bonus can begin with someone of equal or higher rank and pay down that leg or legs only. It can apply to all ranks or start with a specified rank.

The bonus can be paid on downlines of a given rank.

The bonus can begin with someone in the downline who has reached an equivalent or higher time-based (e.g., static room assignment) status and pay out on that time-based group (e.g., applicable to infinity).

The bonus can be paid on the initial group in a time-based (e.g., static room assignment) scenario.

The bonus can begin with downlines who joined within a given time period and could expire within X time periods.

Example 30

Exemplary Implementations: Skipping

In any of the examples herein, for recurring non-continuous inclusion, a distributor may not be skipped for all compensation calculations, but rather skipped with respect to a particular set of uplines/downlines. If the compensation program pays one distributor on every third level then a first distributor is paid on the first distributor's third level, and paying an other distributor on the first distributor's fourth level and seventh levels and so on, because those are the $3^{rd}$, $6^{th}$, etc. levels for the other distributor.

Example 31

Exemplary Sales Organization

Figure 11:
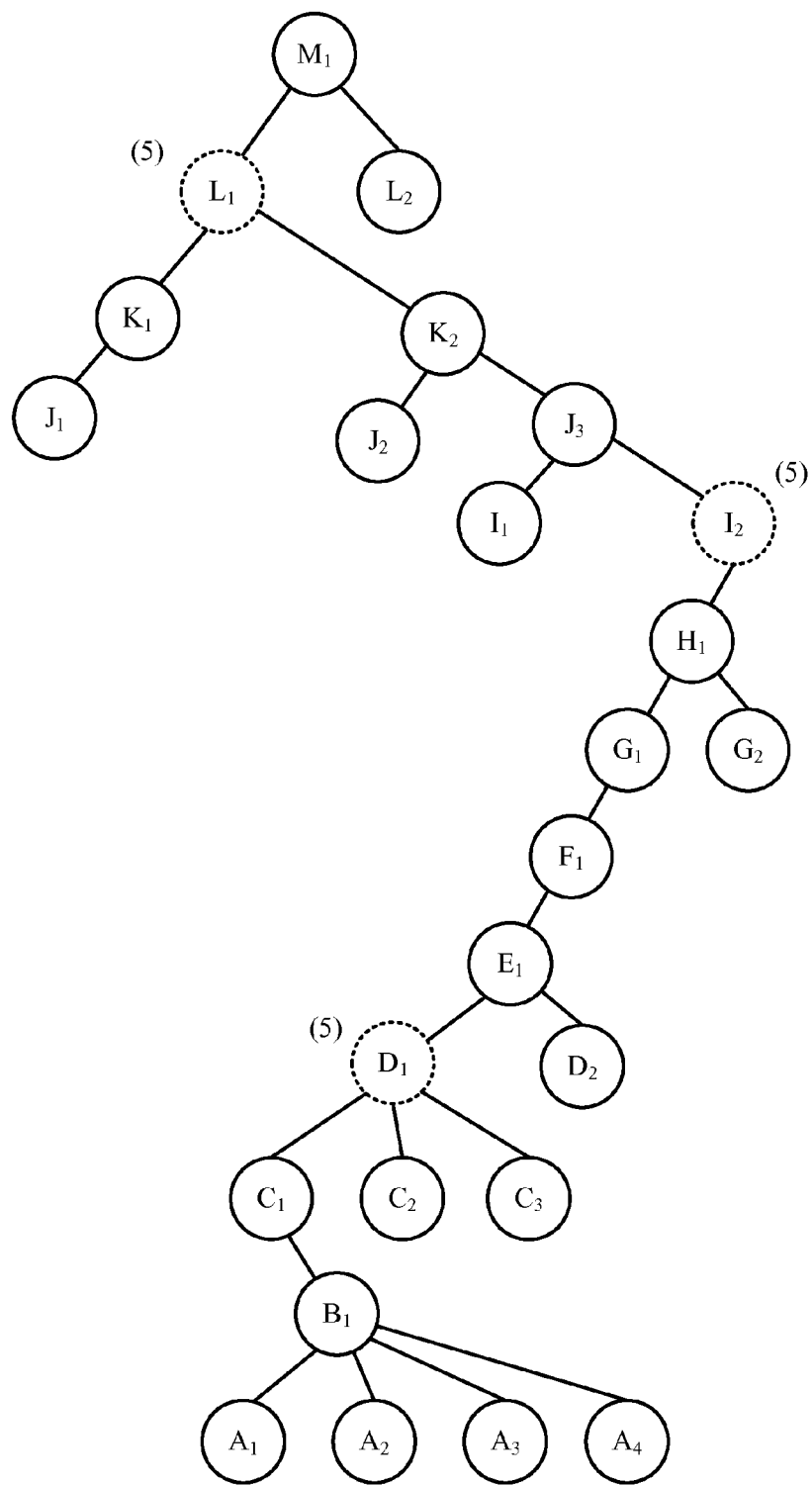
FIG. 11 is a block diagram of an exemplary sales organization comprising a distributor with downline distributors.

FIG. 11 is a block diagram of a sales organization 1100 comprising various distributors. In the example, the downline proceeds to the bottom of the page. The organization 1100 can be represented in a computing device by storing data structures representing the various items and relationships therebetween (e.g., in one or more computer-readable storage media).

With reference to the sales organization, examples of an asymptotic bonus paid on downline of equal or higher rank is shown below.

In the example, to be eligible for the bonus, a distributor must be of a threshold rank (e.g., 5 or) higher, and the bonus is asymptotic, with payment beginning on the downline distributor of equal rank, starting at 1% and paid at 50% rate (e.g., a modulation factor of 0.5) at each succeeding level. L1, I2 and D1 are rank 5. L1 and I2 are both eligible for the bonus because they each have a downline who is rank 5. Two possible payment scenarios are:

|  | Scenario 1 | | Scenario 2 | |
| --- | --- | --- | --- | --- |
| Dist Paid On | I2 Gets | L1 Gets | I2 Gets | L1 Gets |
| Kx | 0% | 0% | 0% | 0% |
| Jx | 0% | 0% | 0% | 0% |
| Ix | 0% | 1% on I2 only | 0% | 1% on I2 only |
| Hx | 0% | .5% | 0% | 1% |
| Gx | 0% | .25% | 0% | 1% |
| Fx | 0% | ..125% | 0% | 1% |
| Ex | 0 | .0625% | 0% | 1% |
| Dx | 1% on D1 only | 03125% | 1% on D1 only | .5% on D1 and 1% on D2 |
| Cx | .5% | .06575% | 1% | .5% |
| Bx | .25% | .0032875% | 1% | .5% |
| Ax | .125% | .00164375% | 1% | .5% |

The scenarios continue in like manner as additional distributors join below level Ax.

Example 32

Exemplary Asymptotic Modulation Factor

As described herein, the asymptotic modulation factor can be selected so that an asymptotic leg exhibits the property that the sum of the percentages for each level (e.g., as the modulation factor is repeatedly applied to a starting percentage) will not exceed a target percentage, even if an asymptotic leg were to be extended to an infinite length. In practice, the sum of the percentages approaches the target percentage without reaching it.

Although not necessary, a target percentage can be received, and an appropriate starting percentage and asymptotic modulation factor derived therefrom. For example, if the target percentage is 2%, then a starting percentage of 1% and a modulation factor of 0.5 can be selected, resulting in series (e.g., 1%, 0.5%, 0.25%), the sum of which converges to 2%.

Thus, a simple derivation of the starting percentage, given an asymptotic modulation factor of 0.5, is as follows:

$$\text{starting percent} = \text{target percent}/2$$

More generally, given an asymptotic modulation factor and a target percentage, the starting percentage can be calculated as:

$$\text{starting percent} = \text{target percent} * (1 - \text{asymptotic modulation factor})$$

Similarly, given a target percentage and a starting percentage, the asymptotic modulation factor can be calculated as:

$$\text{asymptotic modulation factor} = 1 - (\text{starting percent}/\text{target percent})$$

Asymptotic modulation factors can also be chosen so that the resulting percentage series converges to a target percentage, without regard to the above calculations.

Although some examples show application of a uniform asymptotic modulation factor, the factor can change with application. Minor modifications to the factor can be made without affecting the property that the sum of the percentages will not exceed a target percentage, even if the asymptotic leg were to be extended to an infinite length.

Example 33

Exemplary Application of Technologies:
Organization

Figure 12:
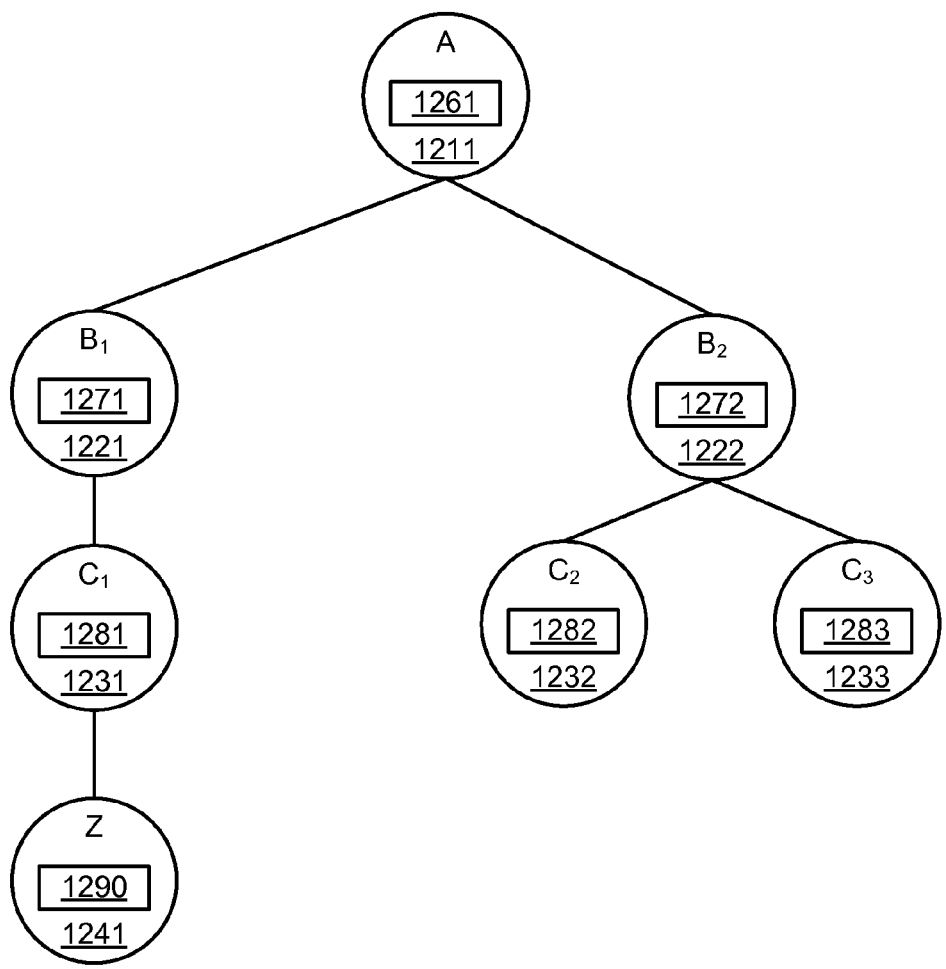
FIG. 12 is a block diagram of an exemplary representation of a sales organization comprising distributors.

FIG. 12 is a block diagram of an exemplary representation 1200 of a sales organization comprising a distributor A 1211 with downline distributors $B_1$ 1221, $B_2$ 1222, $C_{1-3}$ 1231-33, and Z 1241 that can be used in any of the examples described herein. In practice, the representation 1200 can take the form of a data structure, such as a tree, graph, or the like, and distributors can be represented as respective nodes. The data structure can be formed in any number of ways, such as by linking database records representing nodes for the individual distributors, storing distributor nodes in a linked list, or the like.

Nodes can include respective running totals of compensation (e.g., 1261, 1271-72, 1281-83, and 1290). The running totals can be cleared before the overall compensation techniques are applied. Other amounts (e.g., for other compensation programs) can be stored, added, or both, before, after, or during compensation for the described compensation program is calculated.

In any of the examples herein, the representation 1200 of the sales organization can be at least three (3) levels deep. In practice, the sales organization can be more populated and complicated.

Example 34

Exemplary Application of Technologies: Navigating the Organization

Figure 13:
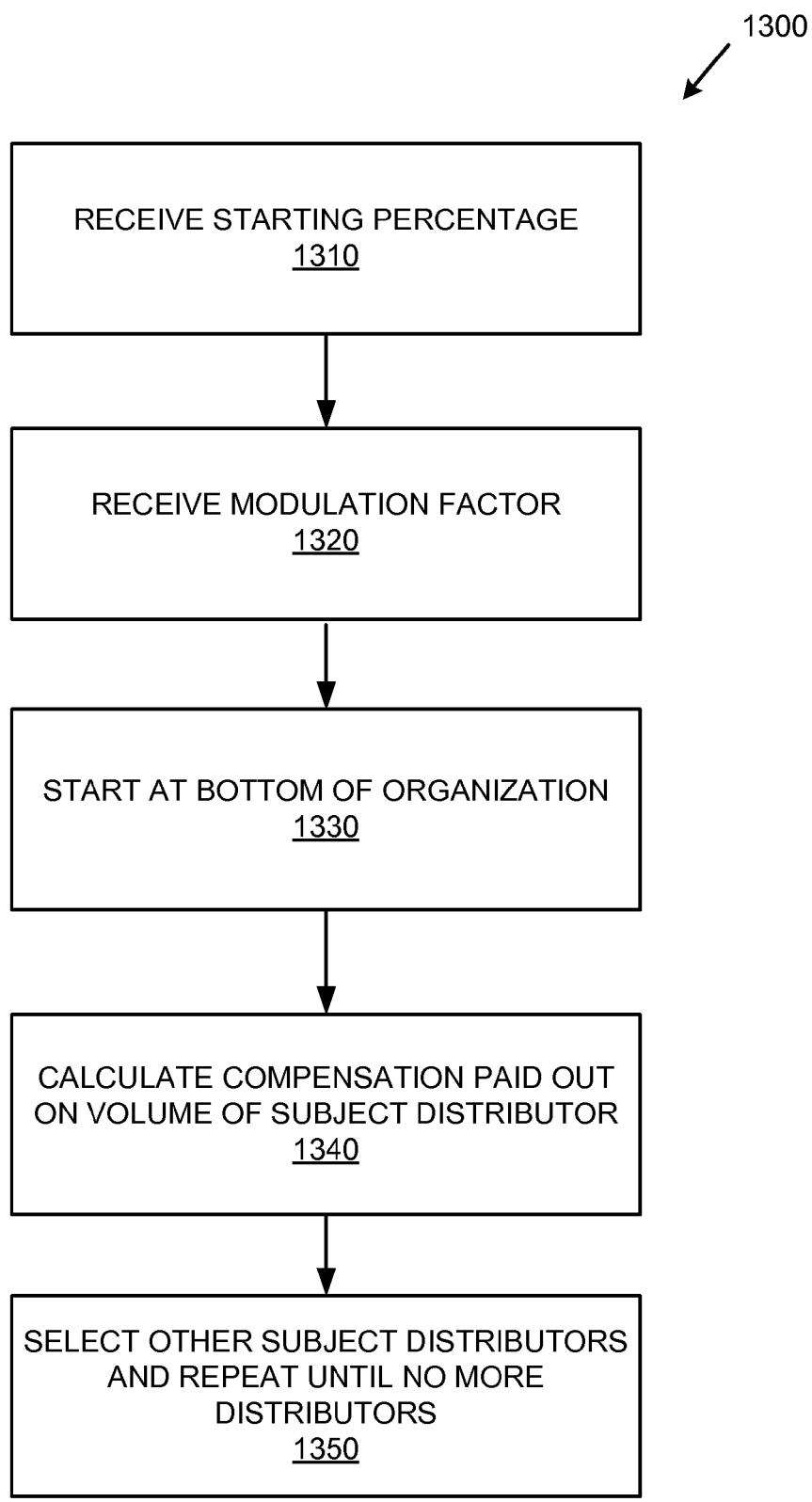
FIG. 13 is a flowchart of an exemplary method of calculating compensation within a sales organization via navigating a representation of the sales organization.

FIG. 13 is a flowchart of an exemplary method 1300 of calculating compensation within a sales organization via navigating a representation of the sales organization (e.g., such as that shown in FIG. 12) and can be used in any of the examples described herein.

At 1310, a starting percentage is received. For example, if a target percentage of 2% and an asymptotic modulation factor of 0.5 is desired, the starting percentage can be 1%.

At 1320, an asymptotic modulation factor is received. For example, a number less than 1.0 can be received.

At 1330, the method starts at the bottom of the organization (e.g., distributor Z 1241).

At 1340, compensation paid out for the subject distributor (e.g., on the volume of the subject distributor) is calculated. Any of the techniques described herein using asymptotic modulation factors can be employed.

At 1350, navigation proceeds (e.g., upward) in the sales organization to select other subject distributors. The method (e.g., 1330-40) is then repeated until there are no more distributors (e.g., the top of the organization is reached). Navigation can be accomplished in a depth-first, breadth-first, or other technique. In practice, compensation need not be paid out for sales volume of a distributor at a top position in the sales organization.

As shown in the example, compensation is shown as calculated from a paying-out-on-a distributor perspective, and running totals for respective distributors are maintained. Compensation is added to the running total until no more subject distributors need to be navigated.

In practice, the method can be performed at regular intervals (e.g., at each pay period). Alternatively, compensation can be calculated on a real-time basis (e.g., as the sales volume figures are updated). In such a case, the method only need be applied to those subject distributors having sales volume activity. Navigation to other distributors can naturally occur during such calculations as shown below.

Example 35

Exemplary Application of Technologies: Calculating Compensation

Figure 14:
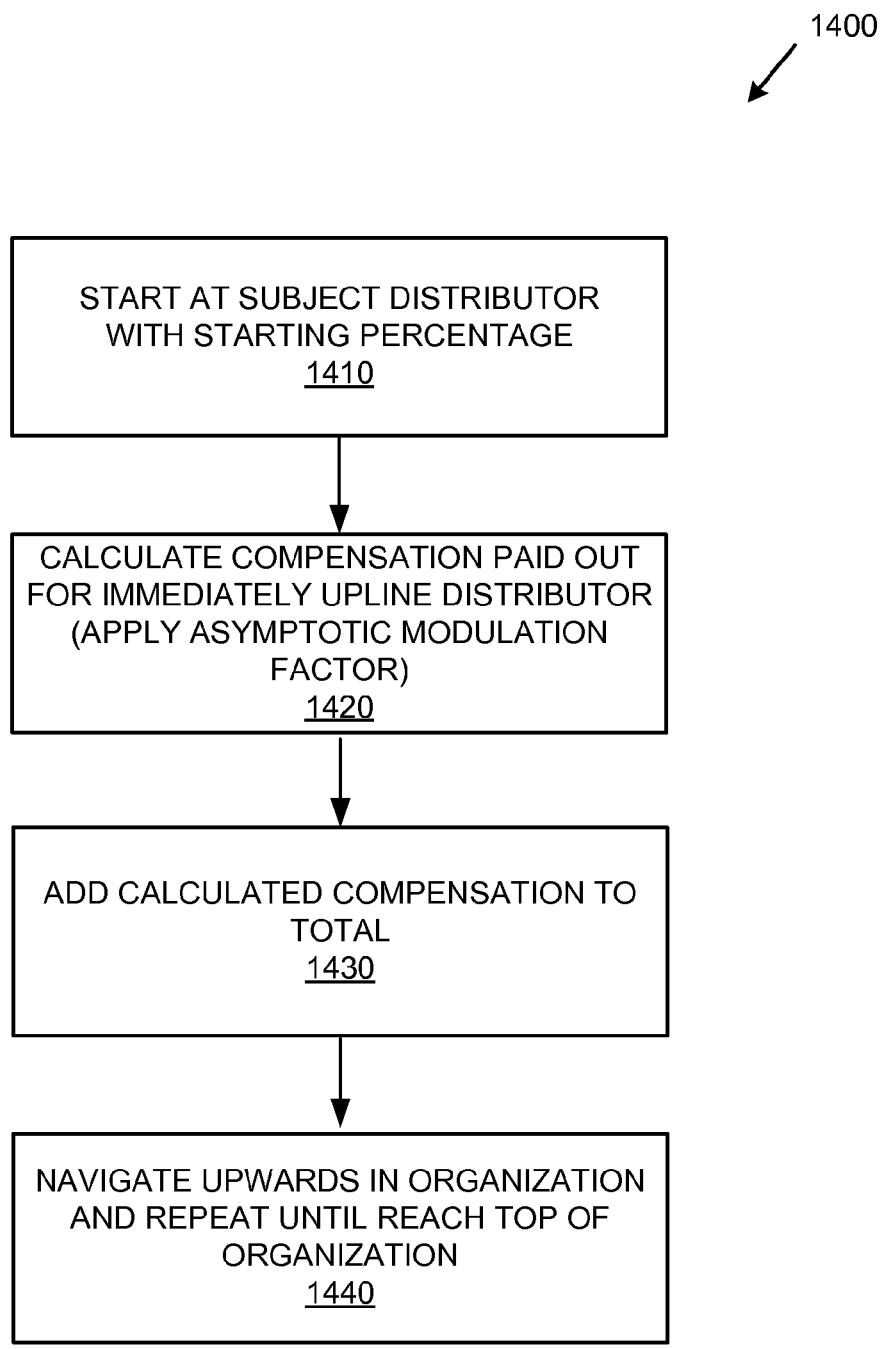
FIG. 14 is a flowchart of an exemplary method of navigating a representation of a sales organization for a subject distributor when calculating compensation.

FIG. 14 is a flowchart of an exemplary method 1400 of navigating a representation of a sales organization (e.g., such as that shown in FIG. 12) for a subject distributor when calculating compensation and can be used in any of the examples described herein, including the example involving FIG. 13.

At 1410, the method starts at a subject distributor with a starting percentage. The sales volume for the subject can be determined.

At 1420, compensation paid out for the immediately (e.g., qualifying) upline distributor is calculated (e.g., by applying the starting percentage to the sales volume). For example, if the (e.g., qualifying) sales volume is $100,000, and the starting percentage is 1%, compensation of $1,000 is calculated. The asymptotic modulation factor can be applied. In practice, the asymptotic modulation factor is typically applied only on subsequent iterations of the calculation (e.g., on the second and subsequent iterations only).

At 1430, the calculated compensation is added to the total compensation for the immediately (e.g., qualifying) upline distributor.

At 1440, navigation continues upward in the organization, and the method (1420-30) is repeated until the top of the organization is reached (compensation paid out to the top of the organization is calculated). The subject distributor does not change, but the distributor to whom compensation is added does progress upward.

The shown percentages are merely examples. In practice, other numbers can be used.

Example 36

Exemplary Application of Technologies: Walk Through

Applying the above techniques can result in the following execution of the compensation program:

Receive a starting percentage of 1% and a modulation factor of 0.5

Start at the bottom of the organization (e.g., Z 1241).

At subject distributor Z 1241

Calculate compensation for $C_1$=Volume(Z)*Percent$_{start}$

Navigate to B1

Calculate compensation for $B_1$=Volume(Z)*Percent$_{start}$*Factor

Navigate to A

Calculate compensation for A=Volume(Z)*Percent$_{start}$*Factor$^2$

Navigate to subject distributor $C_1$ 1231

Calculate compensation for $B_1$=Volume($C_1$)*Percent$_{start}$

Navigate to A

Calculate compensation for A=Volume($C_1$)*Percent$_{start}$*Factor

Navigate to subject distributor $C_2$ 1232

Continue in like manner for other subject distributors.

Accordingly, the total compensation for distributor $B_1$ (e.g., under the program) is the compensation paid out from distributor Z plus the compensation paid out from distributor $C_1$ $$(\text{Volume}(Z)*\text{Percent}_{start}*\text{Factor})+(\text{Volume}(C_1)*\text{Percent}_{start})$$

Any of the techniques described herein (e.g., skipping, limiting to qualifying distributors, etc.) can be incorporated as desired.

Example 37

Exemplary Variation on Technologies: Qualifying High-Level Distributors

In any of the examples herein, an asymptotic modulation compensation program can be limited to qualifying high-level distributors (e.g., distributors with high-level qualifications) in a variety of ways. Such a compensation program can be conducted along with other or separately from other asymptotic compensation programs. For example, those receiving compensation under a compensation program applying asymptotic modulation can be limited to those distributors who qualify under various high-level criteria. Such criteria can be based at least in part on the distributor's organization (e.g., downline). Characteristics such as size, shape, and the like of the distributor's organization can be taken into account.

Figure 15:
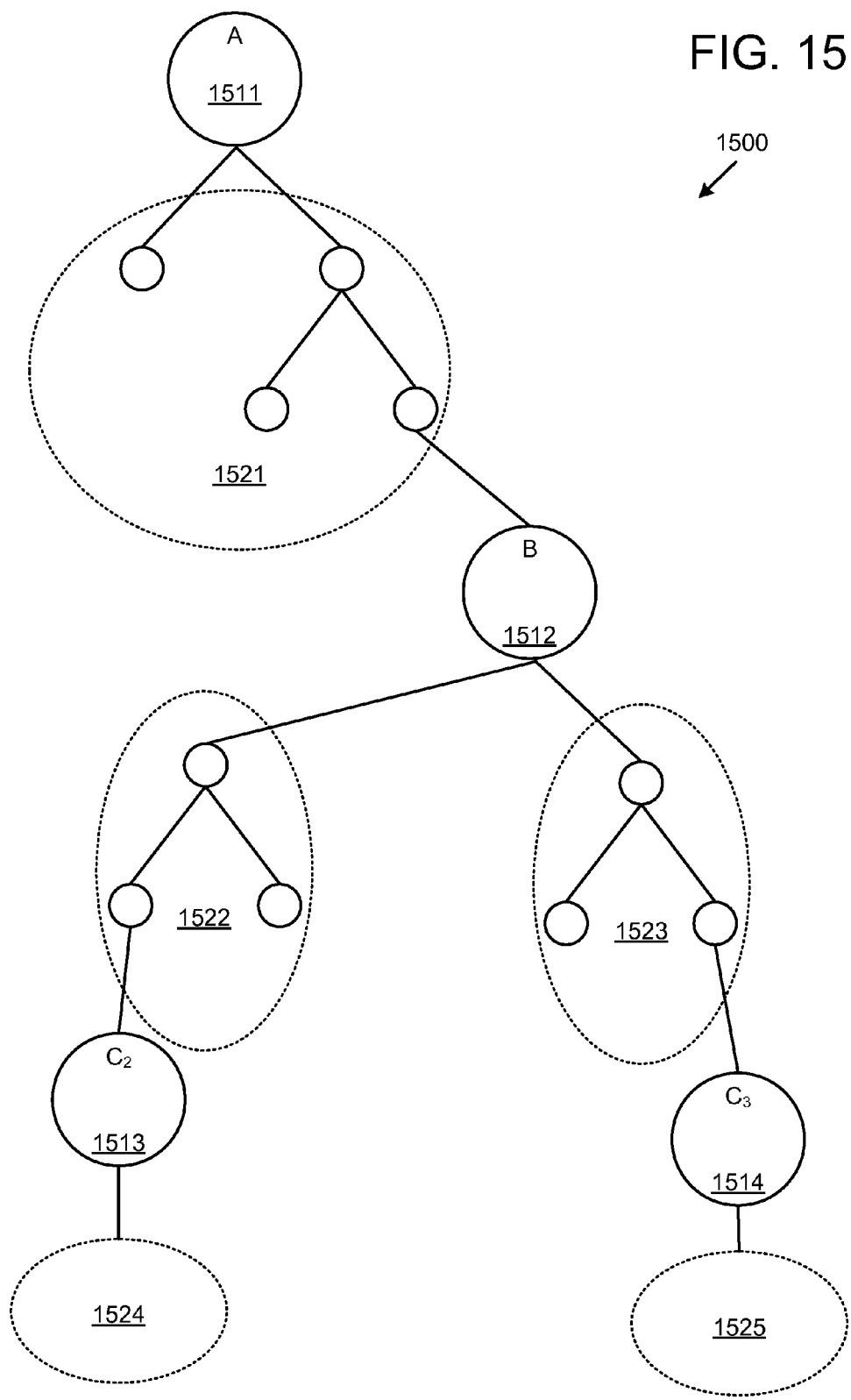
FIG. 15 is a block diagram of a sales organization implementing an asymptotic modulation factor for qualifying distributors.

If desired, the modulation percentage can be applied during navigation as qualifying distributors are traversed (e.g., encountered as progressing downline in the organization). FIG. 15 is a block diagram of a sales organization 1500 implementing an asymptotic modulation factor for qualifying distributors. At least a subset (e.g., distributors 1511 and 1521) of distributors in the organization can be grouped based on high-level qualifications recorded for a qualified distributor (e.g., 1511). Repeatedly applying an asymptotic modulation factor can include applying the factor for the subset and navigating to another portion of the organization.

From a downward navigation perspective, when calculating compensation for the first (e.g., top) distributor 1511 who qualifies in the organization 1500, a starting percentage can be applied to the first qualifying downline distributor 1512, skipping over intermediate non-qualifying distributors 1521. The percentage can be applied to the organizational volume of the first qualifying downline distributor 1512 (e.g., the volume of distributor 1512 and the directly downline non-qualifying distributors 1522 and 1523).

When continuing to calculate compensation for the first distributor 1511, navigation can proceed to another portion (e.g., to the next qualifying downline distributor) of the organization; the modulation percentage can then be applied when the next qualifying downline distributor (e.g., 1513 and 1514) is reached. The resulting percentage can then be applied to the organization volume of the next qualifying downline distributor 1513 and 1514, and so forth.

Similarly, compensation for other qualifying distributors (e.g., 1512) can be calculated.

From an upward navigation perspective, when calculating the compensation paid out for a distributor (e.g., whether qualifying or not), navigation can begin at the bottom of the organization 1500 (e.g., with non-qualifying distributors 1524) with a starting percentage. The starting percentage is typically used to calculate compensation paid out to the first qualifying distributor beyond the immediately qualifying distributor (which could itself be a qualifying distributor if compensation being paid out for a qualifying distributor is being calculated). Another way of describing how compensation paid out is to consider the non-qualifying distributors as part of the organization of their first upline qualifying distributor (and using the same percentage as applied to particular upline qualifying distributors) An intra-group volume summary can be used to facilitate calculation. As navigation continues upward, the modulation factor is applied.

Example 38

Exemplary Application of Technologies: Qualifying Distributors

An exemplary implementation can be called the "Presidential Master Organization Bonus", where a Presidential Master earns ½% of the total Organizational Volume of the first PM downline in any leg, down to but excluding the Organizational Volume of the second Presidential Master down that leg. The Presidential Master earns ¼% of the Organizational Volume of the second PM downline in any leg, down to but excluding the Organizational Volume of the third PM down any leg, and so forth.

An exemplary application of the qualifying distributors technique described above is shown in FIGS. 16 and 17. The qualifying distributors are shown as having the title Presidential Master ($PM_1$, $PM_2$, and $PM_3$). For example, a starting percentage of 0.5% can be used with a modulation factor of 0.5.

Figure 16:
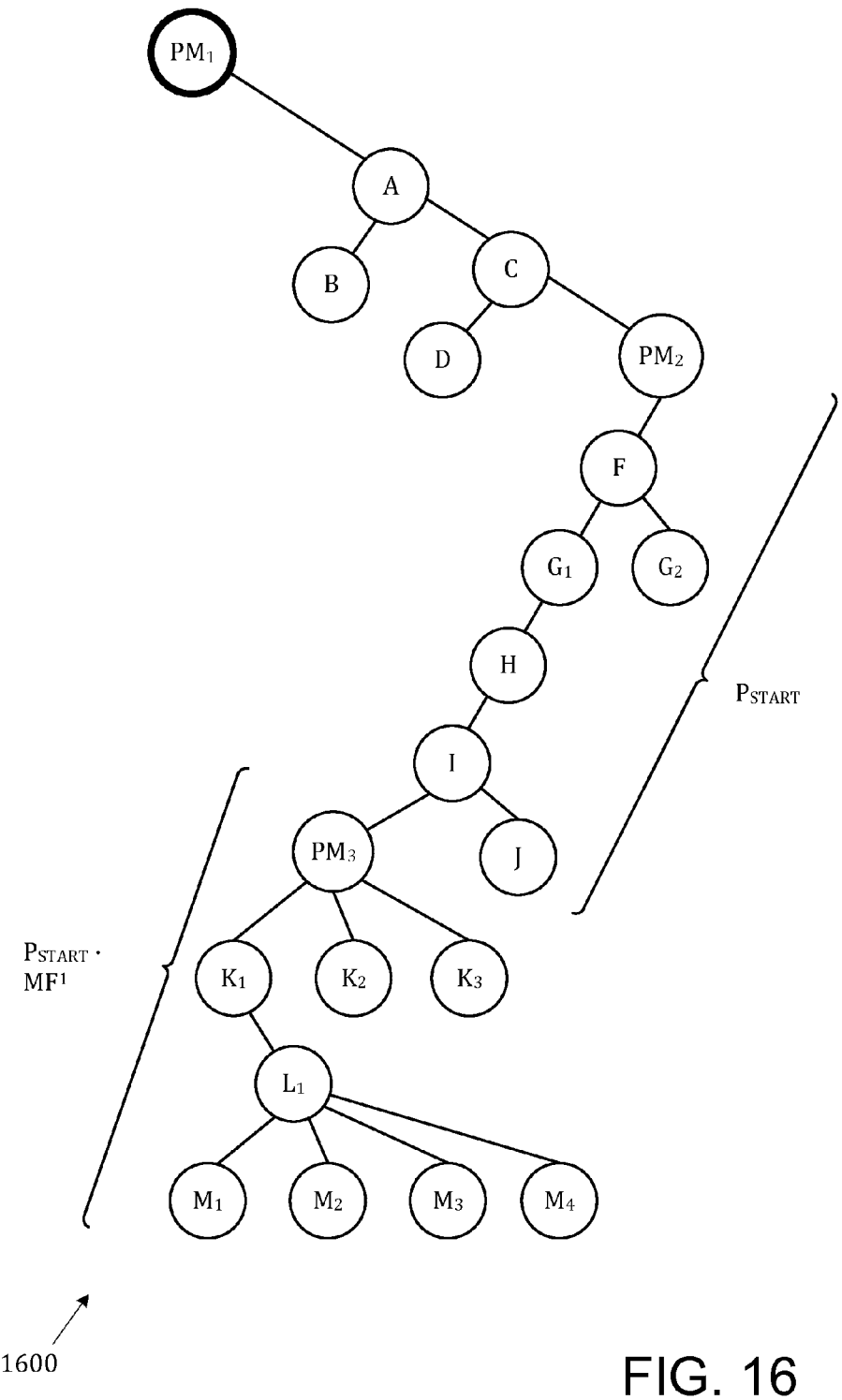
FIGS. 16 and 17 are block diagrams of a sales organization showing implementation of an asymptotic modulation factor for qualifying distributors.

FIG. 16 shows compensation paid under the asymptotic modulation compensation plan to qualifying distributor $PM_1$: the starting percentage (e.g., 0.5%) on the organizational volume of $PM_2$; and the starting percentage modulated once by the modulation factor (e.g., 0.5%*0.5=0.25%) on the organizational volume of $PM_3$, and so forth for downline distributors.

Figure 17:
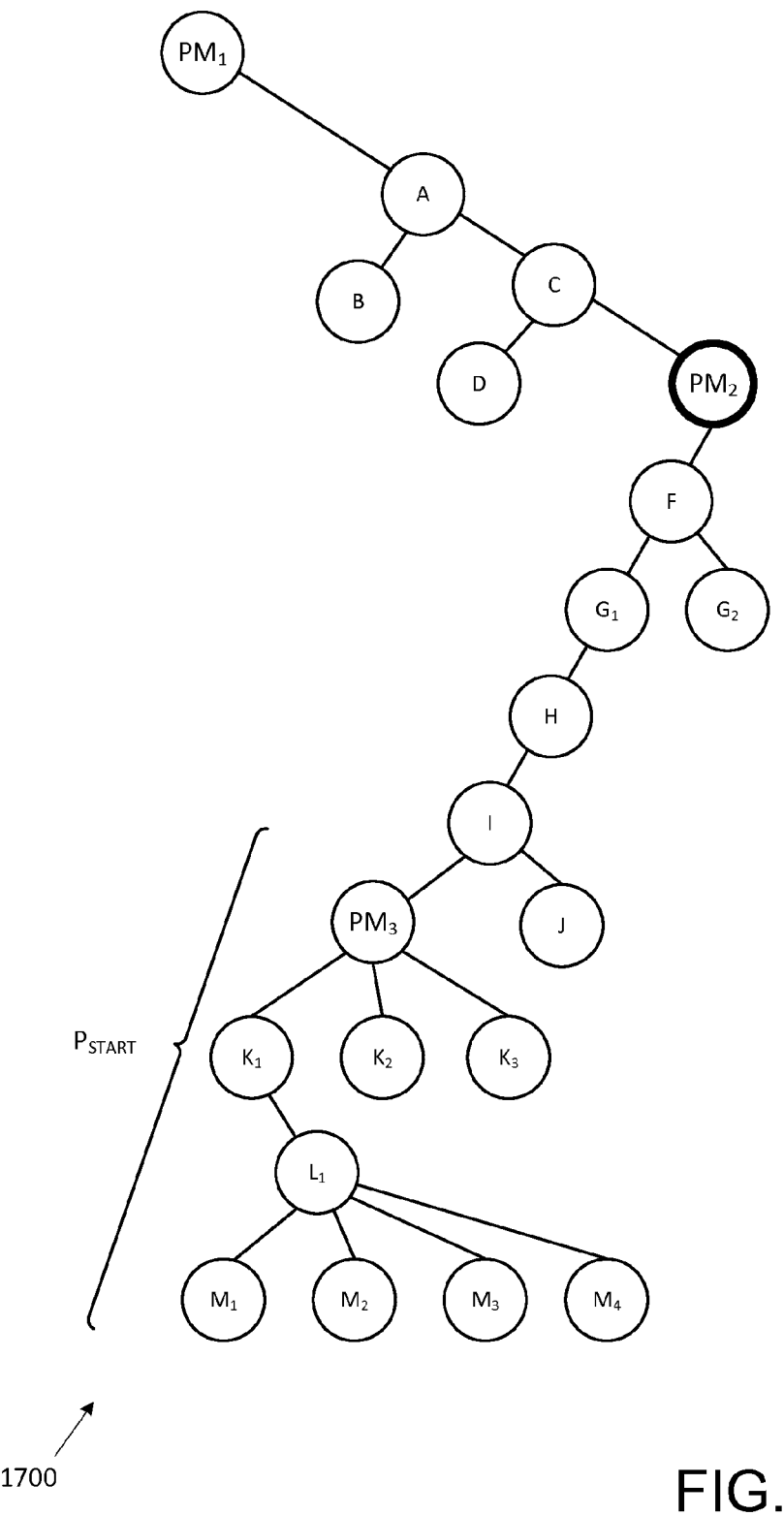

FIG. 17 shows compensation paid under the plan to qualifying distributor PM2: the starting percentage (e.g., 0.5%) on the organizational volume of $PM_3$. Modulation can be applied to any downline distributors according to the same technique.

From a paying-out-on-a-distributor perspective, for the organizational volume of $PM_3$ (e.g., paying out on the distributors in $PM_3$'s organization), the starting percentage is applied for pay out to $PM_2$ (the immediate upline qualifying distributor) and modulation is applied once for pay out to $PM_1$ (the next upline qualifying distributor). Modulation can continue for further upline qualifying distributors.

Example 39

Exemplary Qualifications for Asymptotic Modulation Compensation Program

In any of the examples herein, the qualifications for the asymptotic modulation compensation program can vary. For example, a certain title in the organization may be a prerequisite. The Presidential Master title, for example, can require personal volume requirements, personal group volume requirements, and organizational volume requirements. Such requirements can be checked as part of a method for determining compensation.

Example 40

Exemplary Qualifications for Asymptotic Modulation Compensation Program: Distributed Organization Volume In any of the examples herein, qualifications can include a requirement for distributed organizational volume. For example, a requirement can be imposed that a given amount of organization (e.g., the sub-organization for the distributor) volume must be derived outside of any single leg. In addition, the distributor may be required to have a specified number of business leader legs, and within at least so many (e.g., two) of those legs, there must be at least one business leader who qualifies at a specific threshold title.

Methods described herein can be carried out accordingly. For example, identifying whether a distributor is qualified can include determining that the qualified distributor has organization volume (e.g., determining whether a threshold amount of organization volume is derived outside of any single leg).

Example 41

Exemplary Alternative Qualifications for Asymptotic Modulation Compensation Program: Accelerated Organization Ramp Up Alternative qualifications can be used, such as a requirement for accelerated organization ramp up. For example, for those distributors not qualifying under the above distributed organizational volume requirements, qualification can require more legs, including a specified number who have become business leaders within a specified time frame, but no requirement that any specific organizational volume amount be derived outside of any single leg and no requirement that two legs contain someone of a threshold title.

Methods described herein can be carried out accordingly. For example, identifying whether a distributor is qualified can include determining that the qualified distributor has achieved accelerated organization ramp up (e.g., determining whether a threshold number of legs in the qualified distributor's sub-organization have leaders who have achieved leader status within a threshold time frame).

Still alternatively, titles can be grandfathered according to legacy requirements. Such distributors can qualify with a different type of organizational volume (e.g., business group volume).

Example 42

Exemplary Compensation Structure

Overall compensation can be based on combinations of the programs described herein. For example, so many (e.g., six) generations of leadership/generational bonuses can be paid, a straight percentage of simple (e.g., not time based) ever-descending bonuses and additional bonuses.

Such additional bonuses can be part of a compensation program based on asymptotic modulation and a matching bonus.

Example 43

Exemplary Simple Ever-Descending Bonus

In any of the examples herein, a simple ever-descending bonus can be paid as part of a compensation plan. For example, a certain percentage (e.g., 8%) can be paid to a distributor of a particular title. The distributor can receive the entire percentage or a portion of that percentage on the sales volume of downline distributors, depending on the downline distributors' particular titles, until a distributor of equal or higher title is encountered. The bonus then continues through the downline, but is paid to the distributor of equal or higher title (e.g., until another distributor of equal or higher title is encountered).

Example 44

Exemplary Matching Bonus

Distributors having a title meeting a threshold (e.g., Senior Key Coordinator) can be eligible for a matching bonus. Such distributors can receive a specified percentage of the ever-descending bonus earned by the first leader of equal title down any leg (e.g., unless there is an intervening leader of higher title). The specified percentage can depend on the title involved and can vary within a range (e.g., 10%-25%).

Example 45

Exemplary Sales Organization

Figure 18:
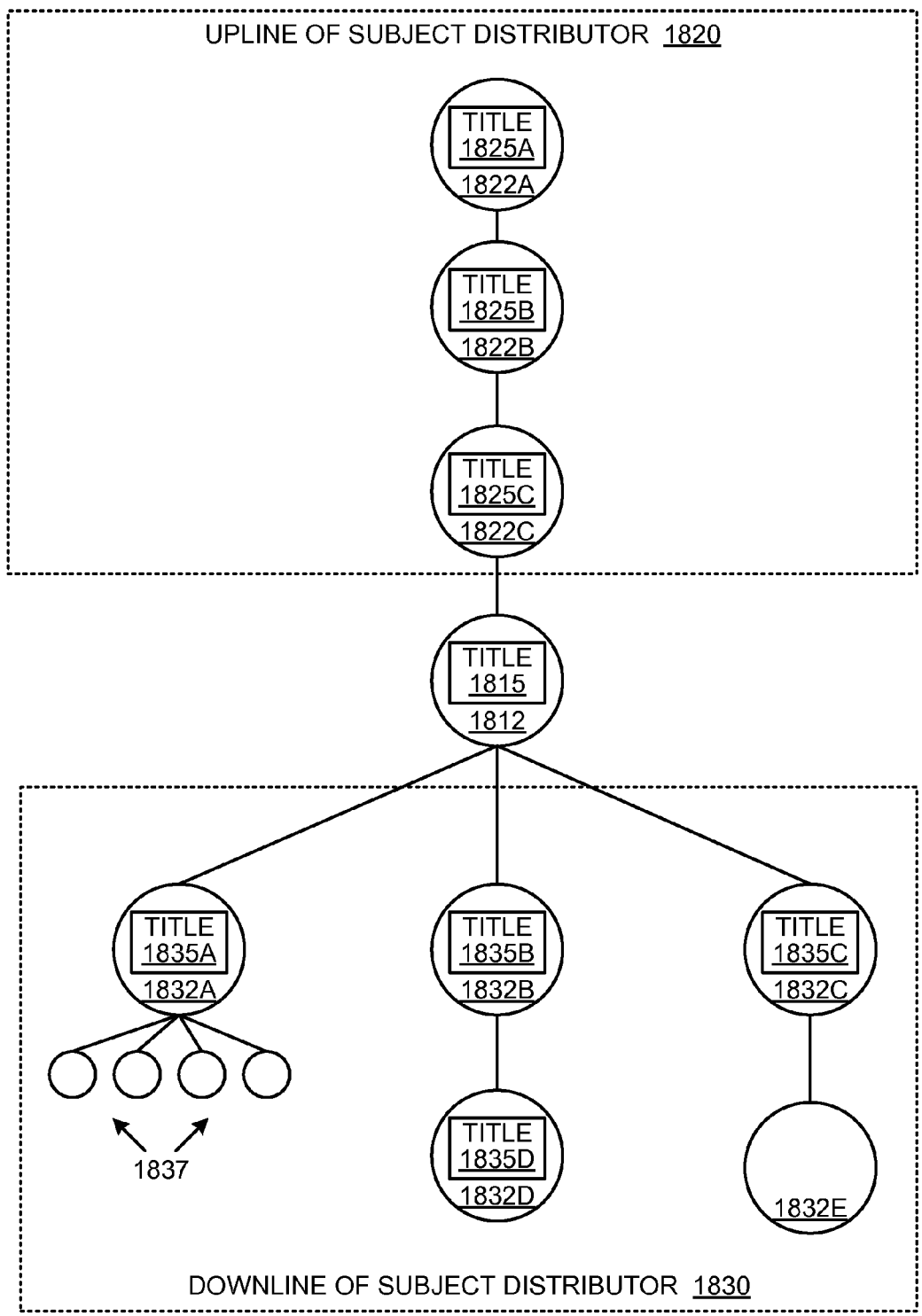
FIG. 18 is a block diagram of a sales organization comprising a distributor with upline distributors and downline distributors.

FIG. 18 is a block diagram of a sales organization 1800 comprising a distributor 1812 with upline distributors and downline distributors. In the example, the subject distributor 1812 has an upline 1820 and a downline 1830. The organization 1800 can be represented in a computing device by storing data structures representing the various items and relationships therebetween (e.g., in one or more computer-readable storage media).

The upline 1820 of the subject distributor comprises three distributors 1822A-C with respective titles 1825A-C. In practice, the upline 1820 can have more levels (e.g., distributors above distributor 1822A).

The downline 1830 of the subject distributor comprises distributors 1832A-D and, for purposes of illustration, a customer 1832E. In practice, the downline 1830 can have more distributors, more levels, and more customers. For example, additional distributors 1837 may be under a downline distributor 1832A. The downline distributors are also shown as having titles 1835A-D.

In the example, the customer 1832E is shown without a title. Such an arrangement can be used to distinguish between titled and untitled persons in the organization. Alternatively, the customer 1832E can be assigned a title of "customer." The customer 1832E is ordinarily considered as outside of the sales organization, but may be part of another sales organization not participating in the compensation program.

Example 46

Exemplary Method of Implementing Commission Program

Figure 19:
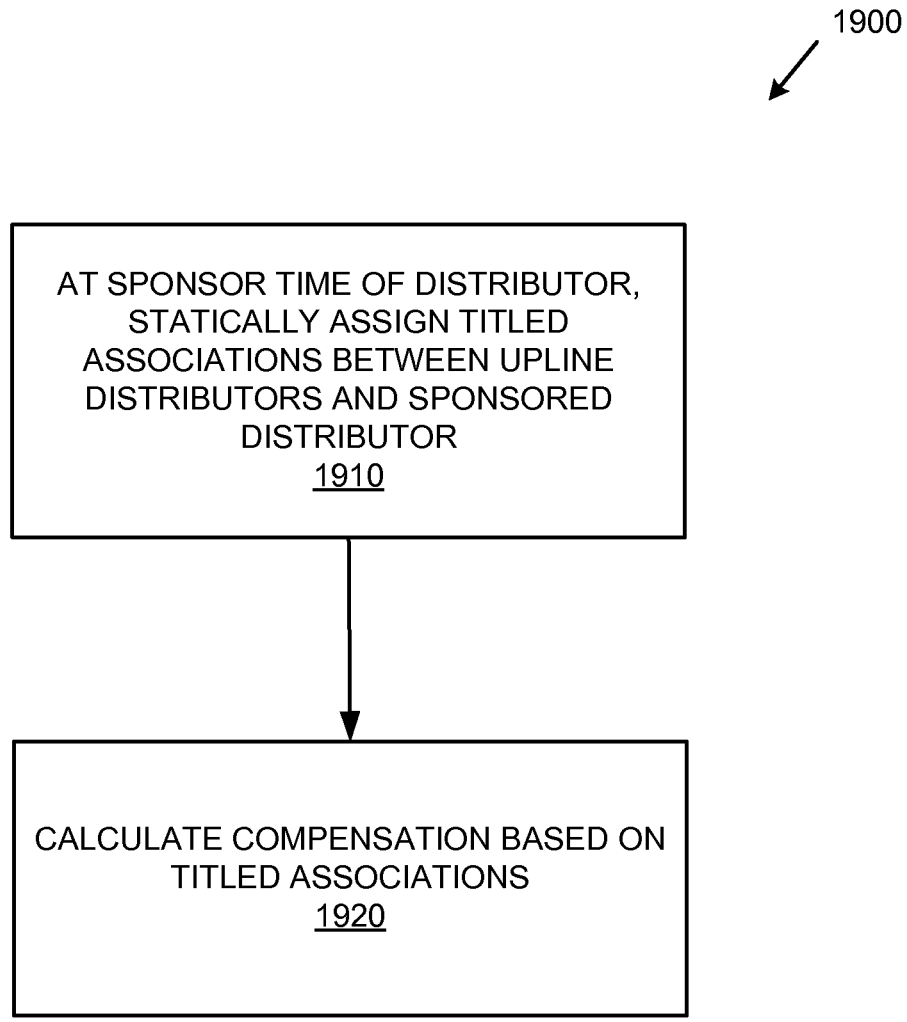
FIG. 19 is a flowchart of an exemplary method of implementing a compensation program for distributors via static distributor association assignment.

FIG. 19 is a flowchart of an exemplary method 1900 of implementing a compensation program for distributors via static distributor association assignment and can be used for a sales organization such as that shown in FIG. 18. The method 1900 and any of the other methods herein can be performed by computer-executable instructions stored in one or more computer-readable media (e.g., storage or other tangible media) or stored on a computer program product.

At 1910, at sponsor time of a subject distributor in the sales organization (e.g., when the distributor is sponsored, based on when the distributor is sponsored, or the like), titled distributor associations are statically assigned between upline distributors and the subject distributor.

At 1920, a compensation amount is calculated based on the titled distributor associations. Compensation can then be awarded based on sales according to the associations.

The method 1900 can be reiterated and applied to new distributors when the sponsored distributor sponsors new distributors. The titles may have changed (e.g., one or more distributors have advanced in title), so the new titles in place at the time of sponsorship of the new distributors can affect how the method 1900 is applied to new distributors.

Although not explicitly shown, in practice, the compensation amount can be stored (e.g., in one or more computer-readable media). The amount can then be awarded to appropriate distributors.

Example 47

Exemplary Compensation Award

In any of the examples herein, awarding compensation can comprise calculating a currency (e.g., dollar) amount and transferring the currency amount to a distributor. Transfer can be accomplished via mailing a check, electronic funds transfer, or the like. Compensation need not be monetary and can take the form of points that might be redeemed in various ways as part of a point system.

Example 48

Exemplary Titled Distributor Associations

In any of the examples herein, a titled distributor association can represent a directed relationship between two distributors in terms of a title. So, for example, a first distributor can be designated as holding an association with a second distributor for a particular title. In practice, such an association can implement the titled rooms as described herein. For example, distributor A can be said to be appearing in distributor B's $Title_2$ room.

The titled distributor associations can be used when determining compensation.

Example 49

Exemplary Titled Rooms

In any of the examples herein, a room can have a distributor assigned to it (e.g., by storing a distributor identifier of the distributor as associated with the room). The rooms for a subject distributor can be associated with respective title names. The number of titles can vary depending on the program. If desired, multiple titles can be assigned to a single room, but the rooms can still be ordered by the title names. For convenience, a title name is sometimes called simply a "title."

By convention, the titled rooms are shown as being a horizontal set of rooms ordered from left to right, with the leftmost room having the lowest title name, and the rightmost room having the highest title name. However, such depiction is by convention only, and different arrangements can be used with the technologies described herein.

Example 50

Exemplary Static Assignment

In any of the examples herein, assignment of titled distributor associations and assignment of distributors to titled rooms can be done statically. Static assignment can be implemented by maintaining assignment of the distributors (e.g., in a titled room or upline assignment summary), regardless of whether distributors assigned to the titled rooms advance in title or the distributor to which the distributors are assigned advances in title.

Thus, if bonuses are paid based on static assignment, the result is that bonuses based on the assignment can be paid to a distributor indefinitely into the future.

Bonuses based on such static assignment can be called "go-forward" bonuses because they can continue into the future indefinitely.

To achieve such static assignment in an efficient manner, various techniques described herein can be applied.

Example 51

Exemplary Upline Assignment Summaries

In any of the examples herein, an upline assignment summary can be stored for a distributor (e.g., in one or more computer-readable media). The upline assignment summary can be defined recursively in that the summary of a sponsored distributor can be based on the upline assignment summary of the immediately upline distributor (e.g., sponsoring distributor) at the time the sponsored distributor was sponsored. As described herein, the sponsoring distributor can occupy the first n entries in the summary if the sponsoring distributor has a title of level n at the time the sponsored distributor is sponsored.

In practice, the upline assignment summary can indicate to which titled rooms a subject distributor is assigned. The assignment summary can help reduce the amount of computation needed to determine room assignments because it effectively keeps a running history in a compact footprint. Upline assignment summaries can thus be useful to implement static assignment.

Example 52

Exemplary Titled Distributor Associations

Figure 20A:
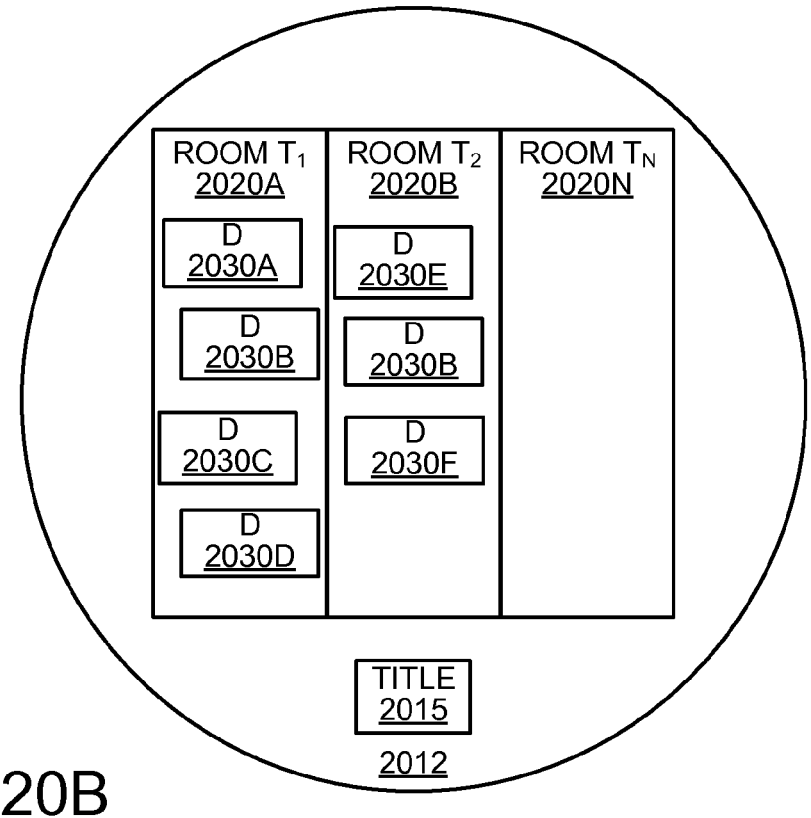
FIG. 20 is a block diagram showing exemplary systems for representing titled distributor associations.
Figure 20B:
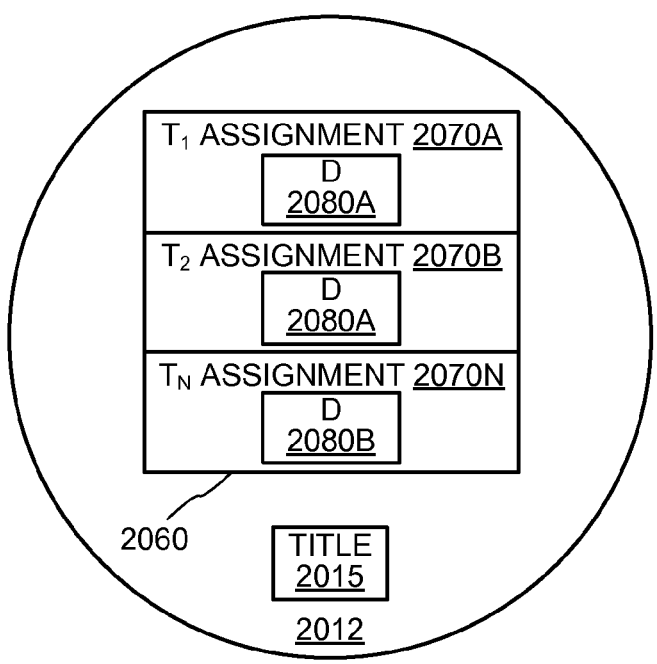

FIG. 20 is a block diagram showing exemplary systems 2012 for representing titled distributor associations. FIG. 20A shows titled rooms 2020A-N, and FIG. 20B shows an upline assignment summary 2060. In practice, both arrangements can be implemented in a single representation 2012 of a distributor.

In the example, a representation 2012 of a distributor includes a title name 2015 for the distributor. For purposes of convenience herein, a representation 2012 is sometimes simply called a "distributor."

FIG. 20A shows that a distributor 2012 can have a plurality of titled rooms 2020A-N. In the example, the titled room 2020A has the title $T_1$. In practice, an actual title name can be used (e.g., "coordinator"). Downline distributors 2030A-F can appear in respective of the distributor rooms. As shown, a distributor 2030B can appear in more than one titled room. And, a titled room 2020N can be empty (e.g., if the distributor has not yet reached the title or has not yet sponsored anyone after having reached the title).

FIG. 20B shows that a subject distributor 2012 can have a plurality of titled entries 2070A-N in an upline assignment summary 2060. For each titled entry, there is an assigned upline distributor 2080A-B. As shown, a single upline distributor 2080A can appear in more than one entry of the summary 2060 (e.g., if the distributor directly sponsored the subject distributor). The summary 2060 can be consulted when the subject distributor 2012 sponsors new distributors.

Example 53

Exemplary Upline Assignment Summary Equivalence with Titled Rooms

Figure 21:
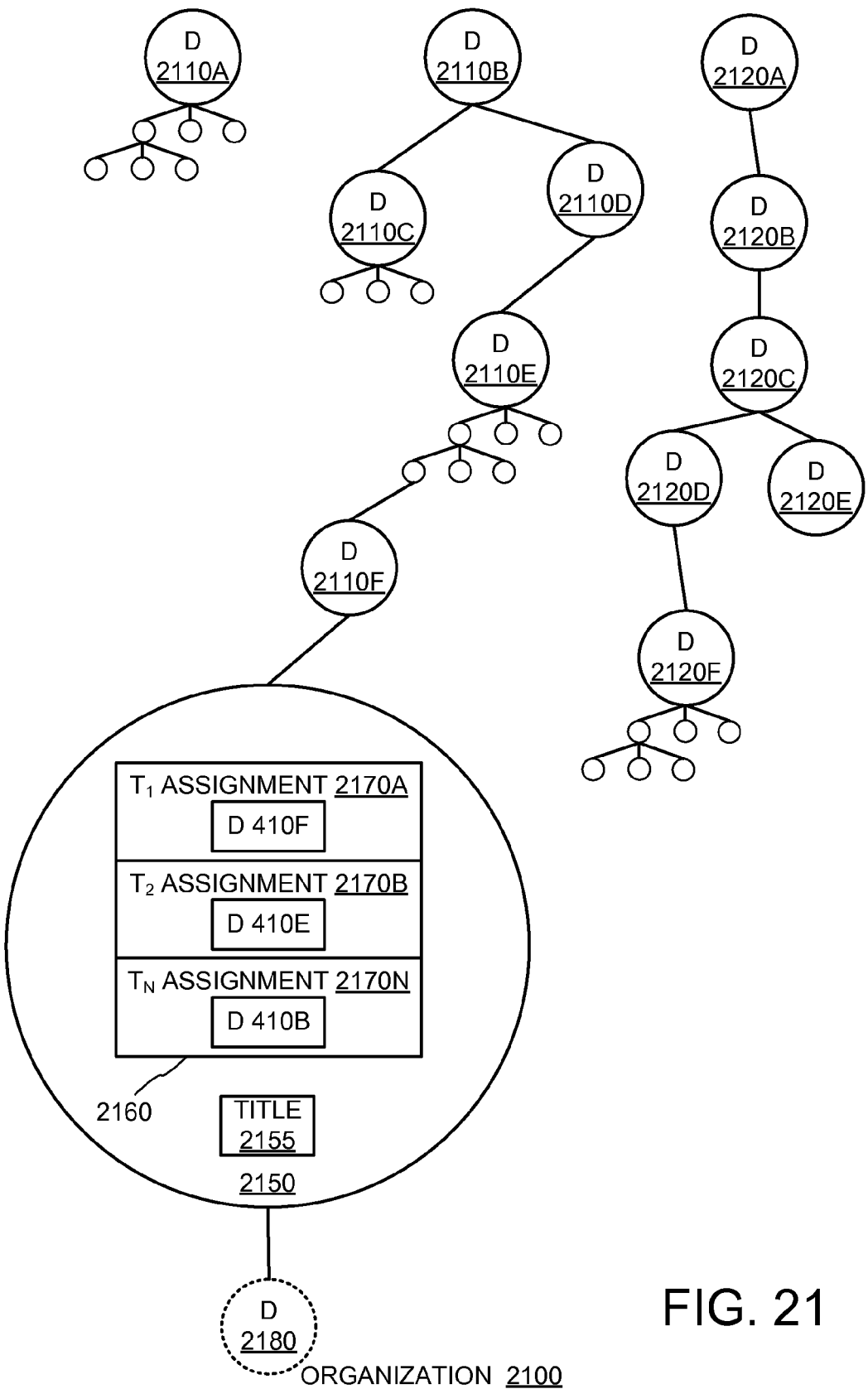
FIG. 21 is a block diagram of an exemplary representation of an organization and an upline assignment summary.

FIG. 21 is a block diagram of an exemplary representation of an organization 2100 and an upline assignment summary 2160. In practice, a title name 2155 is also stored. In any of the examples herein, an upline assignment summary can have an equivalent titled room assignment.

The assignment summary 2160 has a plurality of entries 2170A-N that indicate titled room assignments for the distributor 2150 (e.g., to which rooms the distributor 2150 is assigned). In the example, the distributor 2150 is assigned to distributor 2110F's $T_1$ room, distributor 2110E's $T_2$ room, and distributor 2110B's $T_N$ room. Thus, a subject distributor's assignment summary entry for $T_x$ indicates that the subject distributor is assigned to the $T_x$ room of the distributor listed in the entry.

Storing an assignment entry 2160 can improve efficiency when determining compensation amounts. For example, if the assignment entry 2160 were not present and instead titled room assignments were stored for each distributor, to determine the compensation for a distributor, the organization would need to be searched to determine in which rooms the distributor appears. Such an approach could require searching many distributor nodes.

Further, if titled room assignments were not stored for each distributor, the problem could become even more complex. A determination of what titles were held by sponsoring upline distributors at the time they sponsored other upline distributors could be performed, but many dates would have to be stored and consulted.

Accordingly, when determining compensation, or when determining room assignments for a sponsored distributor 2180, having the upline assignment summary 2160 can be more efficient.

Example 54

Exemplary Associations: Rooms

Figure 22:
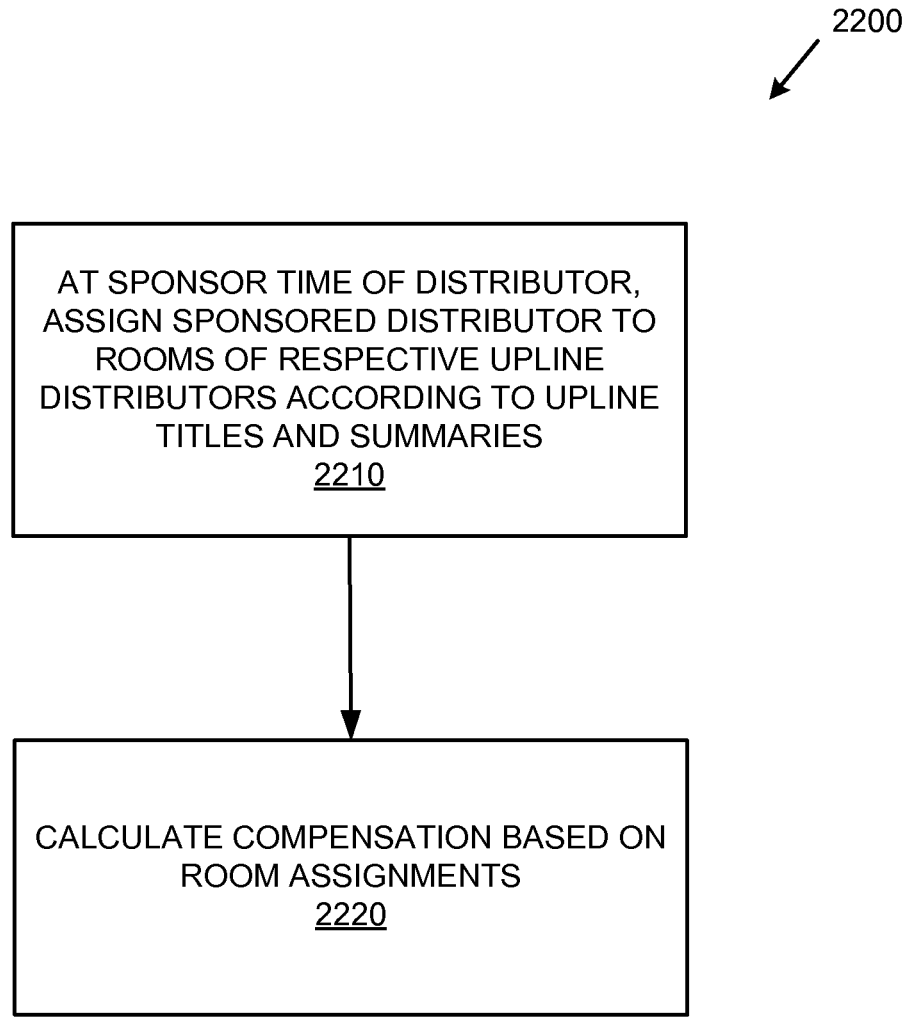
FIG. 22 is a flowchart of an exemplary method of assigning a sponsored distributor to titled rooms.

FIG. 22 is a flowchart of an exemplary method 2200 of assigning a sponsored distributor to titled rooms. At 2210, when a subject distributor is being sponsored, the sponsored distributor is assigned to titled rooms of respective upline distributors according to at least one title of an upline distributor and at least one upline assignment summary.

In practice, the title and summary of the immediately upline (e.g., sponsoring) distributor can be used.

At 2220, compensation is calculated based on the titled room assignments. For example, percentages associated with the titles of the titled rooms can be used to determine an appropriate compensation amount.

Example 55

Exemplary Associations: Upline Summary

Figure 23:
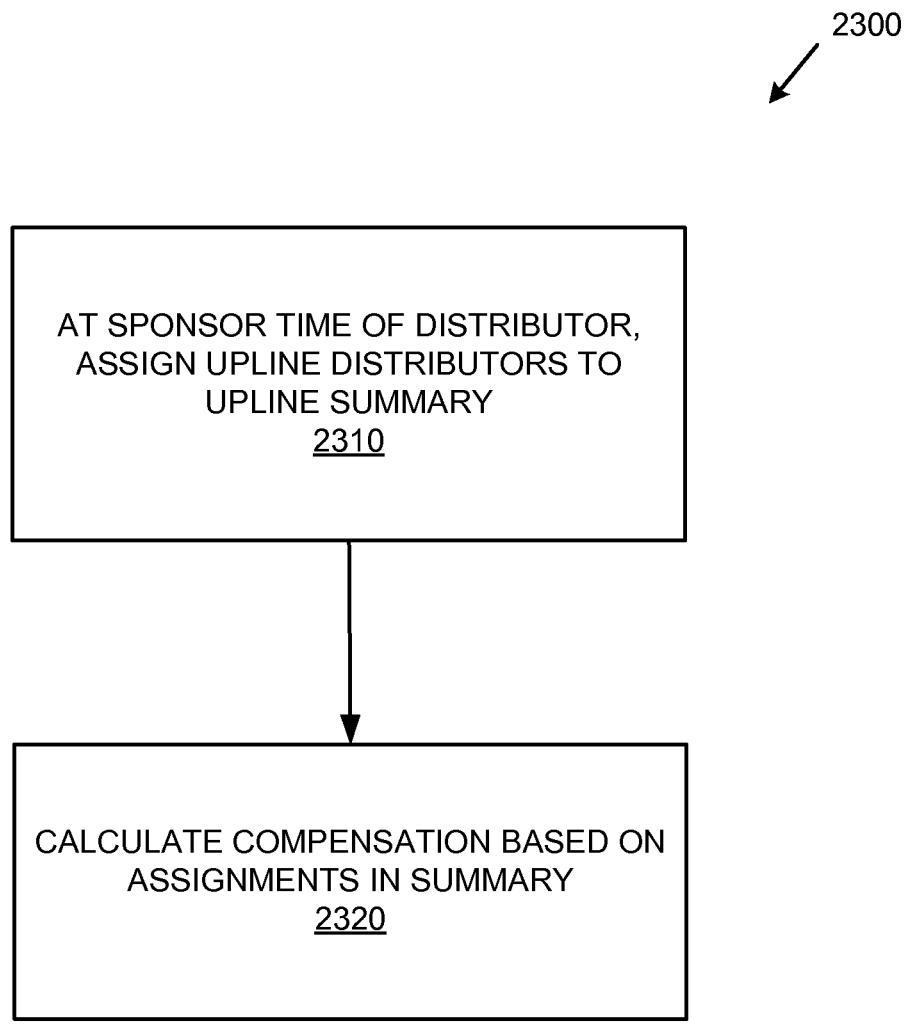
FIG. 23 is a flowchart of an exemplary method of assigning upline distributors to an upline assignment summary.

FIG. 23 is a flowchart of an exemplary method 2300 of assigning upline distributors to an upline assignment summary.

At 2310, when the subject distributor is being sponsored, upline distributors are assigned to the upline assignment summary. For example, if a sponsoring distributor of title n sponsors a subject distributor, the sponsoring distributor can occupy the first n entries of the upline assignment summary. The remaining entries can be taken from (e.g., copied from) the sponsoring distributor's assignment summary. The assignments of the summary can be used to determine to which rooms the subject distributor is assigned. For example, if the summary shows that a first distributor is assigned to the second entry, the subject distributor can be placed in the second room of the first distributor.

At 2320, compensation can be based on assignments in the summaries. Because the assignments match the titled room assignments, either technique can be used to calculate compensation. When compensation is based on sales by the sponsored distributor, a sales-based commission can be allocated based on sales by the sponsored distributor among distributors appearing in entries of the assignment summary according to percentages associated with respective entries (e.g., title names) of the assignment summary as described herein.

Example 56

Exemplary Compensation Calculation: Compensated Distributor

Figure 24:
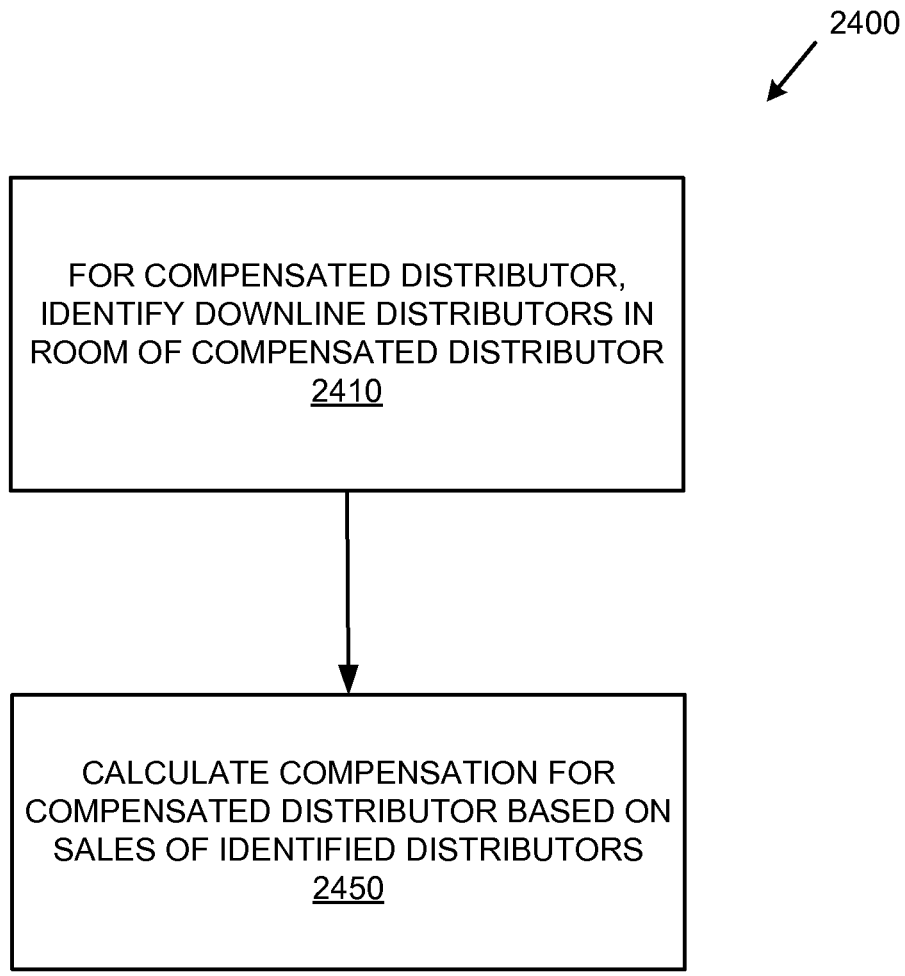
FIG. 24 is a flowchart of an exemplary method of calculating compensation from a compensated distributor perspective.

FIG. 24 is a flowchart of an exemplary method 2400 of calculating compensation from a compensated distributor perspective and can be used in conjunction with the method of FIG. 19.

At 2410, for a compensated distributor, the downline distributors appearing in a titled room of the compensated distributor are identified.

At 2450, compensation (e.g., a bonus) is calculated for the compensated distributor based on sales of the identified distributors. Thus, compensation can be based on a plurality of distributors. The compensation can be calculated as the sum of compensations for the respective distributors. Compensation can then be awarded accordingly. The method 2400 can be performed for respective titled rooms of the compensated distributor. The technique shown can be performed for each distributor in the organization to determine compensation.

Example 57

Exemplary Multi-Tiered Compensation

In any of the examples herein, when calculating a bonus, the room in which the compensated distributor appears can result in different compensation (e.g., different percentages). So, for example, if a compensated distributor appears in a room associated with a first title name, a first percentage can be used (e.g., a percentage associated with the title name). If the compensated distributor appears in a room associated with a second title name, a second percentage different from the first can be used. Some title names may have the same percentages. The percentages can be chosen to balance factors such as the amount of work involved, motivation to the compensated distributor, and sustainability of the program.

Example 58

Exemplary Multiple Rooms

In any of the examples herein, a distributor can appear in multiple entries of an upline assignment summary of another distributor. For example, a high-ranking distributor who directly sponsors a new distributor can be assigned to all entries of the new distributor. When room assignments are based on the summary, the new distributor can thus be assigned to all titled rooms of the high-ranking distributor.

Example 59

Exemplary Sales

In any of the examples herein, the sales used to determine compensation for the static titled room assignment compensation program can be determined in a variety of ways. For example, sales on an ongoing basis can be evaluated on a periodic (e.g., monthly, quarterly, or the like) basis and used to calculate compensation.

Sales can be limited to a particular product, family of products, multiple product lines, or include all sales by the distributor. If desired, sales can include not only sales by the distributor but by those related to (e.g., downline from) the distributor. Or, as described herein, sales by individual distributors can be used in a series of calculations (e.g., for multiple distributors) to achieve a summing effect of sales by different distributors.

Example 60

Exemplary Compensation Calculation: Selling Distributor

Figure 25:
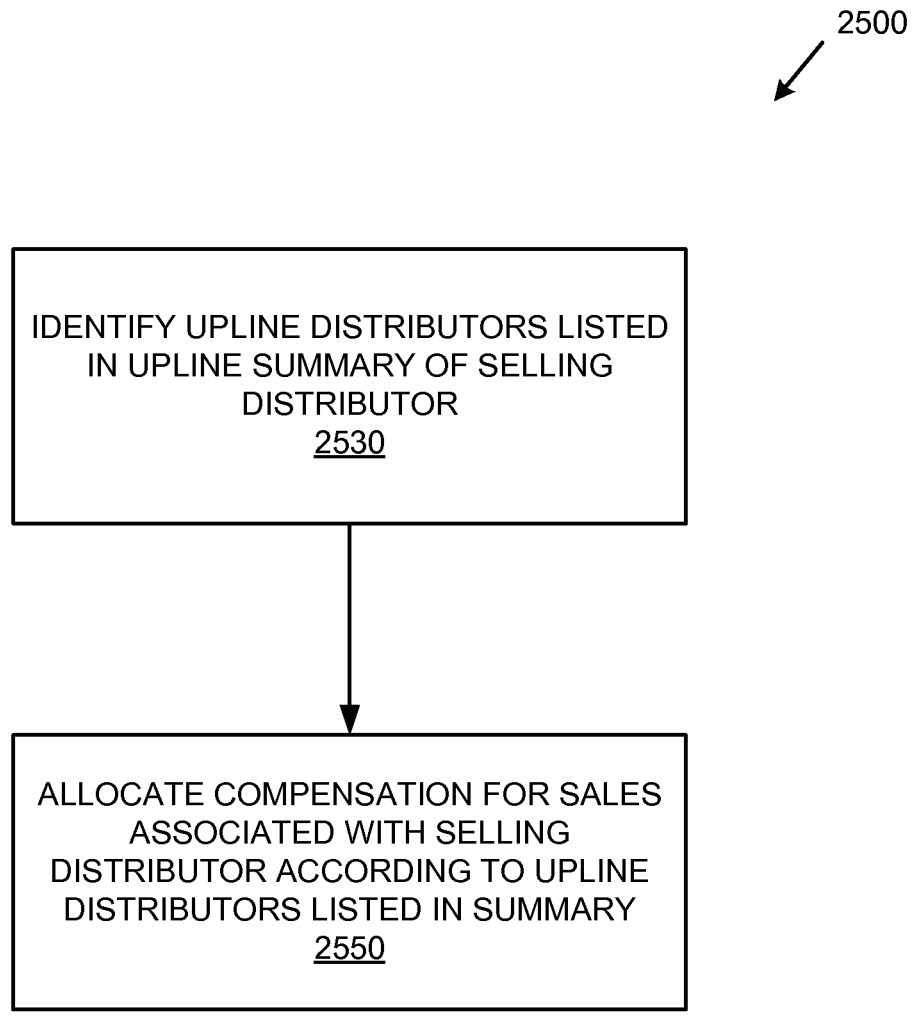
FIG. 25 is a flowchart of an exemplary method of calculating compensation from a selling distributor perspective.

FIG. 25 is a flowchart of an exemplary method 2500 of calculating compensation from a selling distributor perspective.

At 2530, the upline distributors listed in the upline assignment summary of the selling distributor are identified.

At 2550, compensation for sales associated with the selling distributor is allocated to upline distributors listed in the summary of the selling distributor. As described herein, the title names associated with the summary entries can be used to determine how the compensation is allocated (e.g., what percentage is applied to sales). Compensation can then be awarded accordingly.

Example 61

Exemplary Compensation Calculation

Figure 26:
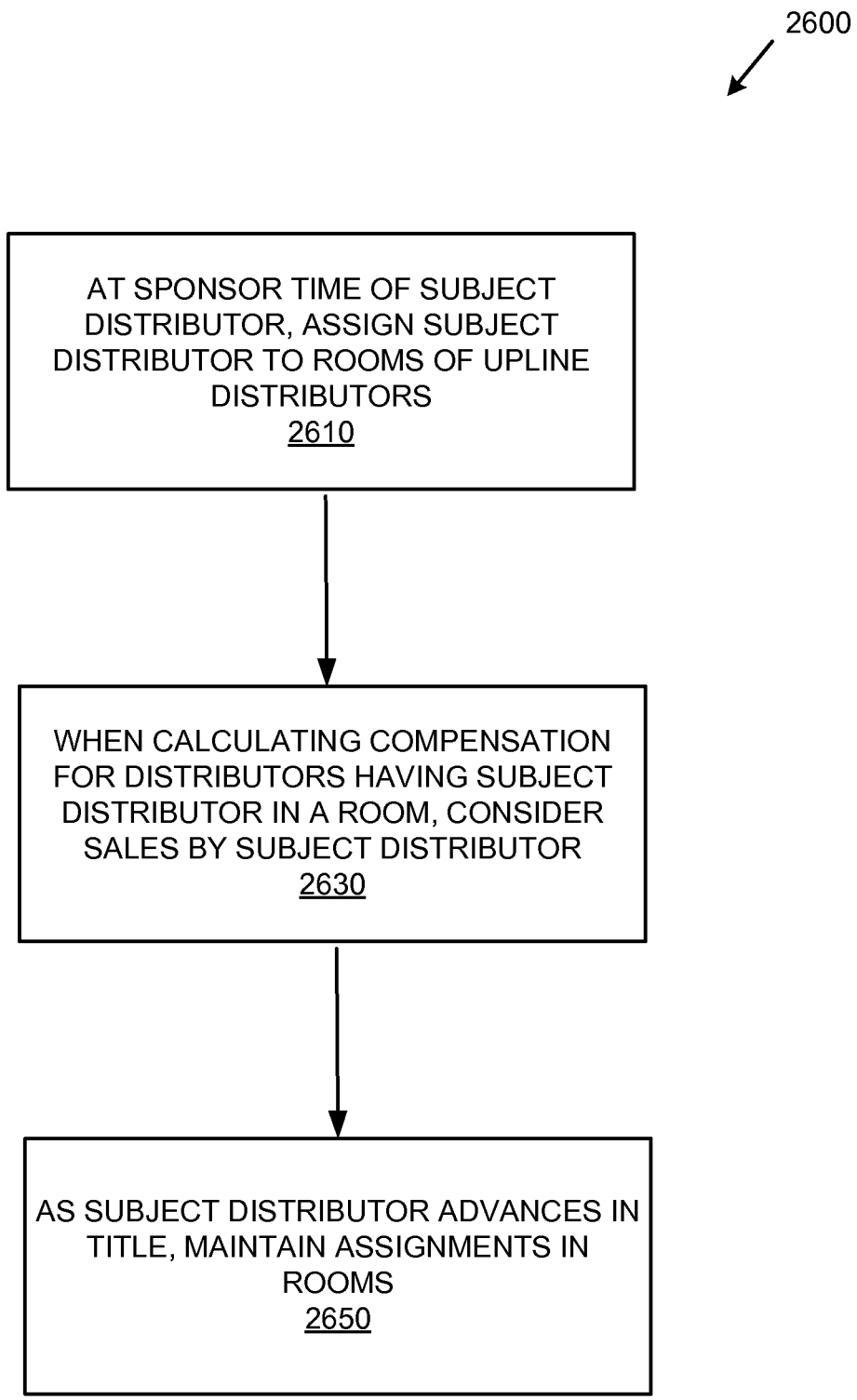
FIG. 26 is a flowchart of an exemplary method of calculating compensation via static titled room assignment.

FIG. 26 is a flowchart of an exemplary method 2600 of calculating compensation via static titled room assignment.

At 2610, at sponsor time of a subject distributor, the subject distributor is assigned to titled rooms of respective upline distributors as described herein.

At 2630, when calculating compensation for the distributors having the subject distributor in a room, the sales by the subject distributor are considered. Compensation can be calculated and awarded accordingly over time.

At 2650, as the subject distributor advances in title, the titled room assignments for the subject distributor are maintained. Compensation can be calculated repeatedly over time (e.g., as in 2630).

Example 62

Exemplary Room Assignment over Time

Figure 27:
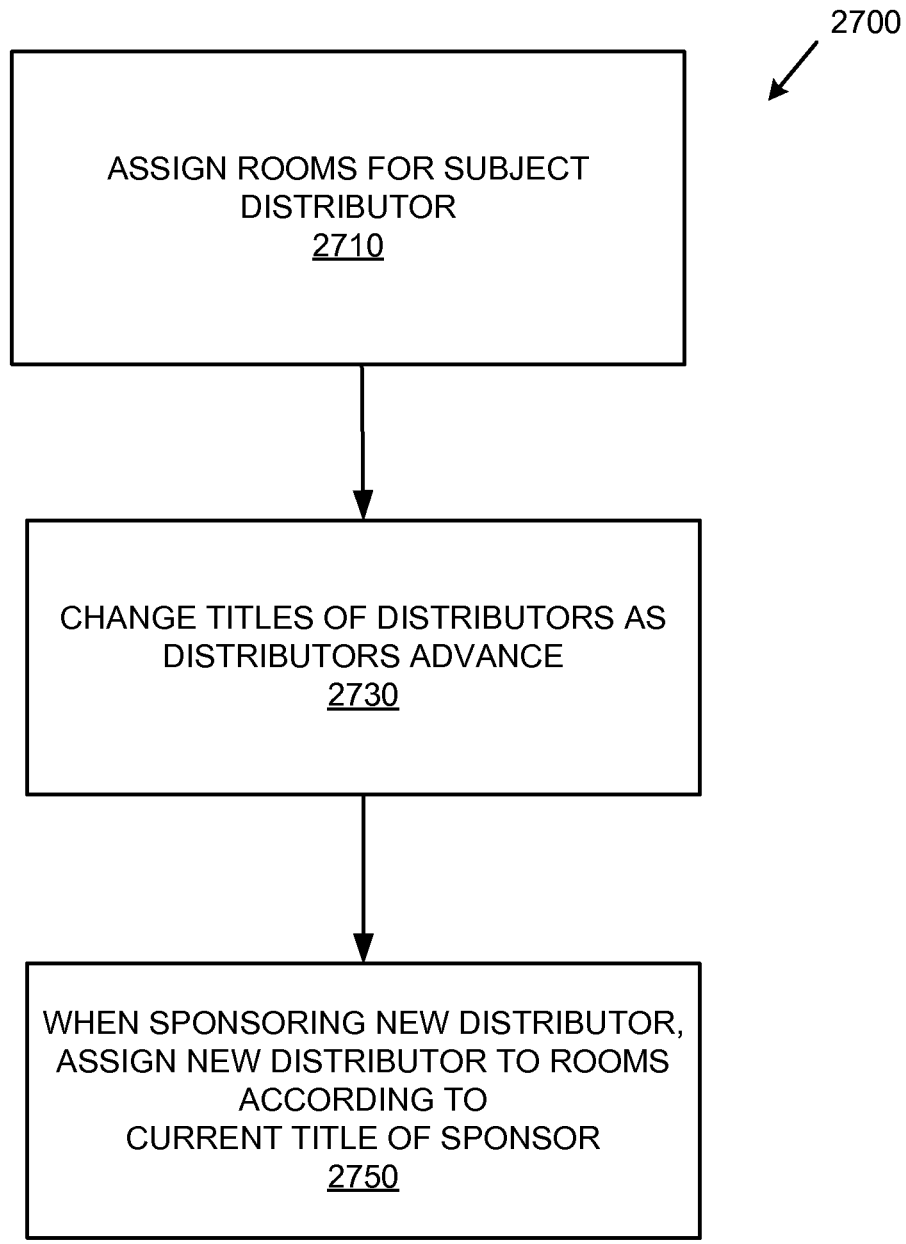
FIG. 27 is a flowchart of an exemplary method of assigning distributors to rooms over time as distributors advance in title.

FIG. 27 is a flowchart of an exemplary method 2700 of assigning distributors to rooms over time as distributors advance in title.

At 2710, when a distributor is sponsored, the distributor is assigned to rooms of upline distributors at the time the distributor is sponsored.

At 2730, over time, the titles of distributors are changed as the distributors advance. For example, the new titles can be stored in one or more computer-readable media.

At 2750, when sponsoring a new distributor, the sponsored distributor is assigned to rooms based at least on the current title of the sponsor.

Example 63

Exemplary System for Determining Room Assignment

Figure 28:
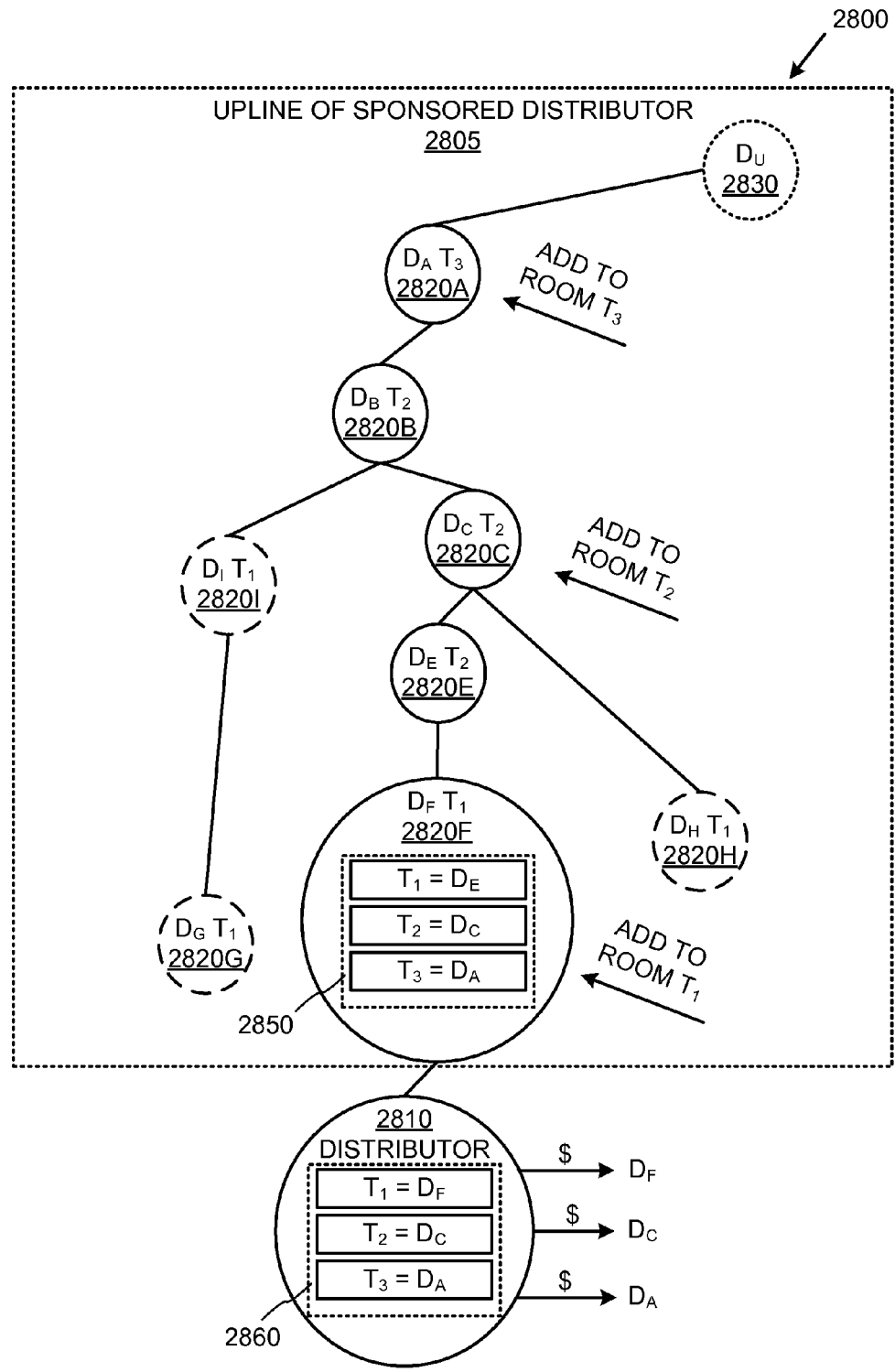
FIG. 28 is a block diagram of an exemplary system for determining an upline assignment summary for a distributor.

FIG. 28 is a block diagram of an exemplary system 2800 for determining a room assignment for a distributor 2810. The shown items and relationships therebetween can be represented in one or more computer-readable media.

In the example, a subject distributor 2810 at the time of being sponsored has an upline 2805. Distributors in the subject distributor's upline 2805 include distributors 2820A, 2820B, 2820C, 2820E, and 2820F. Distributors 2820G, 2820H, and 28201 need not be counted as part of the upline. The upline may continue to extend beyond 2820A (e.g., to distributor 2830 and beyond).

When determining room assignment, the upline assignment summary 2850 of the sponsoring distributor 2820F can be consulted. As shown in the example, there are three upline assignment summary entries in the summary 2850 of the sponsoring distributor 2820F. Even though distributor 2820E has advanced to a higher title after the sponsoring distributor 2820F was sponsored, static titled room assignment maintains distributor 2820E in the titled room $T_1$ according to title at the time of sponsorship.

After assignment, there are three upline assignment summary entries in the summary 2860 for the distributor 2810. The distributors are assigned to the entries according to title of the sponsoring distributor 2820F and the upline assignment summary 2850 of the sponsoring distributor 2820F. Accordingly, the distributor 2820E does not appear (and the sponsored distributor is not assigned to any rooms for 2820E) because of an intervening distributor, namely the sponsoring distributor 2820F. Instead, the sponsored distributor is added to rooms for other distributors, who continue to benefit from their own efforts and the efforts of their downline.

As described herein, the subject distributor 2810 is assigned to titled rooms according to the summary.

Example 64

Exemplary Top-of-Tree Implementation

Due to the situation arising when starting the commission program, there can be some distributors who are not assigned to certain titled rooms. To represent such a situation, a top-of-tree distributor can be created, and the distributors can be assigned titled rooms of the top-of-tree distributor. The upline assignment summary for a distributor can thus also reflect the top-of-tree distributor.

Example 65

Exemplary Initial Upline Assignment

When starting the commission program, initial upline assignment can be done by a specialized computer program that assigns uplines to existing distributors at a point in time. For example, criteria can be used relating to the title held at that point and in the past (e.g., past six months, past year, or the like).

Example 66

Exemplary Titled Room Assignment Method

Figure 29:
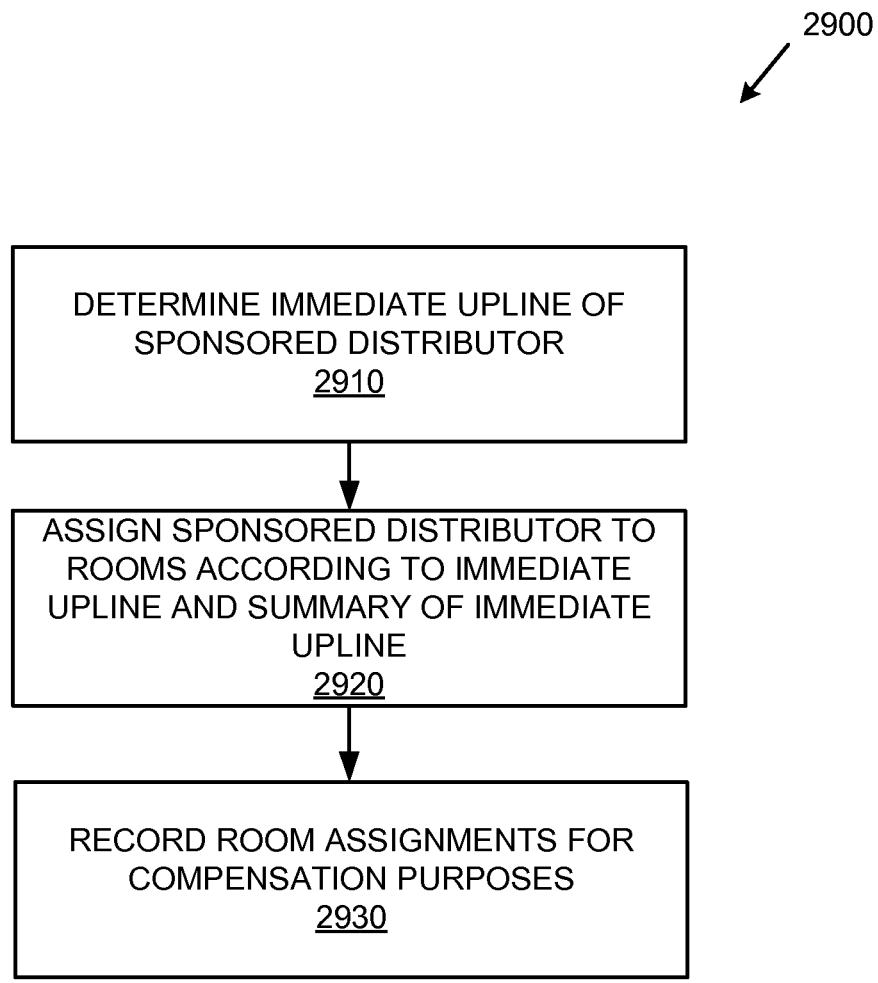
FIG. 29 is a flowchart of an exemplary method for determining static titled room assignment for a distributor.

FIG. 29 is a flowchart of an exemplary method 2900 for determining titled room assignment for a distributor and can be used in conjunction with the system 2800 of FIG. 28. As described herein, the method 2900 is typically performed at the time the distributor is sponsored. In any of the examples herein, the assignments determined for an upline assignment summary for a sponsored distributor can be used to assign the sponsored distributor to titled rooms for the upline distributors listed in the summary.

At 2910, the immediate upline (e.g., sponsoring distributor) of the sponsored distributor is determined.

At 2920, the sponsored distributor is assigned to rooms according to the title of the immediate upline and the summary of the immediate upline. Assigning upline distributors to the upline assignment summary of the sponsored distributor can comprise determining a title name of the sponsoring distributor; assigning the sponsoring distributor to entries of the assignment summary having a title name equal to or less than the sponsoring distributor; and for entries having a title name greater than the sponsoring distributor, copying corresponding entries from an assignment summary of the sponsoring distributor.

Thus, if a sponsoring distributor of title $T_n$ (at the time of sponsorship) sponsors a sponsored distributor, the sponsoring distributor can occupy the first n entries of the upline assignment summary. The remaining entries can be taken from (e.g., copied from) the sponsoring distributor's assignment summary.

The assignments of the summary can be used to determine to which rooms the sponsored distributor is assigned. For example, if the summary shows that a first distributor is assigned to the second entry, the sponsored distributor can be placed in the second room of the first distributor.

At 2930, the room assignments can be recorded for compensation purposes. In practice, the room assignments can be recorded by storing the assignment summaries, separately storing room assignments, or both. For example, any of the commission programs described herein can be applied to determine compensation based on the room assignments.

Applying the method 2900 to the system 2800 of FIG. 28, distributor 2820F is assigned to the room associated with title name $T_1$; distributor 2820C is assigned to the room associated with the title name $T_2$; and distributor 2820A is assigned to the room associated with the title name $T_3$. As a result of the assignments, there are effectively three go-forward bonuses paid on sales associated with the distributor 2820F. In implementations with r rooms, there are r go-forward bonuses. In some cases (e.g., a distributor is assigned to multiple rooms), more than one of the bonuses can be paid to the same distributor.

Example 67

Exemplary Data Structure

Figure 30:
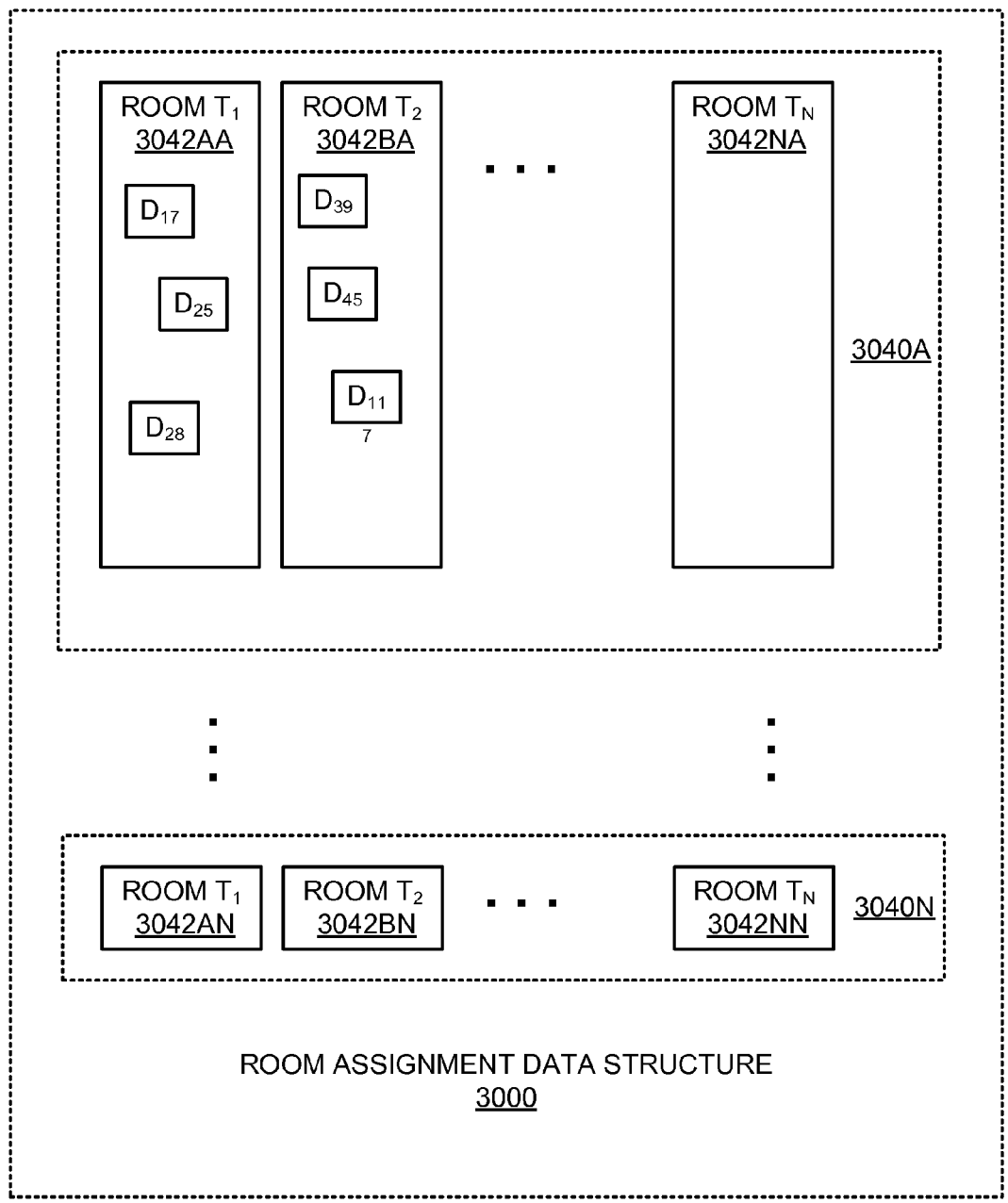
FIG. 30 is a block diagram of an exemplary data structure for storing static titled room assignment for a distributor.

FIG. 30 is a block diagram of an exemplary data structure 3000 for storing static room assignments for a distributor. In the example, the records 3040A-N store respective room assignments 3042AA-NN.

If desired, a distributor identifier uniquely identifying the distributor for whom the rooms are assigned can also be included in the records.

So, for example, the first record 3040A indicates that the distributors having identifiers stored in room 3042AA are the distributors assigned to the subject distributor's first room (e.g., having the first title name, $T_1$), a distributor identifier stored in room 3042BA is the distributor assigned to the subject distributor's second room, and so forth.

Example 68

Exemplary Group Membership

Figure 31:
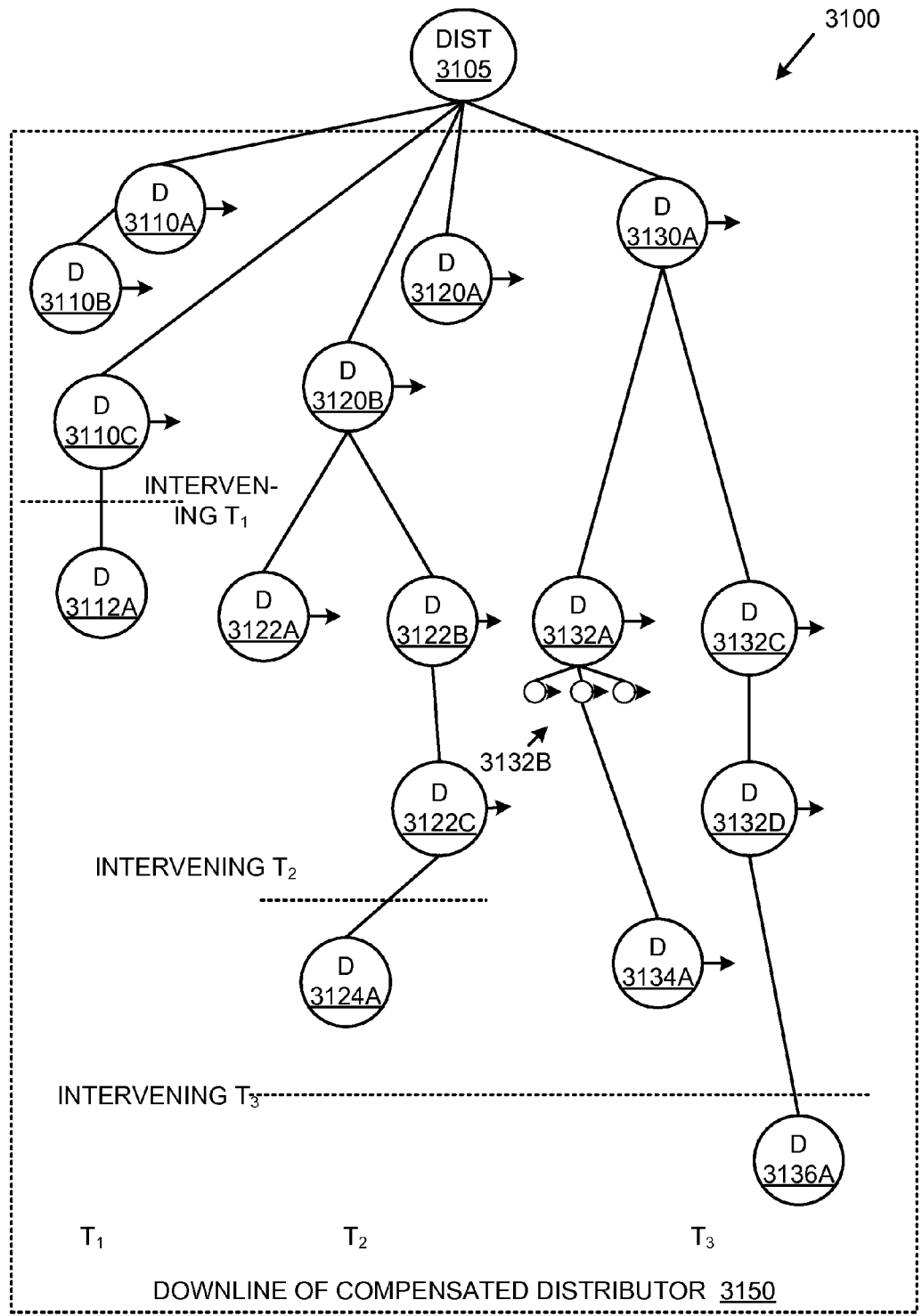
FIG. 31 is a block diagram of a group arrangement for distributors.

FIG. 31 is a block diagram of an exemplary group arrangement 3100 for distributors. In the example, a distributor 3105 has a downline 3150 with many distributors.

In the example, some distributors 3110A-C and 3112A are considered to be in the subject distributor's $T_1$ group (e.g., they appear in the subject distributor's $T_1$ room). These are the distributors that the subject distributor sponsored when the subject distributor had the title $T_1$ and those sponsored by distributors in the group after the subject distributor advanced from the title $T_1$, unless there is an intervening distributor of title $T_1$.

Other distributors 3120A-B, 3122A-C, and 3124A are considered to be in the subject distributor's $T_2$ group, which is defined similarly to that for the $T_1$ group.

Still other distributors 3130A, 3132A-D, 3134A, and 3136A are considered to be in the subject distributor's $T_3$ group, which is defined similarly to that for the $T_1$ group.

In the example, go forward bonuses payable to the subject distributor 3105 are indicated by the arrows on the distributors.

If, after the subject distributor 3105 advances to title $T_2$, distributor 3110A sponsors distributor 3110B, 3110B will be added to the subject distributor's $T_1$ group as long as 3110A has not yet achieved title $T_1$. If 3110C achieves title $T_1$ after being sponsored and then sponsors 3112A, no go-forward bonus is paid to the subject distributor 3105 for sales associated with 3112A (e.g., 3112A does not appear in any of 3105's titled rooms) because there is an intervening $T_1$ distributor. Other compensation may be paid (e.g., generational, leadership, and the like). Even after the subject distributor 3105 achieves title $T_2$ or $T_3$, distributors sponsored by distributor 3112A will not be assigned to 3105 rooms because they are part of 3105's $T_1$ group.

The arrangement can work similarly for other titles as shown.

It is possible to have a partially intervening distributor. So, if a subject distributor appears in multiple rooms of an upline distributor, a partially intervening distributor can cause a situation where distributors downline from the subject distributor are no longer placed in multiple rooms of the upline distributor.

Example 69

Exemplary Group Building

Figure 32:
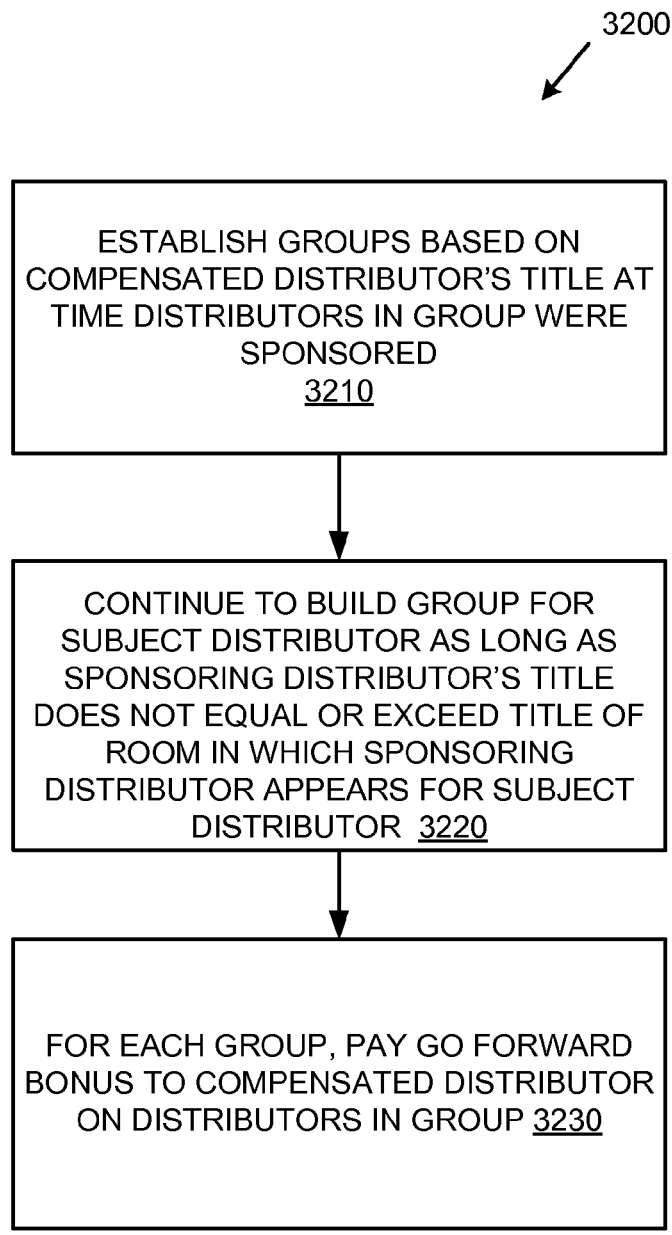
FIG. 32 is a flowchart of an exemplary method of calculating compensation based on groups of distributors in a distributor's downline.

FIG. 32 is a flowchart of an exemplary method 3200 of calculating compensation based on groups of distributors in a distributor's downline.

At 3210, different titled groups for the compensated distributor are established based on the compensated distributor's title at the time distributors in the group were sponsored.

At 3220, additional distributors can be included in the group after the compensated distributor advances to a higher title, as long as the sponsoring distributor's title does not equal or exceed the title of the room in which the sponsoring distributor appears for the subject distributor. In some cases, an intervening distributor's title can also prevent additional distributors from being included in the group.

At 3230, for each group, a go-forward bonus is paid to the compensated distributor for sales of distributors in the group.

Example 70

Exemplary Nodes

In any of the examples herein, distributors can be represented as nodes in one or more computer-readable media. For example, as shown herein, the nodes can be associated with respective title names. The node can include a unique identifier identifying the represented distributor. In practice, the nodes can be implemented as database records, linked lists, or the like.

Example 71

Exemplary Compensation Engine

In any of the examples herein, a compensation engine can apply the methods described to calculate compensation. For example, a compensation engine can be configured to calculate a go-forward bonus for a subject distributor represented by a node and assigned a plurality of distributors in respective titled rooms according to titled room assignments.

Example 72

Exemplary Implementation of Titles

Although any other implementations are possible, an exemplary implementation uses the following ranked titles, ranked from highest to lowest.

6 Presidential Master
5 Master Coordinator
4 Senior Key Coordinator/Key Coordinator
3 Senior Executive Coordinator/Executive Coordinator
2 Senior Coordinator/Coordinator
1 Senior Director/Director
0 Distributor As described herein, a distributor who has not advanced beyond Distributor can be treated as a zero level distributor and not considered for purposes of titled room assignment.

Example 73

Exemplary Implementation of Rooms

Although any other implementations are possible, an exemplary implementation uses six rooms for distributors, one for each of the titles 1-6 listed above. Note that multiple business leader titles can be associated with the same room.

Example 74

Exemplary Implementation of Percentages

Although any other implementations are possible, an exemplary implementation uses the following percentages when determining compensation (e.g., go forward bonuses) for static room assignment:

11% Presidential Master
10% Master Coordinator
9% Senior Key Coordinator/Key Coordinator
8% Senior Executive Coordinator/Executive Coordinator
6% Senior Coordinator/Coordinator
4% Senior Director/Director In practice, the percentages can be applied as follows:

If the selling distributor appears in (e.g., is assigned to) a compensated distributor's Presidential Master room, a 1% commission is paid to the compensated distributor on sales of the selling distributor.

If the selling distributor appears in a compensated distributor's Master Coordinator room, a 1% commission is paid to the compensated distributor on sales of the selling distributor.

If the selling distributor appears in a compensated distributor's Senior Key Coordinator/Key Coordinator room, a 1% commission is paid to the compensated distributor on sales of the selling distributor.

If the selling distributor appears in a compensated distributor's Senior Key Coordinator/Key Coordinator room, a 1% commission is paid to the compensated distributor on sales of the selling distributor.

If the selling distributor appears in a compensated distributor's Senior Executive Coordinator/Executive Coordinator room, a 2% commission is paid to the compensated distributor on sales of the selling distributor.

If the selling distributor appears in a compensated distributor's Senior Coordinator/Coordinator room, a 2% commission is paid to the compensated distributor on sales of the selling distributor.

If the selling distributor appears in a compensated distributor's Senior Director/Director room, a 4% commission is paid to the compensated distributor on sales of the selling distributor.

A selling distributor can appear in multiple rooms, and the commissions can be combined. For example, if a selling distributor appears in all rooms, an 11% commission is paid.

As shown, an escalating percentage can be used wherein lower titled rooms result in a higher percentage.

When allocating a commission based on an upline assignment summary, the percentage associated with the title of an entry in the summary can be applied (e.g., to sales of the distributor having the upline assignment summary) for respective distributors appearing in summary entries (e.g., to whom the commission is allocated).

Example 75

Exemplary Alternate Overview

Disclosed herein is a novel multi-level marketing compensation program. The program can be used by a company to increase the company's size and distribution network through incentivizing members of the company to sell the company's product. This in turn can result in increased sales which benefits not only the individual members of the company, but the company as a whole.

Example 76

Exemplary StairStep/Breakaway Plan

A Stairstep/Breakaway plan is a compensation program to pay distributors for the sale of products and to encourage those distributors in building and maintaining a sponsorship line. The Stairstep/Breakaway plan is generally designed to achieve two goals. The first goal is to incentivize distributors to sell company products. The second goal is to incentivize the building of a "genealogy" or sponsorship lines.

In one embodiment of such a plan, a company sells products through distributors. Each distributor is incentivized to sell products as well as to find and sponsor new people to participate in the company. In this compensation program, every product that is sold has a value associated with it called purchase volume ("PV"). PV may be directly related to cost, for example one dollar equals one point of PV, or PV may be based on some arbitrary number, for example a unit of product X is worth 5 points of PV. Thus, a distributor earns increasing amounts of PV based on an increasing amount of sales.

Example 77

Exemplary Personal Groups

In addition to earning PV based upon their own sales, a first distributor may also sponsor other people to sell product to other customers and/or other distributors. These individuals are in the first distributor's "personal group." The first distributor would in turn earn PV from sales of the product by distributors in their personal group (secondary distributors), distributors that are in turn sponsored by people in the first distributor's personal group (tertiary distributors), or other distributors who are even further removed from the first distributor. The company then pays a bonus to the first distributor for the PV that they earned as well as the PV accumulated from second/tertiary/etc. distributors (along with their respective customers) whom the first distributor sponsored.

As a distributor continues to sponsor new distributors, a sponsorship line or genealogy is created where new customers and distributors then go on to sponsor other customers and distributors and so on. The genealogy is recorded and managed in a computer system and can be depicted as a hierarchical representation of everyone in the sponsorship line originating and emanating from the distributor. This genealogy can extend many levels down from the original distributor.

Figure 33:
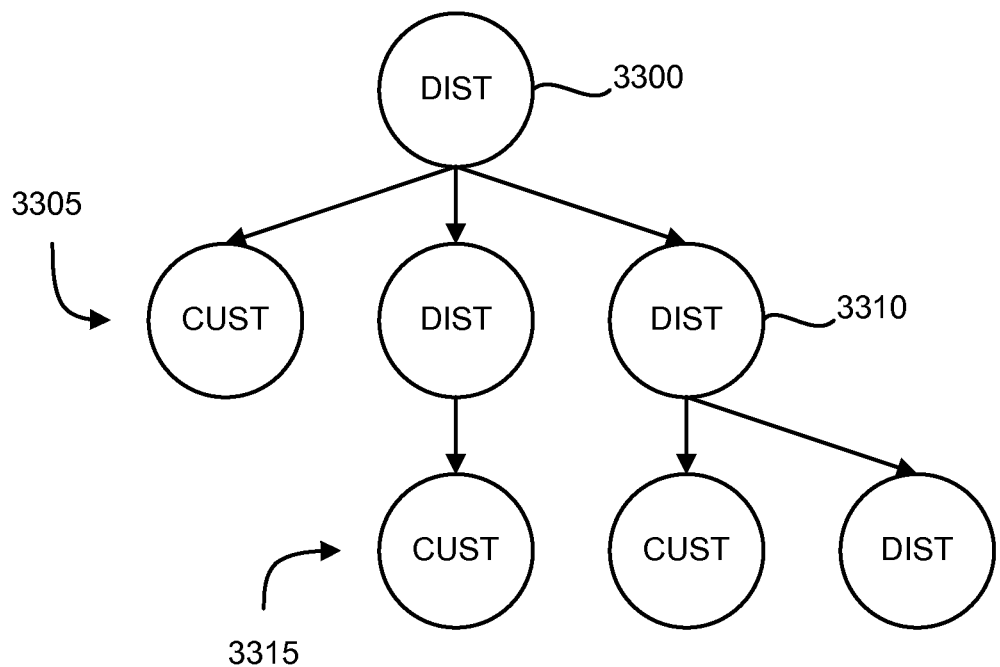
FIG. 33 is a block diagram showing personal groups.

FIG. 33 provides an example of this relationship. A distributor 3300 supplies a customer and additionally sponsors two other distributors at a second level 3305. Each of the distributors at the second level 3305 supplies or sponsors at least one person at a third level 3315. One of the second level distributors 3310 supplies a customer and sponsors a distributor at the third level 3315. In this example, the first distributor 3300 would earn PV off of sales to the customers at the second level 3305 and the third level 3315, as well as PV on sales to or from the distributors at the second or third levels. Generally, the distributor 3300 would be said to be in the "upline" of the second level 3305 or third level 3315 entities. Conversely, the second level distributor 3310 would be said to be in the "downline" of the distributor 3300.

The PV generated in the personal group is referred to as personal group volume ("PGV"). PGV includes all of the PV that the distributor generates through personal purchases and personal product sales. PGV further includes all of the PV generated from sponsored distributors who purchase and/or sell product to their customers, and so on. All of the PV within the distributor's personal group counts towards the distributor's personal group volume.

Figure 34:
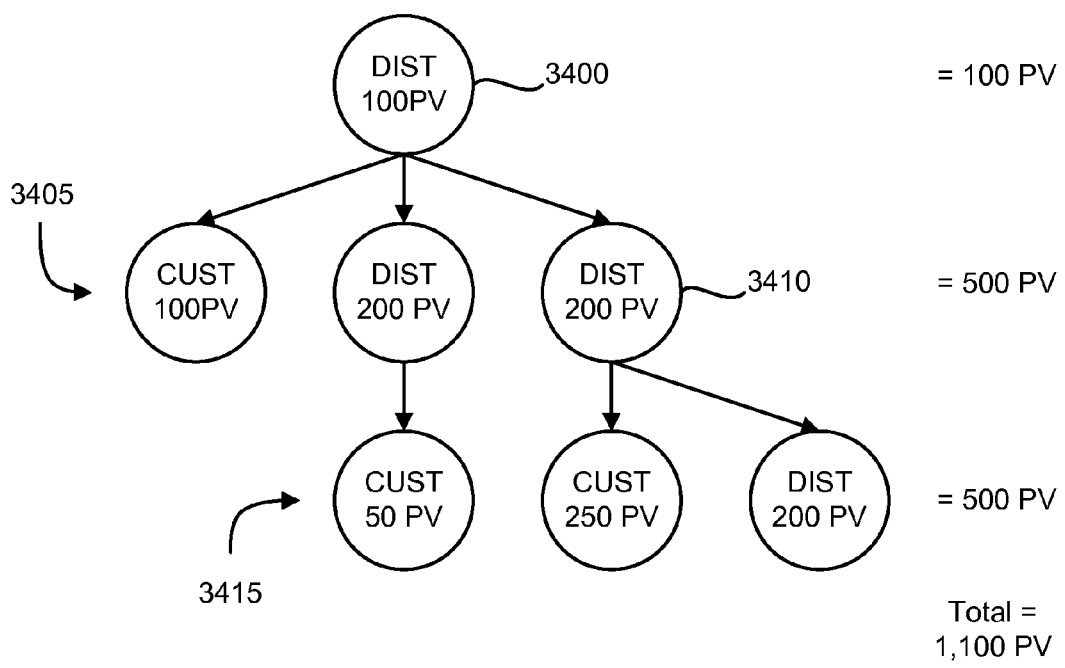
FIG. 34 is a block diagram showing personal group volume.

FIG. 34 illustrates an example of PGV. The first distributor 3400 generates 100 PV through personal purchases. The first distributor 3400 sponsors two distributors and sells to a customer at a second level 3405. The two second level distributors each generate 200 PV, and the customer generates 100 PV through purchases. Thus, 500 PV is generated at the second level 3405. The two distributors at the second level together sponsor two customers and a distributor at the third level 3415. One of the customers generates 50 PV, while the other generates 250 PV. The third level distributor generates 200 PV. Thus, there is a total of 500 PV generated at the third level 3415. Because the first distributor 3400 sponsors or sells to, either directly or indirectly, each of the people in the second and third levels 3405, 3415, the PV generated by each of these people is added to the first distributor's PGV. Thus, the first distributor 3400 has 1,100 PGV. Similarly, the distributor 3410 in the second level 3405 has 650 PGV due to their own PV, the PV of the customer in the third level 3415 that they sell to, and the PV of the distributor in the third level.

By meeting specific PGV benchmarks, the distributor may earn a personal group bonus ("PGB") on the PGV generated in his or her personal group. Generally, the personal group Bonus is a percentage, such as 4%, 8%, etc. on the PGV generated by his or her personal group. As the PGV increases, the PGB percentage that will be paid to the distributor increases as well. Table 1 describes one exemplary PGB schedule, although different PGV benchmarks and PGB rewards may also be used as circumstances dictate.

TABLE 1

| PGV Benchmarks | PGB Percentages |
|---|---|
| 250 PGV | 4% PGB |
| 500 PGV | 8% PGB |
| 1,000 PGV | 12% PGB |
| 1,400 PGV | 14% PGB |
| 2,000 PGV | 20% PGB |

In this example, PGB percentages are paid up to 2,000 PGV. Anything beyond 2,000 PGV is still paid at a 20% PGB rate. Additionally, PGB is a differential bonus. This means that if a given distributor qualifies at the 4% level, then the next distributor upline who qualifies at 8% or higher will receive the difference between the distributor's qualified percentage and the 4% already paid. This process continues until the 16% is fully paid out.

Figure 35:
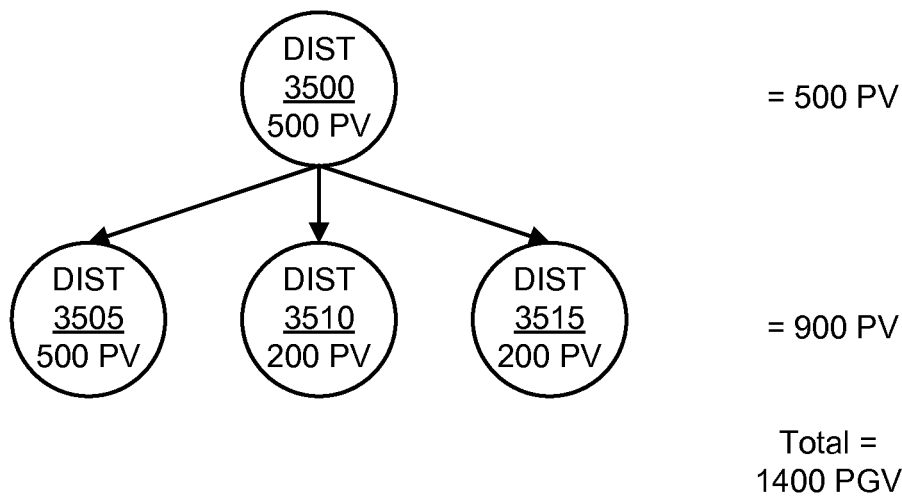
FIG. 35 is a block diagram illustrating differential bonus.

FIG. 35 illustrates the differential bonus concept. Distributor 3500 is eligible, under the program shown in Table 1, to earn a 12% PGB on his or her own volume and on the volumes of distributors 3510 and 3515 because distributor 3500 has 1,400 PGV. However, distributor 3505 has 500 PV, and so distributor 3505 is eligible to earn a PGB bonus of 8%. Thus, distributor 3500 earns the difference between their own PGB of 12% and the 8% PGB distributor 3505 is eligible to earn, so distributor 3500 only earns a PGB of 4% on the PV of distributor 3505. Note that this reduced PGB ONLY applies to the PV of distributor 3505. In this example, distributor 3500 earns:

Own=500 PV×12%=$60
Dist 3505=500 PV×4%=$20
Dist 3510=200 PV×12%=$24
Dist 3515=200 PV×12%=$24
Total PGB bonus to Dist 3500=$128

Note that in this example, distributor 3505 would earn 500 PV×8%=$40 on their own PV. Additionally, in this example the 16% level is reserved for those distributors with a minimum title of "director," as described in the next section, although this may not be true in other embodiments.

Example 78

Exemplary Business Groups

Within one embodiment of the business plan, there are leadership levels that have specific names or titles. These leadership titles make up a career path. A distributor may grow his or her personal group to the point where the distributor is eligible to enter the leadership career path. A distributor who enters the career path is termed a "business leader." In the examples described below the career path is defined using terms generally reserved for companies such as "director," "coordinator," etc. In other embodiments military designations such as "captain," "lieutenant," etc.; precious metals designations such as "diamond level," "platinum level," etc.; or some other designations could be used.

In this example, the first title within the career path is the "director" title. When a distributor becomes a director he or she then "breaks away" or "breaks out" of his or her business leader's personal group. The new director takes his or her own personal group, and the PGV from that personal group, with himself or herself. This PGV no longer counts towards PGB percentages for the upline sponsorship line of the director. The new director and his or her personal group are considered a $1^{st}$ generation business leader from the first upline business leader found within the sponsorship line. Each successive business leader is then counted as a generation. For example, the second business leader found downline in the sponsorship line is a $2^{nd}$ generation business leader, and the third business leader is a $3^{rd}$ generation business leader, and so on.

This generational lineage occurs regardless of how many personal group levels the new director is from his or her first upline business leader. Because each business leader is a next generation, each generation can be many levels in the sponsorship line away from the next business leader.

Figure 36:
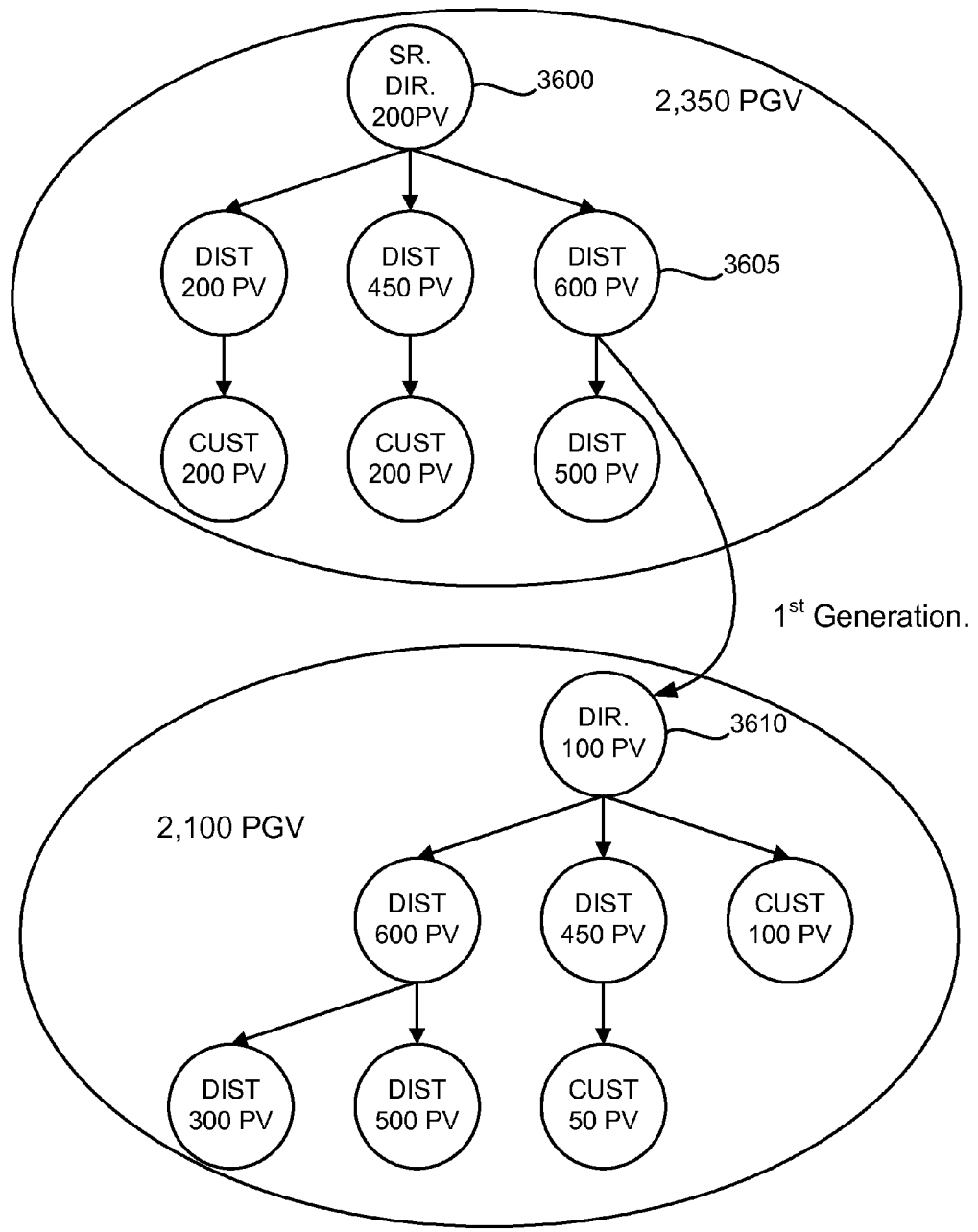
FIG. 36 is a block diagram illustrating break out.

FIG. 36 illustrates a distributor that became a director and broke out of his or her PGV upline. In FIG. 36 a senior director 3600 sponsors a distributor 3605 who, in turn, sponsors a distributor that just promoted to a director 3610. The new director 3610 thus breaks out of the PGV downline of the senior director 3600 and the distributor 3605, and takes their own PGV with him or her. The senior director's 3600 PGV in this case is only 2,350 PGV because now the sales made to or by the new director 3610 are not counted towards the PGV of the senior director. Similarly, the new director 3610 has 2,100 PGV. Note that in this example the director 3610 is two levels away from the senior director 3600 (senior director 3600→distributor 3605→director 3610), however the director is only a single generation away from the senior director 3600, because the senior director is the next business leader upline from the director.

In this embodiment, business leaders are paid a percentage on the PGV generated by each generation of business leaders. This percentage is paid up to a set number of generations within their business group. Table 2 shows business leader names and relative percentages below. In other examples a company may pay more or less generations, and the relative percentages may be different.

Starter program bonuses can be implemented according to Example 87, below. Generally, the bonuses are paid as new individuals are sponsored into the company through a starter pack. The starter pack can include product, product literature, and/or a product coupon on the next purchase of product. The starter pack may also contain other information. In one example, for each starter pack sold, up to a total of $125 can be paid in commissions to the sponsor and the sponsor's upline.

The starter program and the bonus plan establish and use lines of sponsorship that are separate and apart from each other. The lines of sponsorship are also separate and apart from the lines of sponsorship used by the Stairstep/Breakaway plan. One term for describing these separate lines of sponsorship is "assignment."

In the Stairstep/Breakaway Plan described above, the relationship is always one sponsor to many sponsored customers or distributors. As time progresses, the title of the sponsor in relation to when the person sponsors someone is not important from the standpoint of the overall sponsorship line. In other words, everyone that is sponsored is always sponsored into the sponsor's personal group, regardless of the current title that the sponsor holds.

In the starter program and the bonus plan, by contrast, the title of the sponsor and that of the sponsor's uplines is of importance. In the starter program, a distributor newly sponsored into the company is assigned to up to four uplines, beginning with the distributor's sponsor. The new distributor is separately "assigned" up to six upline business leaders who already hold a title in the company for purposes of the bonus

TABLE 2

| | Director | Sr. Director | Coordinator | Sr. Coor. | Executive Coor. | Sr. Executive Coor. | Key Coor. | Sr. Key Coor. | Master Coor. | Pres. Master |
|---|---|---|---|---|---|---|---|---|---|---|
| $1^{st}$ Gen. | | 6% | 6% | 6% | 6% | 6% | 6% | 6% | 6% | 6% |
| $2^{nd}$ Gen. | | 3% | 4% | 5% | 6% | 6% | 6% | 6% | 6% | 6% |
| $3^{rd}$ Gen. | | | | | 4% | 4% | 4% | 4% | 4% | 4% |
| $4^{th}$ Gen. | | | | | | 4% | 4% | 4% | 4% | 4% |
| $5^{th}$ Gen. | | | | | | | | 3% | 3% | 3% |
| $6^{th}$ Gen. | | | | | | | | | | 3% |

Table 2 can also include a "Senior Master" which is paid 6%, 6%, 4%, 4%, 3%, and 3% on first, second, third, fourth, fifth, and sixth generations, respectively.

In Table 2, the company pays a generational bonus up to six generations deep, depending on the business leader's title. As a business leader increases in title, he or she is eligible to earn additional generational bonuses (as shown in Table 2.)

Example 79

Exemplary Plan Enhancements

Disclosed herein are two enhancements to the Stairstep/Breakaway plan described above, a "starter program" and a "bonus plan." The purpose of these enhancements is to encourage further participation and sponsorship by distributors and business leaders by adding incentives for further work both in terms of sales and in terms of development of down-line individuals.

The main objectives of the bonus plan and the starter program are to create growth through the following mechanisms:
1. Drive Sponsoring
2. Drive Business Building
3. Drive Title Advancement plan. This assignment may be automatic or there may be some degree of chance or decision making involved in it, and it may involve a computer and/or human input. This assignment remains in place regardless of titles subsequently achieved by the new distributor or by any of the assigned upline business leaders. How someone new into the company is assigned depends upon several factors including the status or title of their sponsor, the business rules of the starter program, and the assignment already in place of the sponsor's upline. The assignments determine how much of a starter program bonus and a bonus plan bonus are paid.

A terminology that is helpful to conceptualize the assignments is "rooms." To depict a distributor's assignment in relation to his or her sponsor and sponsorship line upline, the concept of phases or rooms can be used. Each room is tied to a title, or position, within the business leader career path. As a business leader increases in title and moves up the career path, the business leader progresses from left to right through these rooms and builds genealogies in each room into which newly sponsored distributors are assigned. In some cases, such as Table 3 below, multiple business leader titles may be in the same room. In alternative embodiments, more or less rooms could be used.

TABLE 3

| Room | #1 | #2 | #3 | #4 | #5 | #6 |
|---|---|---|---|---|---|---|
| Room Name | Director/Sr. Director Room | Coordinator/Sr. Coor. Room | Executive Coor./Sr. Exec. Coor. Room | Key Coor./Sr. Key Coor. Room | Master Coordinator Room | Presidential Master Room |

A new distributor is assigned an upline depending on the title held by the sponsor and the sponsor's already-assigned upline. By way of example using arbitrary names, if Larry is a presidential master, then anyone that Larry sponsors will be placed in his Presidential Master Room (Room #6 in Table 3.) If Larry sponsors a new distributor, Kim, Kim would be assigned to Larry for all 6 rooms in Kim's career path. Kim's upline assignment would look like this:

| | | |
|---|---|---|
| #6 | Presidential Master: | Larry |
| #5 | Master Coordinator: | Larry |
| #4 | Key/Sr. Key Coor.: | Larry |
| #3 | Exec./Sr. Exec. Coor.: | Larry |
| #2 | Coor./Sr. Coor.: | Larry |
| #1 | Dir./Sr. Dir.: | Larry |
| | Distributor: | Kim |

If Kim subsequently achieves the rank of executive coordinator. Kim would thus be in room #3. If Kim sponsored Kathy at that point, then Kathy's upline assignment would look like this:

| | | |
|---|---|---|
| #6 | Presidential Master: | Larry |
| #5 | Master Coordinator: | Larry |
| #4 | Key/Sr. Key Coor.: | Larry |
| #3 | Exec./Sr. Exec. Coor.: | Kim |
| #2 | Coor./Sr. Coor.: | Kim |
| #1 | Dir./Sr. Dir.: | Kim |
| | Distributor: | Kathy |

Now, when Kathy in turn becomes a director and sponsors Jeff, then Jeff's assignment would include Larry, Kim and Kathy. For example:

| | | |
|---|---|---|
| #6 | Presidential Master: | Larry |
| #5 | Master Coordinator: | Larry |
| #4 | Key/Sr. Key Coor.: | Larry |
| #3 | Exec./Sr. Exec. Coor.: | Kim |
| #2 | Coor./Sr. Coor.: | Kim |

-continued

| | | |
|---|---|---|
| #1 | Dir./Sr. Dir.: | Kathy |
| | Distributor: | Jeff |

Note that these assignments are determined at the time of sponsoring. In other words, once set, the assignments do not change. Even as Kathy moves up in rooms, Jeff's assignments of Larry, Kim, and Kathy will not change. However, if Kathy moved up to an executive coordinator (thus in the same room as Kim was when Kim sponsored Kathy), and sponsored George, then George's upline would look like this:

| | | |
|---|---|---|
| #6 | Presidential Master: | Larry |
| #5 | Master Coordinator: | Larry |
| #4 | Key/Sr. Key Coor.: | Larry |
| #3 | Exec./Sr. Exec. Coor.: | Kathy |
| #2 | Coor./Sr. Coor.: | Kathy |
| #1 | Dir./Sr. Dir.: | Kathy |
| | Distributor: | George |

In this case, Kim is irrelevant to George because Kathy is in the same room as Kim was (room #3) when Kim sponsored Kathy.

Example 80

Exemplary Bonus Plan Percentages

As a business leader progresses up the career path, the business leader becomes eligible to earn additional bonus plan percentages. These percentages are added to what has already been earned in previous rooms. For example, as a business leader increases in title from sr. director to coordinator, the new coordinator would earn a higher percentage than the sr. director. Table 4 shows an example of both the bonus increase (labeled Bonus Plan Bonus) as an individual moves from one room to the other, and also the cumulative bonus per room. Other embodiments may have higher or lower percentage differences between rooms.

TABLE 4

| Room | #1 | #2 | #3 | #4 | #5 | #6 |
|---|---|---|---|---|---|---|
| Room Name | Director/Sr. Director Room | Coordinator/Sr. Coor. Room | Executive Coor./Sr. Exec. Coor. Room | Key Coor./Sr. Key Coor. Room | Master Coordinator Room | Presidential Master Room |
| Bonus Plan Bonus | +4% | +2% | +2% | +1% | +1% | +1% |
| Bonus Plan Cumulative Bonus | 4% | 6% | 8% | 9% | 10% | 11% |

Thus, a sr. director achieving coordinator status would be eligible to achieve a 6% bonus plan bonus. The 4% from being a director/sr. director, and the additional 2% received by becoming a coordinator.

Because bonus plan bonuses are paid as percentages on volume occurring, as opposed to a fixed dollar amount, bonus plan bonuses are reoccurring each month on the volume that is generated. In other words, the bonuses are percentages applied to actual sales, as opposed to a fixed monetary amount (i.e. 3% of $2,000 for one level, 5% of $2,000 for another level, etc.). This serves to help incentivize business leaders to motivate their sales team because as the business leader's sales team sells more, the business leader receives a correspondingly higher bonus. Additionally, this plan is unique in that it pays bonus plan bonuses in every room on all products sold as opposed to bonuses only on starter packs or other products specified by a company.

Example 81

Exemplary Starter Program

As mentioned above, rather than pay a percentage on the volume generated in one's personal group and business group, starter program bonuses generally pay a fixed dollar amount of up to $125 on the sale of a starter pack. This $125 is cumulative and is generally split between one or more of the sponsor and the sponsor's upline. For example, when a distributor or a business leader personally sponsors a new distributor such that the new distributor purchases a starter pack, then the sponsoring distributor or business leader earns $50. The remaining $75 ($125−$50) is then paid out depending on the assignment of the sponsor and the sponsor's upline sponsorship line. Table 5 depicts how starter program bonuses are paid out based upon the title held by the sponsor. In practice, there can be an additional room (e.g., Phase 1) where a distributor is eligible only for the $50 Personal Bonus. The room can be implemented as "Room #0."

Example 83

Exemplary Advantages

The complete compensation program described above can include features of a traditional Stairstep/Breakaway Plan and two separate types of assigned bonus plans. The traditional Stairstep/Breakaway Plan is a two-dimensional plan. Distributors are compensated one way on the personal group and compensated another way when the distributors break away from their personal groups. Assigned bonus plans are generally also two-dimensional. They typically offer a uni-level piece and an assigned piece, but the entire genealogy is based on the assigned relationships. In the compensation program described above, three separate genealogical structures are utilized to define the groups and qualifications on which different types of bonuses are paid.

The Stairstep/Breakaway Plan significantly rewards building a stable customer base and teaching others to do the same. However, the actual "break away" from PGV to BGV is problematic, especially for people in the early stages of building a business, due to the sudden loss of income when an individual in a sponsor's downline breaks away. In addition, the breakaway part of the plan is, by definition, limited to paying any individual business leader on a defined number of generations, even though their organization may extend much further. Many Stairstep/Breakaway plans use bonuses similar to the bonus program bonuses, but they suffer from the limitation that a business leader is "blocked" on the bonus at the point when someone in his or her downline holds the same or higher business leader title (director, coordinator, etc.).

TABLE 5

| Room | #1 | #2 | #3 | #4 | #5 | #6 |
| --- | --- | --- | --- | --- | --- | --- |
| Room Name | Director/Sr. Director Room | Coordinator/Sr. Coor. Room | Executive Coor./ Sr. Exec. Coor. Room | Key Coor./ Sr. Key Coor. Room | Master Coordinator Room | Presidential Master Room |
| Starter Program Personal Bonus | $50 | $50 | $50 | $50 | $50 | $50 |
| Starter Program Additional Bonus | $25 | $50 | $75 | $75 | $75 | $75 |

Example 82

Exemplary Qualifications to Advance in Title

Generally, to move from one room to the next in the business leader Career Path, certain requirements may have to be met. These requirements could be certain benchmarks that need to be met for personal volume, personal group volume, personally sponsoring a certain number of people in the starter program, having a given number of people in a starter program sponsorship downline, having a person in the PGV downline break out to become a business leader themselves, and/or reaching certain BGV milestones. Each of these milestones may be recurring on a monthly or promotional basis. For example, a person may have to attain and then maintain a certain PGV each month in order to progress. Alternatively, a person may simply have to re-achieve the given PGV each time they progress. In other embodiments, the milestones may be cumulative over the course of an individual's career. For example, an individual may be required to have a downline starter program sponsorship of at least 9 new sponsorees before progressing to a coordinator.

The starter program solves some of these difficulties through the use of the starter pack. The starter pack helps people recruit others that are interested in building a business, while at the same time ensuring that the starter pack is also a good value for a customer. The starter program rewards sponsors and sponsorship uplines on the sale of the starter packs. But, it is a limitation of the starter program that the program is based on a one-time sale, and thus a one-time bonus.

The bonus plan uses the timed/assigned bonus concept to add a completely new dimension to the compensation plan. Because of the assignment, the bonuses can truly pay to infinity—on the part of a downline's organization that began prior to the downline earning an equivalent title. The upline will be "blocked," or not eligible to receive bonuses on the part of the downline's organization that is in sponsorship lines begun by the downline after reaching the equivalent rank. A limitation of this type of plan on its own is that while there is considerable incentive for a distributor to build toward the next level, there is less incentive for him or her to work with groups developed at earlier levels, because those groups pay less in terms of the bonus. Thus, those groups tend to receive less assistance and direction and become less profitable to both the sponsor and the enterprise as a whole.

Example 84

Exemplary Implementation

The following includes material that can be presented to prospective participants and explains aspects that can be integrated into the commission program described herein. The bonus amounts can be different for different activities and phases.

For over 50 years, <company> has offered people just like you, an opportunity to make a difference.

We offer life-changing products that make people and the planet healthier, and also—a life-changing opportunity for you—and the people you share it with—to do well by doing good.

We believe if each of us shares these products, this opportunity, and our vision, collectively we can change the world.

If you're on a mission to change your life, the best way to start your <company> business is to become a GOLD Ambassador with the "Global Opportunity Leadership Development" Program.

For just $<price>, the GOLD Ambassador Program's Mission PAK gives you all the essential tools—including the New Distributor Welcome Kit, the Product Action Kit collection of your choice—with PV, so you can begin <company>-izing your home while building bonus-earning volume, And the opportunity to earn additional bonuses right away.

Plus, <company> will plant 5 trees for each Mission Pack sold to offset the carbon emissions from shipping and more—so you'll actually have a net positive impact on the planet.

But if you're like most people, you'll discover that once you try <company> products, you can't help but recommend them to others—and that's where the earning opportunity really gets exciting.

For every Mission Pak you sell, you can earn up to $<bonus amount> in GOLD Ambassador Program bonuses immediately, on top of our already generous compensation plan. And based on your qualification phase, these bonuses get paid to you or your upline.

Here's how it works.

When someone just joins <company>, or is just starting to build a business, they begin in phase one—and that's the room you are in right now. Success is as easy as sharing <company>, and teaching others to do the same.

Start by personally sponsoring 3 new GOLD Ambassadors who each buy the Mission PAK. For each one of them, you'll receive a $ <bonus amount> GOLD Ambassador Bonus. When you teach them to do the same, to start sharing <company>, and your 3 have sponsored 9 other new GOLD Ambassadors so that you have a total of 12 in your group, you now qualify for Phase Two, where you can earn additional and significant GOLD bonuses.

Now the GOLD Ambassadors can be sponsored in any combination: your 3 can sponsor the 9 by each sponsoring 3; you could have 1 superstar who sponsors all 9; or you could have sponsored all 12 yourself—whatever works best for your team. The bottom line is, once you sponsor 3 and have a total of 12 new GOLD Ambassadors in your group, you move on to Phase Two where the GOLD Ambassador bonuses get even bigger. Please proceed to the phase two room.

Welcome to Phase Two. Having already established a <company> organization that includes 12 GOLD Ambassadors, and probably a number or Distributors and members too, you are well on your way to building a strong and successful <company> business. Remember that as you sponsor, and as people join your organization, you are still making profit from the sale of products, and volume bonuses from our already generous compensation plan.

By the time you reach phase two, you probably hold the rank of Associate, and are getting pretty good at talking to people about <company>. Well in Phase Two, that is precisely what we want you to continue doing.

Personally sponsor another 3 new GOLD Ambassadors who sponsor any combination of 9 new GOLD Ambassadors so that building another team of 12 is your objective. And here's where things get interesting . . . .

. . . because you qualified for Phase Two, you now earn $<bonus amount> for each of the 3 or any GOLD Ambassadors you personally sponsor, plus you now earn $<bonus amount> for each new GOLD Ambassador they sponsor—TO UNLIMITED LEVELS in-depth! That's right—every GOLD Ambassador those 3 people sponsor, and the GOLD Ambassadors that their people sponsor, earns you $<bonus amount>.

Even when your 3 GOLD Ambassadors sponsor 9 for a total of 12 in Phase Two, and you move on to even greater earnings in Phase Three, you will continue to earn $<bonus amount> for each new GOLD Ambassador that anyone in your Phase Two team sponsors no matter how many levels under you they appear. Look around if there are other people in the room, or look at the circles on the wall, and the floor, imagine the stability of an organization comprised of 24 GOLD Ambassadors. Think of the possibilities of being able to earn $<bonus amount> from every person these people ever sponsor to unlimited levels. Now if you are ready to learn how this could get even better, please proceed to the Phase Three room.

Welcome to Phase Three. By this time, you've probably achieved at least the rank of Director, and you're really learning that the duplication of effort pays off, so it's probably no surprise that in Phase Three, you just continue to sponsor and grow. Repeat the process again: sponsor 3 new GOLD Ambassadors and help them to sponsor a total of 12 new GOLD Ambassadors.

With each new GOLD Ambassador sponsored, it just keeps getting better. In Phase Three, you now earn $<bonus amount> for each new GOLD Ambassador that you personally sponsor, plus $<bonus amount> for each GOLD Ambassador that they sponsor—AGAIN, TO UNLIMITED LEVELS!

So even after you fulfill your qualifications and move on to Phase Four, you will continue to receive $<bonus amount> from any GOLD Ambassadors sponsored into your phase Two group, and $<bonus amount> from any GOLD Ambassadors sponsored into your phase Three group to unlimited levels.

This time though, there is an additional qualification before you can move on to the $4^{th}$ and most profitable phase. You still have to have your 3 personally sponsored GOLD Ambassadors and 12 in your phase Three group, but you also need to help one of your phase Three Ambassadors complete Phase One and get to Phase Two themselves by creating a group of 12 of their own. Do that and achieve the rank of Executive Coordinator, and now you are qualified to move on to the $4^{th}$ and final phase. In the meantime, remember: you'll keep earning GOLD Ambassador bonuses on every new GOLD Ambassador who sponsors into your Phase Two and phase Three team. Please proceed to the phase Four room.

Welcome to Phase Four. By now, you've mastered the art of duplication—and you have unlocked the door to the highest level of GOLD Ambassador bonuses. Fundamentally you are still doing the same thing, but financially it really gets exciting when you continue to sponsor and teach others to do the same.

From this point on, you now earn $<bonus amount> for any GOLD Ambassadors you personally sponsor, plus $<bonus amount> for each GOLD Ambassador sponsored by anyone in your phase Four group—again to unlimited levels.

Even after people in your organization have achieved phase Two, Three, or Four and are earning GOLD Ambassador bonuses of their own, you will continue to earn off new GOLD Ambassadors sponsored by the organization they have built as they worked to qualify for each new phase.

The GOLD Program is designed to pay upfront starter cash while you build long-term residual income. How?

By rewarding the same activities that will help build your long-term residual income from volume and leadership bonuses: introduce people to the products and the opportunity in a duplicatable manner, and lead by example when you teach them to do the same.

That's why it's so important to remember that the people in each phase are not stagnant. They learn and grow by example—so it's important to teach them to duplicate your success with the GOLD Ambassador program. When they do, you've not only earned the upfront GOLD Ambassador bonuses, but your volume and leadership bonuses will grow too. And remember: the GOLD Ambassador program simply enhances what is already the most generous compensation plan in the industry. And as you move from Phase One through Four, you're probably advancing in rank so the size of your volume and leadership bonuses are likely to be increasing as well. Look around at all the circles on the wall or on the floor. All of these people, and all of this sponsoring is your foundation for success.

Plus, all of these growth activities can help you earn Incentive Trip Points—so the rewards just keep coming. The GOLD Ambassador Program can be the door to your life-changing opportunity.

Example 85

Exemplary Computer Implementation

The described commission program can involve multiple relationships for a potentially very large number of people and is typically implemented on a computing system. The commission program can be implemented on any of a variety of computing devices and environments, including computers of various form factors (personal, workstation, server, handheld, laptop, tablet, or other mobile), distributed computing networks, and Web services, as a few general examples. The commission program can be implemented in hardware circuitry, as well as in software executing within a computer or other computing environment, such as described herein.

Example 86

Exemplary Network Implementation

The embodiments described herein can be implemented in a networking scenario such as the Internet or an intranet.

Figure 37:
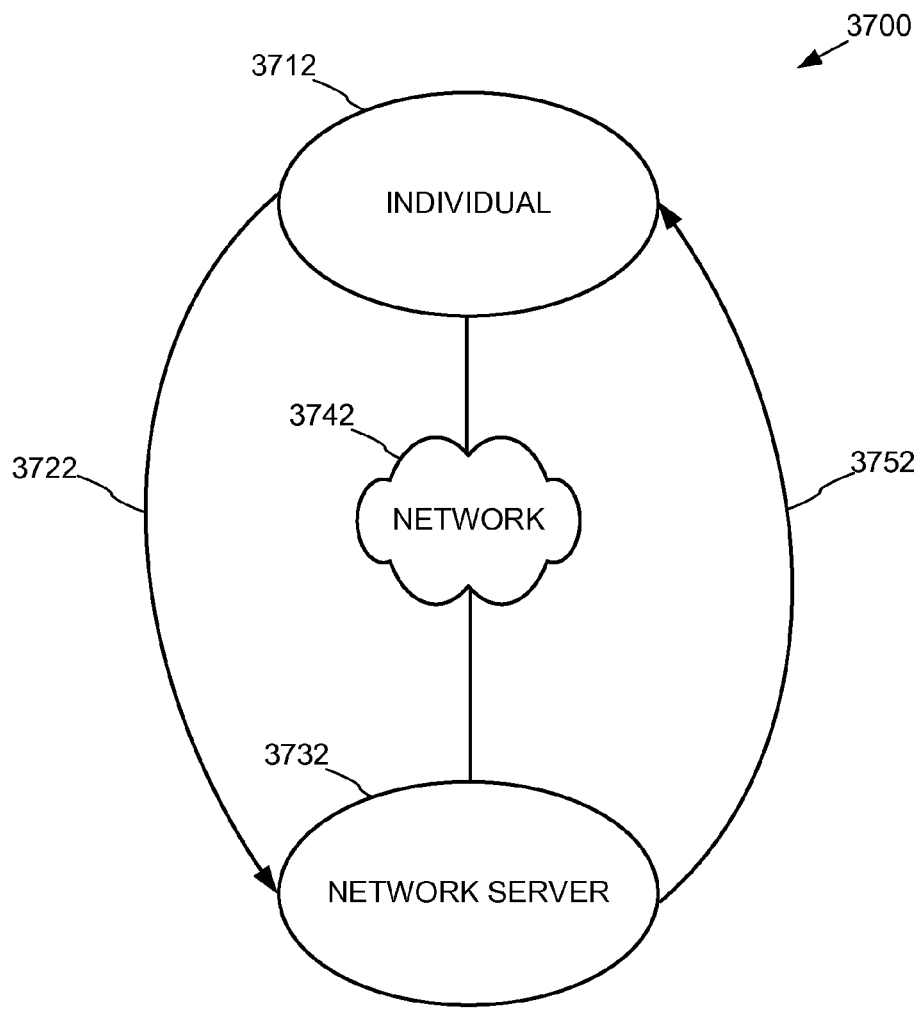
FIG. 37 is an illustration of an exemplary networking scenario.

An exemplary networking scenario 3700 is shown in FIG. 37. In the scenario 3700, an individual 3712, such as a distributor or business leader, sends requests 3722 for information to a network server 3732 via a network 3742. In response, the network server 3732 provides information 3752 via the network 3742. The information 3752 can take many forms including information for accomplishing computing tasks related to a software application or other software or information related to the company.

For example, the information requested by the individual 3712 can include information related to the company such as the current or past sales volume of the individual, information about a person or persons in the individual's upline or downline, information about a product or service offered by the company, or other information.

The network information can include delivery of graphical user interface elements (e.g., hyperlinks, graphical checkboxes, graphical pushbuttons, and graphical form fields) which can be manipulated by a pointing device such as a mouse.

To accomplish delivery of the information 3752, an individual 3712 can use client software such as a web browser to access a data center associated with the network server 3732 via a web protocol such as an HTTP-based protocol (e.g., HTTP or HTTPS). Requests for information can be accomplished by activating user interface elements (e.g., those acquired through the network or otherwise) or automatically (e.g., periodically or as otherwise scheduled) by software. In such an arrangement, a variety of networks (e.g., the Internet) can be used to deliver the network information (e.g., web pages conforming to HTML or some extension thereof, or information related to the company) in response to the requests. One or more clients can be executed on one or more devices having access to the network 3742. In some cases, the requests 3722 and information 3752 can take different forms, including communication to software other than a web browser.

The technologies described herein can be used to administer software implementing the above described compensation program (e.g., one or more applications) across a set of administered devices via a networking scenario. Administration of software can include software installation, software configuration, software management, or some combination thereof.

Figure 38:
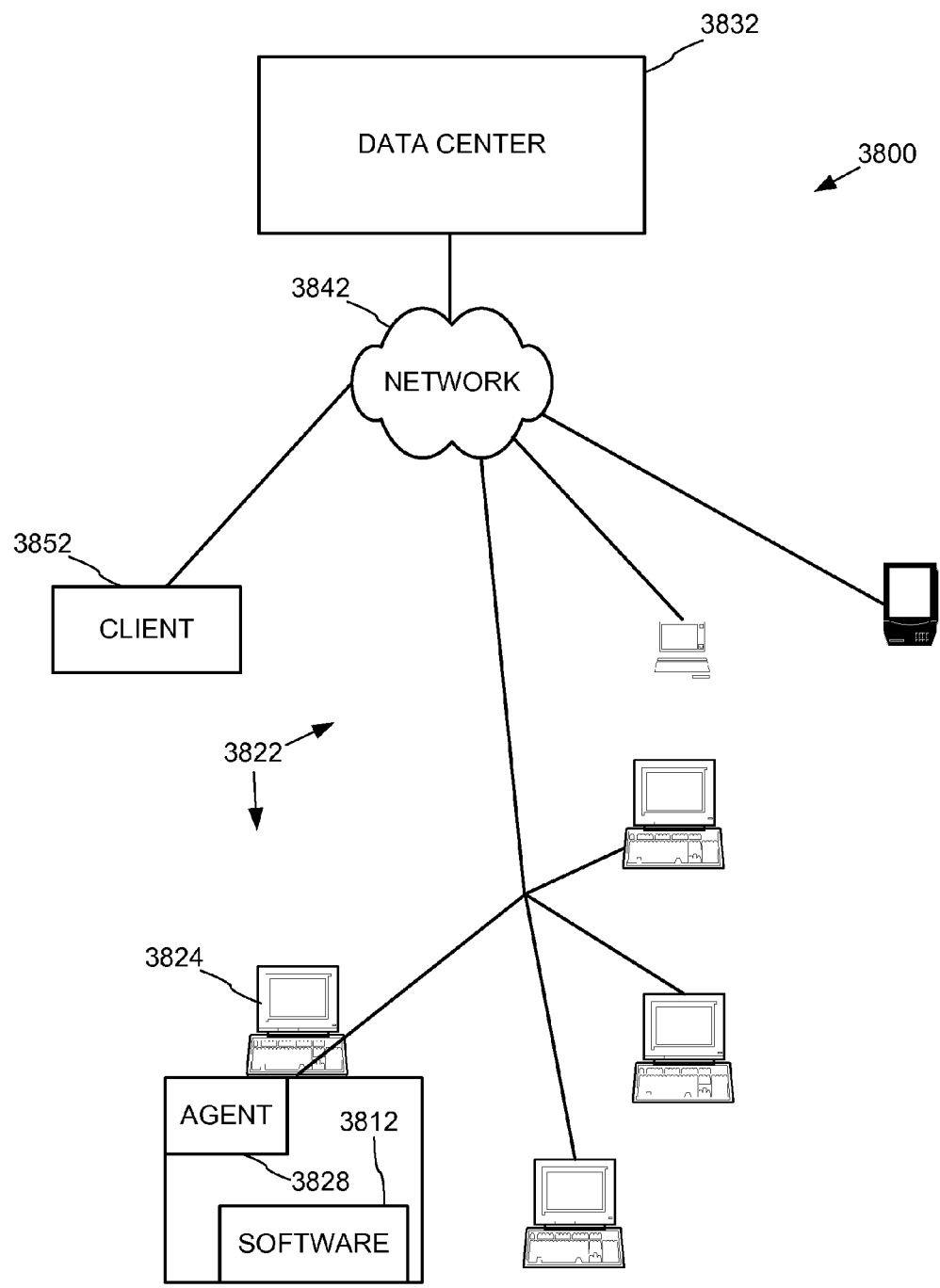
FIG. 38 is an illustration of administered devices.

FIG. 38 shows an exemplary arrangement 3800 whereby a network provides services for administering software (e.g., administered software 3812) across a set of administered devices 3822. The administered devices 3822 are sometimes called "administered nodes."

In the arrangement 3800, instances of the software 3812 are administered over the network via a data center 3832. The data center 3832 can be an array of hardware at one location or distributed over a variety of locations remote to the individual. Such hardware can include routers, web servers, database servers, mass storage, and other technologies appropriate for providing application services via the network 3842. Alternatively, the data center 3832 can be located at the individual's site or sites. In some arrangements, the data center 3832 can be operated by the individual.

The individual can make use of one or more client machines 3852 to access the data center 3832 via the network. For example, the client machine 3852 can execute a web browser, such as Microsoft Internet Explorer, which is marketed by Microsoft Corporation of Redmond, Wash. In some cases, the client machine 3852 may also be an administered device 3822.

The administered devices 3822 can include any of a wide variety of hardware devices, including desktop computers, server computers, notebook computers, handheld devices, programmable peripherals, and mobile telecommunication devices (e.g., mobile telephones). For example, a computer 3824 may be a desktop computer running an instance of the administered software 3812.

The computer 3824 may also include an agent 3828 for communicating with the data center 3832 to assist in administration of the administered software 3812. In one example of the network, the agent 3828 can communicate via any number of protocols, including HTTP-based protocols.

The administered devices 3822 can run a variety of operating systems, such as the Microsoft Windows family of operating systems marketed by Microsoft Corporation; the Mac OS family of operating systems marketed by Apple Computer Incorporated of Cupertino, Calif.; and others. Various versions of the operating systems can be scattered throughout the devices 3822. Although the example shows that the administered software 3812 can be managed over many administered nodes, one or more instances of the software can appear on one or more administered nodes.

In this example, the administered software 3812 includes functionality that resides locally to the computer 3824. For example, various software components, files, and other items can be acquired by any of a number of methods and reside in a computer-readable medium (e.g., memory, disk, or other computer-readable medium) local to the computer 3824. The administered software 3812 can include instructions executable by a computer and other supporting information. Various versions of the administered software 3812 can appear on the different devices 3822, and some of the devices 3822 may be configured to not include the software 3812.

Example 87

Exemplary Genealogies

In any of the examples herein, the following approach can be used in a multi-level marketing program. Traditionally, individuals have received compensation based upon the sales volume of the people that they sponsor. A sponsor is essentially a person who brings a new person ("sponsoree") into the company and then acts in the capacity of a mentor or manager for that sponsoree. A sponsor's responsibilities can include selling product to their sponsorees or coaching and training their sponsors to assist them in becoming successful in the sponsoree's business. Typically, each sponsoree only has a single sponsor, and thus there is generally only one person that is directly interested in the success of that sponsoree. Introduced here is a lateral-phase movement-based commission program.

Certain of the embodiments of the invention disclosed are designed to give a sponsoree multiple simultaneous sponsors. Certain embodiments of the program are designed such that an individual may be in two compensation programs simultaneously. In this program, a sponsoree may be permanently assigned in some cases to as many as four different sponsors. The sponsors can be assigned based on one or more criteria such as seniority, influence within the company, or influence within the market. In one embodiment, sponsors are assigned based on the sequence of sponsors leading to the sponsoree. For example, if A sponsors B, B sponsors C, and C sponsors D, then D's sponsors would likely include C, B, and A until certain criterion were met. One example might be to assign a sponsoree to one sponsor who is at a relatively low level within the company, and then assign the sponsoree to an additional sponsor or sponsors who have already achieved higher levels; alternatively a sponsoree could be assigned to just one sponsor if the sponsor had achieved a high level within the company.

In certain embodiments, when a person joins the program and begins to act as a sponsor, the sponsor earns $1^{st}$ tier bonuses on products that sponsorees purchased from the sponsor, as long as the sponsor qualifies according to criterion established by the particular business implementing the system. These $1^{st}$ tier bonuses may be monetary bonuses, though other compensation is herein envisioned. The $1^{st}$ tier program may also include a "stair step breakaway" compensation program. This compensation program is designed such that a sponsor receives a certain amount of the income based upon the further purchase of product from the company by a sponsoree whom they sponsor.

It is further envisioned that the sponsor may be part of the $1^{st}$ tier program and also a member of a $2^{nd}$ tier program. In terms of the $2^{nd}$ tier program, the sponsor will not earn income in the same manner. Instead, the income is initially reserved for the sponsor's sponsors, as will be described below. This serves to create a situation where two or more people, particularly the sponsor's sponsors, are personally interested in the success of the sponsor. It is envisioned that this will increase motivation by helping provide the sponsor with a greater support base with an economic incentive to assist the sponsor to develop their own business.

The $2^{nd}$ tier program consists of a series of phases. In the $2^{nd}$ tier program, a sponsor progresses through the series of phases and payments are assigned according to the phase that a sponsor is in when they sponsor a sponsoree. When the sponsor begins, they create new "genealogies" by meeting a given set of requirements before promoting to the next phase. A sponsor's genealogy may include the sponsorees that he or she is sponsoring, and include anyone that those sponsorees are sponsoring in turn. This relationship can continue through multiple levels, and there is no limit to the number of levels deep that a genealogy can go. In one embodiment a sponsor may stop earning compensation from a sponsoree if the sponsoree achieves a certain level. The sponsor may also stop earning income from any genealogies created by the sponsoree after the sponsoree has achieved that level. However, the sponsor would continue to earn income from any genealogies the sponsoree created before achieving that level.

As an example, the sponsor might be required to sponsor a minimum of three personal and twelve total sponsorees being sponsored in a given phase. A "personal" sponsoree is defined as a sponsoree that the sponsor specifically brings into the company. A sponsoree who counted toward the sponsor's total but was not a "personal" sponsoree would be a sponsoree that was brought into the company further down the sponsor's genealogy. For example, if A sponsored B, and B sponsored C, then A would "personally" sponsor B and not C, however both B and C would be in A's genealogy and count towards A's total. The genealogies that the sponsor created while in a phase 1 designation remain as part of their phase 1 group permanently. Those genealogies are assigned the moment that the sponsor-sponsoree relationships begin and do not change unless there is a special circumstance such as a sponsor leaving the company or some other similar change in circumstance. It is envisioned that bonuses may be included for the $2^{nd}$ tier as well, and may be monetary or some other form of bonus. For example, a bonus may be included for each "personal" sponsoree, though other configurations would be included. Typically, a sponsor earns this bonus whenever a sponsoree purchases a given amount of product from the company.

When a sponsor enters phase 2, the sponsor begins to build new genealogies. For those genealogies created while in this phase, regardless of how many levels deep the genealogies go, the sponsor earns a monetary phase 2 bonus when the sponsoree purchases a given amount of product from the company. This bonus may include different rates depending on the geographic location of the sponsoree. For example, the sponsor might earn $25.00 for sponsorees in the United States or in Canada, and only earn $5.00 for sponsorees in Mexico. All of the sponsorees in this phase may be assigned to the sponsor in the sponsor's phase 2 genealogy when the sponsorees enroll in the $2^{nd}$ tier program. Additionally, in certain embodiments, when a sponsoree that is sponsored by a phase 2 sponsor sponsors a person in turn, then the original phase 2 sponsor also receives the phase 2 monetary bonus. By way of example, presume that A is in phase 2. A sponsors B and receives the phase 2 monetary bonus when B purchases a certain amount of product from the company. If B sponsors C, then A also receives the phase 2 monetary bonus when C purchases a certain amount of product from the company.

Once a sponsor has completed phase 2 by meeting certain requirements, for example sponsoring three personal and twelve total sponsorees, the sponsor may be promoted to phase 3. At this point the sponsor creates new genealogies. The sponsorees sponsored in these genealogies will be assigned to the sponsor as both the phase 2 and phase 3 sponsor, thus the sponsor may earn both the phase 2 and the phase 3 bonus when these sponsorees purchase a certain amount of product from the company. For example, the sponsor might earn both a bonus of $25.00 for the phase 2 sponsorship and another bonus of $25.00 for the phase 3 sponsorship. As in phase 2, this bonus would be for any genealogies created in this phase, regardless of how many levels deep the genealogy goes. In certain embodiments, even though a sponsor progresses to phase 3 or higher, the sponsor continues to earn phase 2 bonuses on sponsorees added to the sponsor's phase 2 genealogy as the sponsorees in that genealogy continue to sponsor others.

In certain embodiments, once a sponsor has completed phase 3 by meeting certain requirements, for example sponsoring three personal and twelve total sponsorees, helping one sponsoree become a phase 2 sponsor, and be an executive coordinator, the sponsor starts new genealogies again. Sponsorees sponsored in this phase will be assigned to the sponsor as a phase 2, phase 3, and phase 4. The sponsor earns the phase 2 bonus, the phase 3 bonus, and the phase 4 bonus for this state when the sponsoree purchases a certain amount of product from the company. For example, the sponsor may earn the phase 2 bonus of $25.00, the phase 3 bonus of $25.00, and the phase 4 bonus of $25.00 for a total bonus of $75.00. As in phases 2 and 3, this bonus may be effective for any sponsoree in this genealogy, regardless of how many levels deep the genealogy goes. In certain embodiments, a phase 4 sponsor will also continue to earn phase 2 bonuses on the sponsor's phase 2 genealogy, and phase 2 and phase 3 bonuses on the sponsor's phase 3 genealogy as sponsorees in those respective genealogies continue to sponsor others as described above.

In certain embodiments sponsorees assigned to a sponsor as part of the sponsor's phase 1 group, even though the sponsor is now a phase 4 sponsor, remain assigned to the sponsor at the phase where the sponsor-sponsoree relationship was created. That relationship does not change. Additionally, the sponsorees that were in a sponsor's phase 2 genealogy remain assigned to the sponsor only as a phase 2, as do any people those sponsorees sponsor in turn. Thus, in such embodiments of the invention, even if an original sponsor is now in phase 4, they still only receive the phase 2 compensation from a sponsoree that they originally sponsored while they were in that phase and from people in that sponsoree's genealogy whether before or after the sponsor has been promoted to the next phase. Phase 3 relationships would hold in a similar manner.

Figure 39:
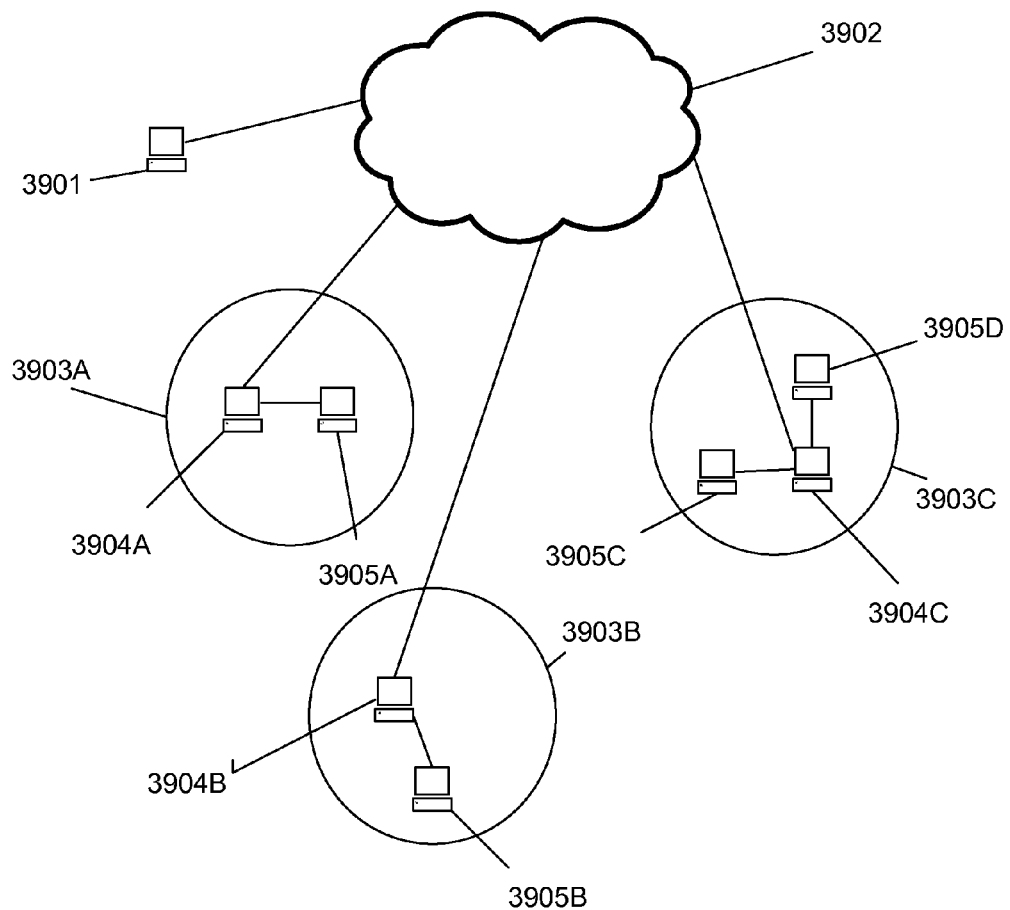
FIG. 39 is a block diagram showing genealogies.

In certain embodiments it is envisioned that this program may be implemented via a computer. Data generated by sponsors' and sponsorees' actions in the program may be stored and managed by a computer. In certain embodiments utilizing a computer, a sponsor and/or a sponsoree in the sponsor's genealogy have the ability to access data about the sponsoree. In this way a sponsor can view the progress of sponsorees in their genealogy and determine changes to any motivation or business plan that the sponsor may be implementing or may be able to view bonuses due based on the manipulation of the program data. FIG. 39 depicts a sponsor 3901 with access to a computer network 3902. The sponsor 3901 has three genealogies 3903a-c. Each genealogy 3903a-c has a personal sponsoree 3904a-c, respectively. Additionally, personal sponsoree 3904a is sponsoring another sponsoree 3905a who is included in the sponsor's 3901 genealogy 3903a. Similarly, personal sponsoree 3904b is sponsoring sponsoree 3905b within the second genealogy 3903b. Finally, personal sponsoree 3904c is sponsoring sponsorees 3905c, 3905d within the third genealogy 3903c. The sponsor 3901 can have access through the computer network 3902 to data about any of the sponsorees 3904a-c, 3905a-d within each of the sponsor's genealogies 3903a-c.

Though only four phases are discussed herein, other similar plans may have more or fewer phases for promotion according to factors such as the industry or the business model. Additionally, the requirements described herein for promotion are merely exemplary and other options such as different numbers of sponsorees or different levels to which a sponsoree must be sponsored are included in this disclosure. The description of the geographical locations and the bonus schemes are merely exemplary and there are numerous variations on the amount paid or the locations envisioned within this disclosure.

Example 88

Exemplary Computing Environment

Figure 40:
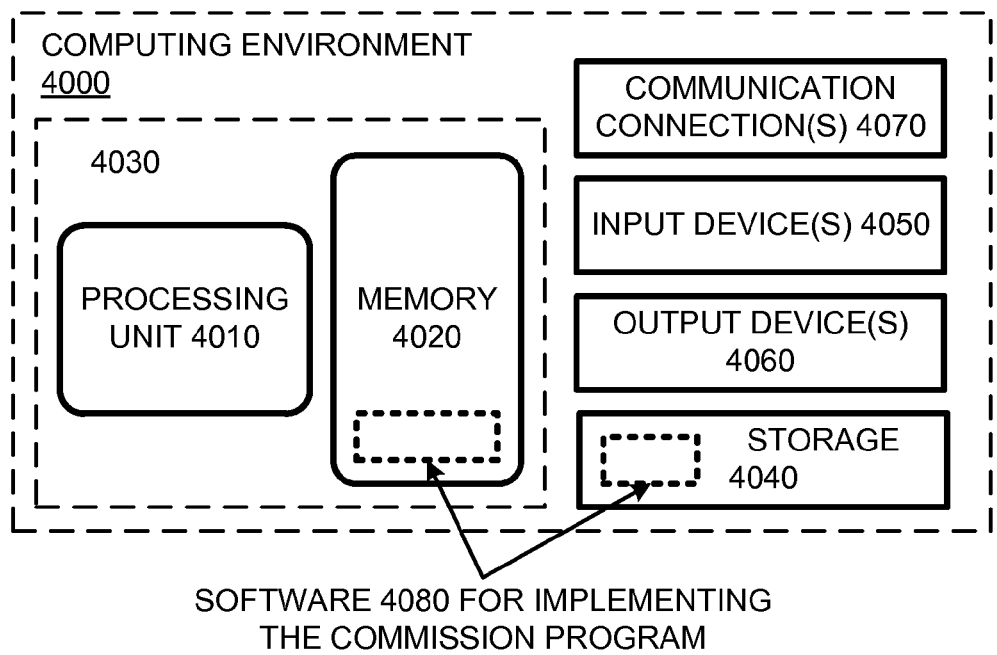
FIG. 40 is a block diagram of an exemplary suitable computing environment for implementing any of the technologies described herein.

FIG. 40 illustrates a generalized example of a suitable computing environment 4000 in which the described techniques can be implemented. The computing environment 4000 is not intended to suggest any limitation as to scope of use or functionality, as the technologies may be implemented in diverse general-purpose or special-purpose computing environments.

With reference to FIG. 40, the computing environment 4000 includes at least one processing unit 4010 and memory 4020. In FIG. 40, this basic configuration 4030 is included within a dashed line. The processing unit 4010 executes computer-executable instructions and may be a real or a virtual processor. In a multi-processing system, multiple processing units execute computer-executable instructions to increase processing power. The memory 4020 may be volatile memory (e.g., registers, cache, RAM), non-volatile memory (e.g., ROM, EEPROM, flash memory, etc.), or some combination of the two. The memory 4020 can store software 4080 implementing any of the technologies described herein (e.g., storing computer-executable instructions for performing any of the methods described herein).

A computing environment may have additional features. For example, the computing environment 4000 includes storage 4040, one or more input devices 4050, one or more output devices 4060, and one or more communication connections 4070. An interconnection mechanism (not shown) such as a bus, controller, or network interconnects the components of the computing environment 4000. Typically, operating system software (not shown) provides an operating environment for other software executing in the computing environment 4000, and coordinates activities of the components of the computing environment 4000.

The storage 4040 may be removable or non-removable, and includes magnetic disks, magnetic tapes or cassettes, CD-ROMs, CD-RWs, DVDs, flash memory, or any other computer-readable media which can be used to store information and which can be accessed within the computing environment 4000. The storage 4040 can store software 4080 containing instructions for any of the technologies described herein.

The input device(s) 4050 may be a touch input device such as a keyboard, mouse, pen, or trackball, a voice input device, a scanning device, or another device that provides input to the computing environment 4000. For audio, the input device(s) 4050 may be a sound card or similar device that accepts audio input in analog or digital form, or a CD-ROM reader that provides audio samples to the computing environment. The output device(s) 4060 may be a display, printer, speaker, CD-writer, or another device that provides output from the computing environment 4000.

The communication connection(s) 4070 enable communication over a communication mechanism to another computing entity. The communication mechanism conveys information such as computer-executable instructions, audio/video or other information, or other data. By way of example, and not limitation, communication mechanisms include wired or wireless techniques implemented with an electrical, optical, RF, infrared, acoustic, or other carrier.

The techniques herein can be described in the general context of computer-executable instructions, such as those included in program modules, being executed in a computing environment on a target real or virtual processor (e.g., which is implemented via a real processor). Generally, program modules include routines, programs, libraries, objects, classes, components, data structures, etc., that perform particular tasks or implement particular abstract data types. The functionality of the program modules may be combined or split between program modules as desired in various embodiments. Computer-executable instructions for program modules may be executed within a local or distributed computing environment.

Example 89

Exemplary Data Processing System

Any of the methods described herein can be implemented in a data processing system (e.g., computer or the like) such as the computing environment described herein. In such a case, the system can comprise memory in which are stored computer-executable instructions to perform any of the methods described herein and one or more processors (e.g., coupled to the memory) configured to execute the computer-executable instructions stored in memory to implement the method acts described.

Methods in Computer-Readable Media

Any of the methods described herein can be implemented by computer-executable instructions (e.g., causing a computer to perform the method) in one or more computer-readable media (e.g., computer-readable storage media or other tangible media). Any suitably programmed computer can be used to perform the methods. The technologies described herein can be implemented in a variety of programming languages.

Non-transitory computer-readable media (e.g., memory, magnetic, optical, and other non-transitory storage media) can be used for the computer-readable media described herein.

Exemplary Computer Program Product

In any of the examples herein, methods can be embodied in a computer program product. For example, a physical computer-readable medium storing computer-executable instructions causing a computer to perform any of the methods described herein can be offered as a product for use in a computing environment, such as a personal computer, handheld electronic device, or the like.

Alternatives

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. I/We therefore claim as my/our invention all that comes within the scope and spirit of these claims.

We claim:

1. A computer-implemented method comprising:
in a computer:
receiving a starting percentage;
for a compensated distributor in an organization, calculating a calculated percentage for a downline distributor, wherein calculating the calculated percentage comprises repeatedly applying an asymptotic modulation factor to the starting percentage while progressing through a downline of the compensated distributor, such that the sum of percentages does not exceed a target percentage; and
calculating a bonus for the compensated distributor, wherein calculating the bonus comprises applying the calculated percentage to a sales volume of the downline distributor.

2. One or more non-transitory computer-readable storage media having computer-executable instructions causing a computer to perform a method comprising:
receiving a starting percentage;
for a compensated distributor in an organization, calculating a calculated percentage for a downline distributor, wherein calculating the calculated percentage comprises repeatedly applying an asymptotic modulation factor to the starting percentage while progressing through a downline of the compensated distributor, such that the sum of percentages does not exceed a target percentage; and
calculating a bonus for the compensated distributor, wherein calculating the bonus comprises applying the calculated percentage to a sales volume of the downline distributor.

3. A data processing system comprising:
one or more processors;
memory coupled to at least one of the one or more processors;

wherein the data processing system is configured to perform a method comprising:

receiving a starting percentage;

for a compensated distributor in an organization, calculating a calculated percentage for a downline distributor, wherein calculating the calculated percentage comprises repeatedly applying an asymptotic modulation factor to the starting percentage while progressing through a downline of the compensated distributor, such that the sum of percentages does not exceed a target percentage; and calculating a bonus for the compensated distributor, wherein calculating the bonus comprises applying the calculated percentage to a sales volume of the downline distributor.

4. The computer-implemented method of claim 1 wherein:

the bonus is part of a compensation program; and calculating the bonus comprises determining total compensation for the compensated distributor under the compensation program in a piecemeal fashion as a sum based on sales level of downline distributors on whom compensation is paid out.

5. The computer-implemented method of claim 1 wherein:

the bonus is part of a compensation program; and calculating the bonus comprises determining total compensation paid out to distributors in the organization under the compensation program for the downline distributor; and after determining total compensation paid out to distributors in the organization under the compensation program for the downline distributor, determining total compensation paid out to distributors in the organization under the compensation program for an other downline distributor.

6. The computer-implemented method of claim 1 wherein calculating the calculated percentage comprises:

starting with the starting percentage at the downline distributor; and applying the asymptotic modulation factor while navigating the downline in an upward direction until the compensated distributor is reached.

7. The computer-implemented method of claim 1 wherein calculating the calculated percentage comprises:

skipping downline from the compensated distributor over non-qualified distributors to a first qualifying downline distributor; and starting with the starting percentage at the first qualifying downline distributor.

8. The computer-implemented method of claim 7 wherein further comprising:

after starting at the first qualifying downline distributor, applying the asymptotic modulation factor for distributors immediately downline from the first qualifying downline distributor.

9. The computer-implemented method of claim 1 wherein calculating the bonus comprises:

determining compensation paid out from the sales volume of the downline distributor to a plurality of distributors upline from the downline distributor; and storing compensation for the plurality of distributors upline from the downline distributor.

10. The computer-implemented method of claim 9 wherein calculating the bonus comprises:

proceeding from the downline distributor to an other distributor upline from the downline distributor; and determining compensation paid out from sales volume of the other distributor upline from the downline distributor.

11. The computer-implemented method of claim 1 wherein calculating the bonus comprises:

calculating the bonus in a piecemeal fashion, wherein calculating the bonus in the piecemeal fashion comprises:

calculating a piece of the bonus originating from the downline distributor as part of calculations for other pieces for bonuses for other compensated distributors; and separately calculating other pieces of the bonus for the compensated distributor originating from other downline distributors.

12. The computer-implemented method of claim 1 further comprising:

adding the bonus to other bonuses calculated for other distributors in the downline via the asymptotic modulation factor.

13. The computer-implemented method of claim 12 further comprising:

receiving the target percentage;

if a sum of percentages for the downline of the compensated distributor do not total the target percentage, recycling through the downline of the compensated distributor, wherein recycling comprises continuing applying the asymptotic modulation factor.

14. The computer-implemented method of claim 13 wherein recycling comprises:

starting at an immediate qualifying distributor downline of the compensated distributor.

15. The computer-implemented method of claim 13 wherein recycling comprises:

starting beyond an immediate qualifying downline distributor of the compensated distributor.

16. The computer-implemented method of claim 1 further comprising:

for bonuses underflowing an underflow threshold, storing the bonus for future calculations without including the bonus in current compensation for the compensated distributor.

17. The computer-implemented method of claim 1 further comprising:

for purposes of calculating the bonus, skipping levels in the downline of the compensated distributor that do not qualify according to one or more qualification criteria.

18. The computer-implemented method of claim 17 further comprising:

evaluating the one or more qualification criteria according to statically stored characteristics indicative of a non-current, previously existing lineage.

19. The computer-implemented method of claim 1 further comprising:

accumulating sales volume for a plurality of orders within a group of distributors before applying the calculated percentage.

20. The computer-implemented method of claim 1 further comprising:

limiting the bonus to compensated distributors meeting high-level qualifications, wherein the high-level qualifications comprise organizational size of a given compensated distributor;

wherein:

repeatedly applying the asymptotic modulation factor comprises applying the asymptotic modulation factor only when encountering distributors meeting the high-level qualifications.

21. The computer-implemented method of claim 1 further comprising:
grouping at least a subset of distributors in the organization based on high-level qualifications recorded for a qualified distributor, wherein grouping comprises identifying whether the qualified distributor is qualified, wherein the identifying comprises determining that the qualified distributor has distributed sub-organization volume; and
repeatedly applying the asymptotic modulation factor comprises applying the asymptotic modulation factor for the subset of distributors and navigating to another portion of the organization, wherein navigating to another portion of the organization comprises proceeding to a next qualifying distributor.

22. The computer-implemented method of claim 21 wherein:
determining that the qualified distributor has distributed sub-organization volume comprises determining whether a threshold amount of sub-organization volume is derived outside of any single leg.

23. The computer-implemented method of claim 1 further comprising:
grouping at least a subset of distributors in the organization based on high-level qualifications recorded for a qualified distributor, wherein grouping comprises identifying whether the qualified distributor is qualified, wherein the identifying comprises determining whether the qualified distributor has achieved accelerated organization ramp up; and
repeatedly applying the asymptotic modulation factor comprises applying the asymptotic modulation factor for the subset of distributors and navigating to another portion of the organization, wherein navigating to another portion of the organization comprises proceeding to a next qualifying distributor.

24. The computer-implemented method of claim 23 wherein:
determining whether the qualified distributor has achieved accelerated organization ramp up comprises:
determining whether a threshold number of legs in a sub-organization of the qualified distributor have leaders who have achieved leader status within a threshold time frame.

25. A computer-implemented method comprising:
in a computer:
receiving a starting percentage;
receiving a modulation factor; and
calculating a bonus for a compensated distributor in an organization, wherein calculating the bonus comprises applying the modulation factor to the starting percentage a repeated number of times, wherein the number of times depends on a number of distributors, wherein the modulation factor is applicable to the starting percentage an infinite number of times without a sum of resulting percentages exceeding a target percentage.

26. A computer-implemented method comprising:
in a suitably programmed computer, for a compensated distributor in an organization, selecting selected distributors on whom the compensated distributor is to be paid a bonus, wherein selecting distributors comprises applying recurring non-continuous inclusion of distributors in a downline of the compensated distributor, wherein non-continuous inclusion of distributors comprises omitting one or more downline distributors from the selected distributors; and
for the selected distributors in the downline of the compensated distributor, calculating a bonus for the compensated distributor.

27. The computer-implemented method of claim 26 wherein applying recurring non-continuous inclusion comprises:
skipping distributors in the downline according to a deterministic pattern.

28. The computer-implemented method of claim 27 wherein:
the deterministic pattern comprises including distributors at a starting level in the downline and then including distributors at regular intervals thereafter.

29. The computer-implemented method of claim 28 wherein:
the regular intervals comprise linear intervals.

30. The computer-implemented method of claim 27 wherein:
the deterministic pattern comprises including distributors at a starting level in the downline and then including distributors at exponential intervals thereafter, wherein the exponential intervals comprise intervals with an exponential pattern.

31. The computer-implemented method of claim 28 wherein:
the regular intervals follow an initial continuous gap in the downline.

32. The computer-implemented method of claim 26 wherein applying recurring non-continuous inclusion comprises:
skipping distributors in the downline according to a random pattern.

33. One or more non-transitory computer-readable storage media having computer-executable instructions for performing a method comprising:
(a) receiving a starting percentage;
(b) receiving an asymptotic modulation factor;
(c) starting with a subject distributor at a stored representation of a sales organization;
(d) calculating compensation paid out on a volume of the subject distributor via application of the starting percentage and the asymptotic modulation factor, such that the sum of percentages does not exceed a target percentage;
(e) selecting other subject distributors within the stored representation of the sales organization; and
repeating (d)-(e) until no more distributors are to be navigated.

34. The one or more non-transitory computer-readable storage media of claim 33 wherein:
calculating compensation paid out on a volume of the subject distributor comprises:
(1) starting at the subject distributor with the starting percentage;
(2) calculating compensation paid out for an immediately upline distributor, applying the asymptotic modulation factor for second and subsequent iterations;
(3) adding the calculated compensation to a total for the immediately upline distributor;
(4) navigating upward in the stored representation of the sales organization if possible;
(5) repeating (2)-(4) until a top of the stored representation of the sales organization is reached.

35. One or more non-transitory computer-readable media having encoded therein computer-executable instructions causing a computer to perform a method comprising:

receiving a starting percentage;
storing a representation of a sales organization, wherein the representation comprises distributor nodes of respective distributors in the sales organization;
grouping distributor nodes into subsets based on a high-level qualification achieved by a distributor represented by a respective distributor node;
calculating a calculated bonus percentage, wherein calculating the calculated bonus percentage comprises repeatedly applying an asymptotic modulation factor to the starting percentage while progressing through the representation of the sales organization according to the subsets; and
calculating a bonus for a compensated distributor, wherein calculating the bonus comprises applying the calculated bonus percentage to a sales volume for a plurality of distributors within the organization.

* * * * *